(12) United States Patent
Firminger et al.

(10) Patent No.: US 8,010,663 B2
(45) Date of Patent: Aug. 30, 2011

(54) CORRELATING DATA INDICATING SUBJECTIVE USER STATES ASSOCIATED WITH MULTIPLE USERS WITH DATA INDICATING OBJECTIVE OCCURRENCES

(75) Inventors: Shawn P. Firminger, Redmond, WA (US); Jason Garms, Redmond, WA (US); Edward K. Y. Jung, Bellevue, WA (US); Chris D. Karkanias, Sammamish, WA (US); Eric C. Leuthardt, St. Louis, MO (US); Royce A. Levien, Lexington, MA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Kristin M. Tolle, Redmond, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 258 days.

(21) Appl. No.: 12/383,817

(22) Filed: Mar. 25, 2009

(65) Prior Publication Data
US 2010/0131437 A1 May 27, 2010

Related U.S. Application Data

(63) Continuation-in-part of application No. 12/383,581, filed on Mar. 24, 2009, and a continuation-in-part of application No. 12/380,573, filed on Feb. 26, 2009, and a continuation-in-part of application No. 12/380,409, filed on Feb. 25, 2009, and a continuation-in-part of application No. 12/378,288, filed on Feb. 11, 2009, and a continuation-in-part of application No. 12/378,162, filed on Feb. 9, 2009, and a continuation-in-part of application No. 12/319,134, filed on Dec. 31, 2008, and a continuation-in-part of application No. 12/319,135, filed on Dec. 31, 2008, and a continuation-in-part of application No. 12/315,083, filed on Nov. 26, 2008, and a continuation-in-part of application No. 12/313,659, filed on Nov. 21, 2008.

(51) Int. Cl.
*G06F 15/16* (2006.01)

(52) U.S. Cl. ........ 709/224; 709/204; 709/206; 709/217; 706/11; 706/12; 706/52; 707/687; 707/755; 707/736

(58) Field of Classification Search .................. 709/224, 709/226
See application file for complete search history.

(56) References Cited

U.S. PATENT DOCUMENTS 3,599,149 A     8/1971   Pardoe
(Continued)

FOREIGN PATENT DOCUMENTS

WO     WO 99/18842     4/1999

OTHER PUBLICATIONS

Agger, Michael; "Every Day We Write the Book: What would happen if Facebook made its data available for research?"; Slate; bearing date of Nov. 30, 2010; printed on Dec. 10, 2010; pp. 1-3; located at: http://www.slate.com/formatdynamics/CleanPrintProxy.aspx?1292008532368.

(Continued)

*Primary Examiner* — Jude Jean Gilles

(57) ABSTRACT

A computationally implemented method includes, but is not limited to acquiring subjective user state data including data indicating incidence of at least a first subjective user state associated with a first user and data indicating incidence of at least a second subjective user state associated with a second user; acquiring objective occurrence data including data indicating incidence of at least a first objective occurrence and data indicating incidence of at least a second objective occurrence; and correlating the subjective user state data with the objective occurrence data. In addition to the foregoing, other method aspects are described in the claims, drawings, and text forming a part of the present disclosure.

43 Claims, 26 Drawing Sheets

U.S. PATENT DOCUMENTS

| | | | |
|---|---|---|---|
| 7,203,430 B2 * | 4/2007 | Ohta | 399/8 |
| 7,400,928 B2 | 7/2008 | Hatlestsad | |
| 7,627,544 B2 | 12/2009 | Chkodrov et al. | |
| 2003/0166277 A1 | 9/2003 | Zauderer et al. | |
| 2004/0103108 A1 | 5/2004 | Andreev et al. | |
| 2005/0102578 A1 | 5/2005 | Bliss et al. | |
| 2006/0034430 A1 | 2/2006 | Liakis | |
| 2007/0293731 A1 | 12/2007 | Downs et al. | |
| 2008/0034056 A1 | 2/2008 | Renger et al. | |
| 2008/0091515 A1 | 4/2008 | Thieberger et al. | |
| 2008/0215607 A1 | 9/2008 | Kaushansky et al. | |
| 2008/0218472 A1 | 9/2008 | Breen et al. | |
| 2009/0049154 A1 | 2/2009 | Ge | |
| 2009/0077658 A1 | 3/2009 | King et al. | |
| 2009/0132197 A1 | 5/2009 | Rubin et al. | |
| 2009/0240647 A1 | 9/2009 | Green et al. | |
| 2009/0276221 A1 | 11/2009 | Heiman et al. | |
| 2009/0326981 A1 | 12/2009 | Karkanias et al. | |
| 2010/0010866 A1 | 1/2010 | Bal et al. | |
| 2010/0088104 A1 | 4/2010 | DeRemer et al. | |

OTHER PUBLICATIONS

"Self-tracking links to get you started"; The Quantified Self: self knowledge through numbers; printed on Dec. 10, 2010; pp. 1-5; located at: http://quantifiedself.com/self-tracking-links-to-get-you-started/.

Hansen, et al.; "Microblogging—Facilitating Tacit Knowledge?"—A Second Year Term Paper; Information Management Study at Copenhagen Business School; 2008; pp. 1-42; located at http://www.scribd.com/doc/3460679/Microblogging-as-a-Facilitator-for-Tacit-Knowledge.

Reiss, M.; "Correlations Between Changes in Mental States and Thyroid Activity After Different Forms of Treatment"; The British Journal of Psychology—Journal of Mental Science; bearing dates of Mar. 6, 1954 and 1954; pp. 687-703 [Abstract only provided]; located at http://bjp.rcpsych.org/cgi/content/abstract/100/420/687; The Royal College of Psychiatrists.

U.S. Appl. No. 12/462,201, Firminger et al.
U.S. Appl. No. 12/462,128, Firminger et al.
U.S. Appl. No. 12/459,854, Firminger et al.
U.S. Appl. No. 12/459,775, Firminger et al.
U.S. Appl. No. 12/456,433, Firminger et al.
U.S. Appl. No. 12/456,249, Firminger et al.
U.S. Appl. No. 12/455,317, Firminger et al.
U.S. Appl. No. 12/455,309, Firminger et al.
U.S. Appl. No. 12/387,487, Firminger et al.
U.S. Appl. No. 12/387,465, Firminger et al.
U.S. Appl. No. 12/384,779, Firminger et al.
U.S. Appl. No. 12/384,660, Firminger et al.
U.S. Appl. No. 12/383,581, Firminger et al.
U.S. Appl. No. 12/380,573, Firminger et al.
U.S. Appl. No. 12/380,409, Firminger et al.
U.S. Appl. No. 12/378,288, Firminger et al.
U.S. Appl. No. 12/378,162, Firminger et al.

Buchanan, Matt; "Twitter Toilet Tweets Your Poo"; gizmodo.com; bearing a date of May 18, 2009; pp. 1-2; located at http://gizmodo.com/5259381/twitter-toilet-tweets-your-poo; printed on Jul. 1, 2009.

Diaz, Jesus; "One Day, This Will Be Remembered as the First Real Tricorder"; gizmodo.com; bearing a date of Nov. 12, 2009; pp. 1-2; located at http://gizmodo.com/5403126/one-day-this-will-be-remembered-as-the...; printed on Nov. 25, 2009.

Fox, Stuart; "The John, 2.0"; Popular Science; bearing a date of May 18, 2009; pp. 1-2; located at http://www.popsci.com/scitech/article/2009-05/john-20; printed on Jul. 1, 2009.

Frucci, Adam; "SNIF Dog Tags Track What Your Dog Does All Day; Spoiler: Eat, Sleep, Poop"; gizmodo.com; bearing a date of Jun. 10, 2009; pp. 1-2; located at http://i.gizmodo.com/5286076/snif-dog-tags-track-what-your-dog-does-all-day-spoiler-eats-sl...; printed on Jul. 1, 2009.

Gross, Daniel; "A Jewish Mother in Your Cell Phone"; Slate; bearing a date of Nov. 10, 2009; pp. 1-3; located at http://www.slate.com/formatdynamics/CleanPrintProxy.aspx?125919...; printed on Nov. 25, 2009.

"hacklab.Toilet—a twitter-enabled toilet at hacklab.to"; aculei.net; bearing a date of May 18, 2009; pp. 1-8; located at http://aculei.net/~shardy/hacklabtoilet/; printed on Jul. 1, 2009.

U.S. Appl. No. 12/319,135, Firminger et al.
U.S. Appl. No. 12/319,134, Firminger et al.
U.S. Appl. No. 12/315,083, Firminger et al.
U.S. Appl. No. 12/313,659, Firminger et al.

June, Laura; "Apple patent filing shows off activity monitor for skiers, bikers"; engadget.com; bearing a date of Jun. 11, 2009; pp. 1-8; located at http://www.engadget.com/2009/06/11/apple-patent-filing-shows-off-a...; printed on Jul. 1, 2009.

Kraft, Caleb; "Twittering toilet"; Hack A Day; bearing a date of May 5, 2009; pp. 1-11; located at http://hackaday.com/2009/05/05/twittering-toilet/; printed on Jul. 1, 2009.

"Mobile pollution sensors deployed"; BBC News; bearing a date of Jun. 30, 2009; pp. 1-2; located at http://news.bbc.co.uk/2/hi/science/nature/8126498.stm; printed on Jul. 1, 2009; © BBC MMIX.

Morales, C. Romero et al.; "Using sequential pattern mining for links recommendation in adaptive hypermedia educational systems"; Current Developments in Technology-Assisted Education; bearing a date of 2006; pp. 1016-1020; © FORMATEX 2006.

Nesbit, J.C. et al.; "Sequential pattern analysis software for educational event data"; pp. 1-5.

Oliver, Sam; "Apple developing activity monitor for skiers, snowboarders, bikers"; AppleInsider; bearing a date of Jun. 11, 2009; pp. 1-6; located at http://www.appleinsider.com/articles/09/06/11/apple_developing_act...; printed on Jul. 1, 2009; AppleInsider © 1997-2008.

Rettner, Rachael; "Cell Phones Allow Everyone to Be a Scientist"; LiveScience; bearing a date of Jun. 4, 2009; pp. 1-3; located at http://www.livescience.com/technology/090604-mobile-sensor.html; printed on Jul. 1, 2009; © Imaginova Corp.

SPSS; "Find patterns in data that identify combinations of events that occur together"; SPSS Association Rule Components; bearing a date of 2002; pp. 1-5; © 2002 SPSS Inc.

SPSS; "Find sequential patterns in data to predict events more accurately"; SPSS Sequence Association™ Component; bearing a date of 2002; pp. 1-5; © 2002 SPSS Inc.

\* cited by examiner

CORRELATING DATA INDICATING SUBJECTIVE USER STATES ASSOCIATED WITH MULTIPLE USERS WITH DATA INDICATING OBJECTIVE OCCURRENCES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC§119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/383,581, entitled CORRELATING DATA INDICATING SUBJECTIVE USER STATES ASSOCIATED WITH MULTIPLE USERS WITH DATA INDICATING OBJECTIVE OCCURRENCES, naming Shawn P. Firminger, Jason Garms, Edward K.Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 24 Mar. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/313,659, entitled CORRELATING SUBJECTIVE USER STATES WITH OBJECTIVE OCCURRENCES ASSOCIATED WITH A USER, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 21 Nov. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/315,083, entitled CORRELATING SUBJECTIVE USER STATES WITH OBJECTIVE OCCURRENCES ASSOCIATED WITH A USER, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 26 Nov. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/319,135, entitled CORRELATING DATA INDICATING AT LEAST ONE SUBJECTIVE USER STATE WITH DATA INDICATING AT LEAST ONE OBJECTIVE OCCURRENCE ASSOCIATED WITH A USER, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 31 Dec. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/319,134, entitled CORRELATING DATA INDICATING AT LEAST ONE SUBJECTIVE USER STATE WITH DATA INDICATING AT LEAST ONE OBJECTIVE OCCURRENCE ASSOCIATED WITH A USER, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 31 Dec. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/378,162, entitled SOLICITING DATA INDICATING AT LEAST ONE OBJECTIVE OCCURRENCE IN RESPONSE TO ACQUISITION OF DATA INDICATING AT LEAST ONE SUBJECTIVE USER STATE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 9 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/378,288, entitled SOLICITING DATA INDICATING AT LEAST ONE OBJECTIVE OCCURRENCE IN RESPONSE TO ACQUISITION OF DATA INDICATING AT LEAST ONE SUBJECTIVE USER STATE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 11 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,409, entitled SOLICITING DATA INDICATING AT LEAST ONE SUBJECTIVE USER STATE IN RESPONSE TO ACQUISITION OF DATA INDICATING AT LEAST ONE OBJECTIVE OCCURRENCE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 25 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,573, entitled SOLICITING DATA INDICATING AT LEAST ONE SUBJECTIVE USER STATE IN RESPONSE TO ACQUISITION OF DATA INDICATING AT LEAST ONE OBJECTIVE OCCURRENCE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 26 Feb. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

A computationally implemented method includes, but is not limited to: acquiring subjective user state data including data indicating incidence of at least a first subjective user state associated with a first user and data indicating incidence of at least a second subjective user state associated with a second user; acquiring objective occurrence data including data indicating incidence of at least a first objective occurrence and data indicating incidence of at least a second objective occurrence; and correlating the subjective user state data with the objective occurrence data. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for acquiring subjective user state data including data indicating incidence of at least a first subjective user state associated with a first user and data indicating incidence of at least a second subjective user state associated with a second user; means for acquiring objective occurrence data including data indicating incidence of at least a first objective occurrence and data indicating incidence of at least a second objective occurrence; and means for correlating the subjective user state data with the objective occurrence data. In addition to the foregoing, other system aspects are described in the claims, drawings, and text forming a part of the present disclosure.

A computationally implemented system includes, but is not limited to: circuitry for acquiring subjective user state data including data indicating incidence of at least a first subjective user state associated with a first user and data indicating incidence of at least a second subjective user state associated with a second user; circuitry for acquiring objective occurrence data including data indicating incidence of at least a first objective occurrence and data indicating incidence of at least a second objective occurrence; and circuitry for correlating the subjective user state data with the objective occurrence data. In addition to the foregoing, other system aspects are described in the claims, drawings, and text forming a part of the present disclosure.

A computer program product including a signal-bearing medium bearing one or more instructions for acquiring subjective user state data including data indicating incidence of at least a first subjective user state associated with a first user and data indicating incidence of at least a second subjective user state associated with a second user; one or more instructions for acquiring objective occurrence data including data indicating incidence of at least a first objective occurrence and data indicating incidence of at least a second objective occurrence; and one or more instructions for correlating the subjective user state data with the objective occurrence data. In addition to the foregoing, other computer program product aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
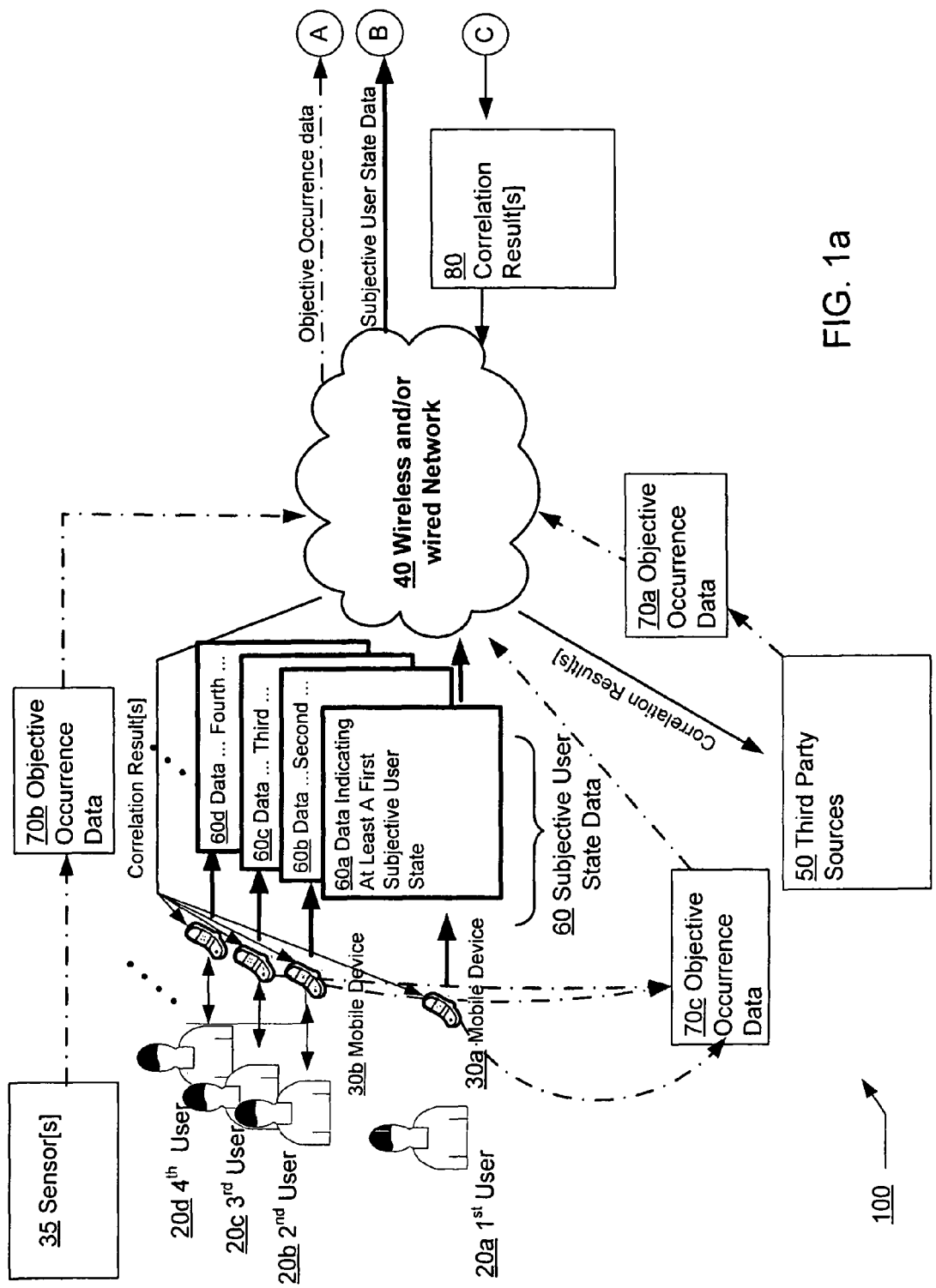
FIGS. 1a and 1b show a high-level block diagram of a network device operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A recent trend that is becoming increasingly popular in the computing/communication field is to electronically record one's feelings, thoughts, and other aspects of the person's everyday life onto an open diary. One place where such open diaries are maintained are at social networking sites commonly known as "blogs" where one or more users may report or post their thoughts and opinions on various topics, latest news, and various other aspects of users everyday life. The process of reporting or posting blog entries is commonly referred to as blogging. Other social networking sites may allow users to update their personal information via, for example, social network status reports in which a user may report or post, for others to view, the latest status or other aspects of the user.

A more recent development in social networking is the introduction and explosive growth of microblogs in which individuals or users (referred to as "microbloggers") maintain open diaries at microblog websites (e.g., otherwise known as "twitters") by continuously or semi-continuously posting microblog entries. A microblog entry (e.g., "tweet") is typically a short text message that is usually not more than 140 characters long. The microblog entries posted by a microblogger may report on any aspect of the microblogger's daily life.

The various things that are typically posted through microblog entries may be categorized into one of at least two possible categories. The first category of things that may be reported through microblog entries are "objective occurrences" that may be directly or indirectly associated with the microblogger. Objective occurrences that are associated with a microblogger may be any characteristic, event, happening, or any other aspect that may be directly or indirectly associated with or of interest to the microblogger that can be objectively reported by the microblogger, a third party, or by a device. These things would include, for example, food, medicine, or nutraceutical intake of the microblogger, certain physical characteristics of the microblogger such as blood sugar level or blood pressure that can be objectively measured, daily activities of the microblogger observable by others or by a device, the local weather, the stock market (which the microblogger may have an interest in), activities of others (e.g., spouse or boss) that may directly or indirectly affect the microblogger, and so forth.

A second category of things that may be reported or posted through microblogging entries include "subjective user states" of the microblogger. Subjective user states of a microblogger include any subjective state or status associated with the microblogger that can only be typically reported by the microblogger (e.g., generally cannot be reported by a third party or by a device). Such states including, for example, the subjective mental state of the microblogger (e.g., "I am feeling happy"), the subjective physical states of the microblogger (e.g., "my ankle is sore" or "my ankle does not hurt anymore" or "my vision is blurry"), and the subjective overall state of the microblogger (e.g., "I'm good" or "I'm well"). Note that the term "subjective overall state" as will be used herein refers to those subjective states that do not fit neatly into the other two categories of subjective user states described above (e.g., subjective mental states and subjective physical states). Although microblogs are being used to provide a wealth of personal information, they have only been primarily limited to their use as a means for providing commentaries and for maintaining open diaries.

In accordance with various embodiments, methods, systems, and computer program products are provided for, among other things, correlating subjective user state data including data indicating incidences of one or more subjective user states of multiple users with objective occurrence data including data indicating incidences of one or more objective occurrences. In doing so, a causal relationship between one or more objective occurrences (e.g., cause) and one or more subjective user states (e.g., result) associated with multiple users (e.g., bloggers or microbloggers) may be determined in various alternative embodiments. For example, determining that eating a banana (e.g., objective occurrence) may result in a user feeling good (e.g., subjective user state) or determining that users will usually or always feel satisfied or good whenever they eat bananas. Note that an objective occurrence does not need to occur prior to a corresponding subjective user state but instead, may occur subsequent or concurrently with the incidence of the subjective user state. For example, a person may become "gloomy" (e.g., subjective user state) whenever it is about to rain (e.g., objective occurrence) or a person may become gloomy while (e.g., concurrently) it is raining.

In various embodiments, subjective user state data may include data indicating subjective user states of multiple users. A "subjective user state," as will be used herein, may be in reference to any subjective state or status associated with a particular user (e.g., a particular blogger or microblogger) at any moment or interval in time that only the user can typically indicate or describe. Such states include, for example, the subjective mental state of a user (e.g., user is feeling sad), the subjective physical state (e.g., physical characteristic) of a user that only the user can typically indicate (e.g., a backache or an easing of a backache as opposed to blood pressure which can be reported by a blood pressure device and/or a third party), and the subjective overall state of a user (e.g., user is "good"). Examples of subjective mental states include, for example, happiness, sadness, depression, anger, frustration, elation, fear, alertness, sleepiness, and so forth. Examples of subjective physical states include, for example, the presence, easing, or absence of pain, blurry vision, hearing loss, upset stomach, physical exhaustion, and so forth. Subjective overall states may include any subjective user states that cannot be categorized as a subjective mental state or as a subjective physical state. Examples of overall states of a user that may be subjective user states include, for example, the user being good, bad, exhausted, lack of rest, wellness, and so forth.

In contrast, "objective occurrence data," which may also be referred to as "objective context data," may include data that indicate one or more objective occurrences that may or may not be directly or indirectly associated with one or more users. In particular, an objective occurrence may be a physical characteristic, an event, one or more happenings, or any other aspect that may be associated with or is of interest to a user (or a group of users) that can be objectively reported by at least a third party or a sensor device. Note, however, that the occurrence or incidence of an objective occurrence does not have to be actually provided by a sensor device or by a third party, but instead, may be reported by a user or a group of users. Examples of an objective occurrence that could be indicated by the objective occurrence data include, for example, a user's food, medicine, or nutraceutical intake, a user's location at any given point in time, a user's exercise routine, a user's blood pressure, weather at a user's or a group of users' location, activities associated with third parties, the stock market, and so forth.

The term "correlating" as will be used herein is in reference to a determination of one or more relationships between at least two variables. In the following exemplary embodiments, the first variable is subjective user state data that represents multiple subjective user states of multiple users and the second variable is objective occurrence data that represents one or more objective occurrences. Each of the subjective user states represented by the subjective user state data may be associated with a respective user and may or may not be the same or similar type of subjective user state. Similarly, when multiple objective occurrences are represented by the objective occurrence data, each of the objective occurrences indicated by the objective occurrence data may or may not represent the same or similar type of objective occurrence.

Various techniques may be employed for correlating the subjective user state data with the objective occurrence data. For example, in some embodiments, correlating the objective occurrence data with the subjective user state data may be accomplished by determining a first sequential pattern for a first user, the first sequential pattern being associated with at least a first subjective user state (e.g., upset stomach) associated with the first user and at least a first objective occurrence (e.g., first user eating spicy food).

A second sequential pattern may also be determined for a second user, the second sequential pattern being associated with at least a second subjective user state (e.g., upset stomach) associated the second user and at least a second objective occurrence (second user eating spicy food). The subjective user state data (which may indicate the subjective user states of the first and the second user) and the objective occurrence data (which may indicate the first and the second objective occurrence) may then be correlated by comparing the first sequential pattern with the second sequential pattern. In doing so, for example, a hypothesis may be determined indicating that, for example, eating spicy foods causes upset stomachs.

Note that in some cases, the first and second objective occurrences indicated by the objective occurrence data could actually be the same objective occurrence. For example, the first and second objective occurrence could be related to the weather at a particular location (and therefore, potentially affect multiple users). However, since a single objective occurrence event such as weather could be reported via different sources (e.g., different users or third party sources), a single objective occurrence event could be indicated multiple times by the objective occurrence data. In still other variations, the first and the second objective occurrences may be the same or similar types of objective occurrences (e.g., bad weather on different days or different locations). In still other variations, the first and the second objective occurrences could be different objective occurrences (e.g., sunny weather as opposed to stormy weather) or variations of each other (e.g., a blizzard as opposed to light snow).

Similarly, the first and the second subjective user states of the first and second users may, in some instances, be the same or similar type of subjective user states (e.g., the first and second both feeling happy). In other situations, they may not be the same or similar type of subjective user state. For example, the first user may have had a very bad upset stomach (e.g., first subjective user state) after eating spicy food while the second user may only have had a mild upset stomach or no upset stomach after eating spicy food. In such a scenario, this may indicate a weaker correlation between spicy foods and upset stomachs.

As will be further described herein a sequential pattern, in some implementations, may merely indicate or represent the temporal relationship or relationships between at least one subjective user state associated with a user and at least one objective occurrence (e.g., whether the incidence or occurrence of the at least one subjective user state occurred before, after, or at least partially concurrently with the incidence of the at least one objective occurrence). In alternative implementations, and as will be further described herein, a sequential pattern may indicate a more specific time relationship between incidences of one or more subjective user states associated with a user and incidences of one or more objective occurrences. For example, a sequential pattern may represent the specific pattern of events (e.g., one or more objective occurrences and one or more subjective user states) that occurs along a timeline.

The following illustrative example is provided to describe how a sequential pattern associated with at least one subjective user state associated with a user and at least one objective occurrence may be determined based, at least in part, on the temporal relationship between the incidence of the at least one subjective user state and the incidence of the at least one objective occurrence in accordance with some embodiments. For these embodiments, the determination of a sequential pattern may initially involve determining whether the incidence of the at least one subjective user state occurred within some predefined time increments of the incidence of the one objective occurrence. That is, it may be possible to infer that those subjective user states that did not occur within a certain time period from the incidence of an objective occurrence are not related or are unlikely related to the incidence of that objective occurrence.

For example, suppose a user during the course of a day eats a banana and also has a stomach ache sometime during the course of the day. If the consumption of the banana occurred in the early morning hours but the stomach ache did not occur until late that night, then the stomach ache may be unrelated to the consumption of the banana and may be disregarded. On the other hand, if the stomach ache had occurred within some predefined time increment, such as within 2 hours of consumption of the banana, then it may be concluded that there may be a link between the stomach ache and the consumption of the banana. If so, a temporal relationship between the consumption of the banana and the occurrence of the stomach ache may be determined. Such a temporal relationship may be represented by a sequential pattern that may simply indicate that the stomach ache (e.g., a subjective user state) occurred after (rather than before or concurrently with) the consumption of banana (e.g., an objective occurrence).

As will be further described herein, other factors may also be referenced and examined in order to determine a sequential pattern and whether there is a relationship (e.g., causal relationship) between an objective occurrence and a subjective user state. These factors may include, for example, historical data (e.g., historical medical data such as genetic data or past history of the user or historical data related to the general population regarding stomach aches and bananas). Alternatively, a sequential pattern may be determined for multiple subjective user states associated with a single user and multiple objective occurrences. Such a sequential pattern may particularly map the exact temporal or time sequencing of various events (e.g., subjective user states and/or objective occurrences). The determined sequential pattern may then be used to provide useful information to the user and/or third parties.

The following is another illustrative example of how subjective user state data may be correlated with objective occurrence data by determining multiple sequential patterns and comparing the sequential patterns with each other. Suppose, for example, a first user such as a microblogger reports that the first user ate a banana. The consumption of the banana, in this example, is a reported first objective occurrence associated with the first user. The first user then reports that 15 minutes after eating the banana, the user felt very happy. The reporting of the emotional state (e.g., felt very happy) is, in this example, a reported first subjective user state associated with the first user. Thus, the reported incidence of the first objective occurrence (e.g., eating the banana) and the reported incidence of the first subjective user state (user felt very happy) may be represented by a first sequential pattern.

A second user reports that the second user also ate a banana (e.g., a second objective occurrence). The second user then reports that 20 minutes after eating the banana, the user felt somewhat happy (e.g., a second subjective user state associated with the second user). Thus, the reported incidence of the second objective occurrence (e.g., eating the banana by the second user) and the reported incidence of the second subjective user state (second user felt somewhat happy) may then be represented by a second sequential pattern. Note that in this example, the occurrences of the first subjective user state associated with the first user and the second subjective user state associated with the second user may be indicated by subjective user state data while the occurrences of the first objective occurrence and the second objective occurrence may be indicated by objective occurrence data.

By comparing the first sequential pattern with the second sequential pattern, the subjective user state data may be correlated with the objective occurrence data. In some implementations, the comparison of the first sequential pattern with the second sequential pattern may involve trying to match the first sequential pattern with the second sequential pattern by examining certain attributes and/or metrics. For example, comparing the first subjective user state (e.g., the first user felt very happy) of the first sequential pattern with the second subjective user state (e.g., the second user felt somewhat happy) of the second sequential pattern to see if they at least substantially match or are contrasting (e.g., being very happy in contrast to being slightly happy or being happy in contrast to being sad). Similarly, comparing the first objective occurrence (e.g., the first user eating a banana) of the first sequential pattern may be compared to the second objective occurrence (e.g., the second user eating a banana) of the second sequential pattern to determine whether they at least substantially match or are contrasting.

A comparison may also be made to see if the extent of time difference (e.g., 15 minutes) between the first subjective user state (e.g., first user being very happy) and the first objective occurrence (e.g., first user eating a banana) matches or are at least similar to the extent of time difference (e.g., 20 minutes) between the second subjective user state (e.g., second user being somewhat happy) and the second objective occurrence (e.g., second user eating a banana). These comparisons may be made in order to determine whether the first sequential pattern matches the second sequential pattern. A match or substantial match would suggest, for example, that a subjective user state (e.g., happiness) is linked to an objective occurrence (e.g., consumption of banana).

As briefly described above, the comparison of the first sequential pattern with the second sequential pattern may include a determination as to whether, for example, the respective subjective user states and the respective objective occurrences of the sequential patterns are contrasting subjective user states and/or contrasting objective occurrences. For example, suppose in the above example the first user had reported that the first user had eaten a whole banana and felt very energetic (e.g., first subjective user state) after eating the whole banana (e.g., first objective occurrence). Suppose that the second user reports eating a half a banana instead of a whole banana and only felt slightly energetic (e.g., second subjective user state) after eating the half banana (e.g., second objective occurrence). In this scenario, the first sequential pattern (e.g., first user feeling very energetic after eating a whole banana) may be compared to the second sequential pattern (e.g., second user feeling slightly energetic after eating only a half of a banana) to at least determine whether the first subjective user state (e.g., first user being very energetic) and the second subjective user state (e.g., second user being slightly energetic) are contrasting subjective user states. Another determination may also be made during the comparison to determine whether the first objective occurrence (first user eating a whole banana) is in contrast with the second objective occurrence (e.g., second user eating a half of a banana).

In doing so, an inference may be made that eating a whole banana instead of eating only a half of a banana makes a user happier or eating more banana makes a user happier. Thus, the word "contrasting" as used here with respect to subjective user states refers to subjective user states that are the same type of subjective user states (e.g., the subjective user states being variations of a particular type of subjective user states such as variations of subjective mental states). Thus, for example, the first subjective user state and the second subjective user state in the previous illustrative example are merely variations of subjective mental states (e.g., happiness). Similarly, the use of the word "contrasting" as used here with respect to objective occurrences refers to objective states that are the same type of objective occurrences (e.g., consumption of a food item such as a banana).

As those skilled in the art will recognize, a stronger correlation between subjective user state data and objective occurrence data may be obtained if a greater number of sequential patterns (e.g., if there was a third sequential pattern associated with a third user, a fourth sequential pattern associated with a fourth user, and so forth) that indicated that a user becomes happy or happier whenever a user eats a banana) are used as a basis for the correlation. Note that for ease of explanation and illustration, each of the exemplary sequential patterns to be described herein will be depicted as a sequential pattern associated with incidence of a single subjective user state and incidence of a single objective occurrence. However, those skilled in the art will recognize that a sequential pattern, as will be described herein, may also be associated with incidences of multiple objective occurrences and/or multiple subjective user states. For example, suppose a user had reported that after eating a banana, he had gulped down a can of soda. The user then reports that he became happy but had an upset stomach. In this example, the sequential pattern associated with this scenario will be associated with two objective occurrences (e.g., eating a banana and drinking a can of soda) and two subjective user states (e.g., user having an upset stomach and feeling happy).

In some embodiments, and as briefly described earlier, the sequential patterns derived from subjective user state data and objective occurrence data may be based on temporal relationships between objective occurrences and subjective user states. For example, whether a subjective user state occurred before, after, or at least partially concurrently with an objective occurrence. For instance, a plurality of sequential patterns derived from subjective user state data and objective occurrence data may indicate that a user always has a stomach ache (e.g., subjective user state) after eating a banana (e.g., first objective occurrence).

Figure 1B:
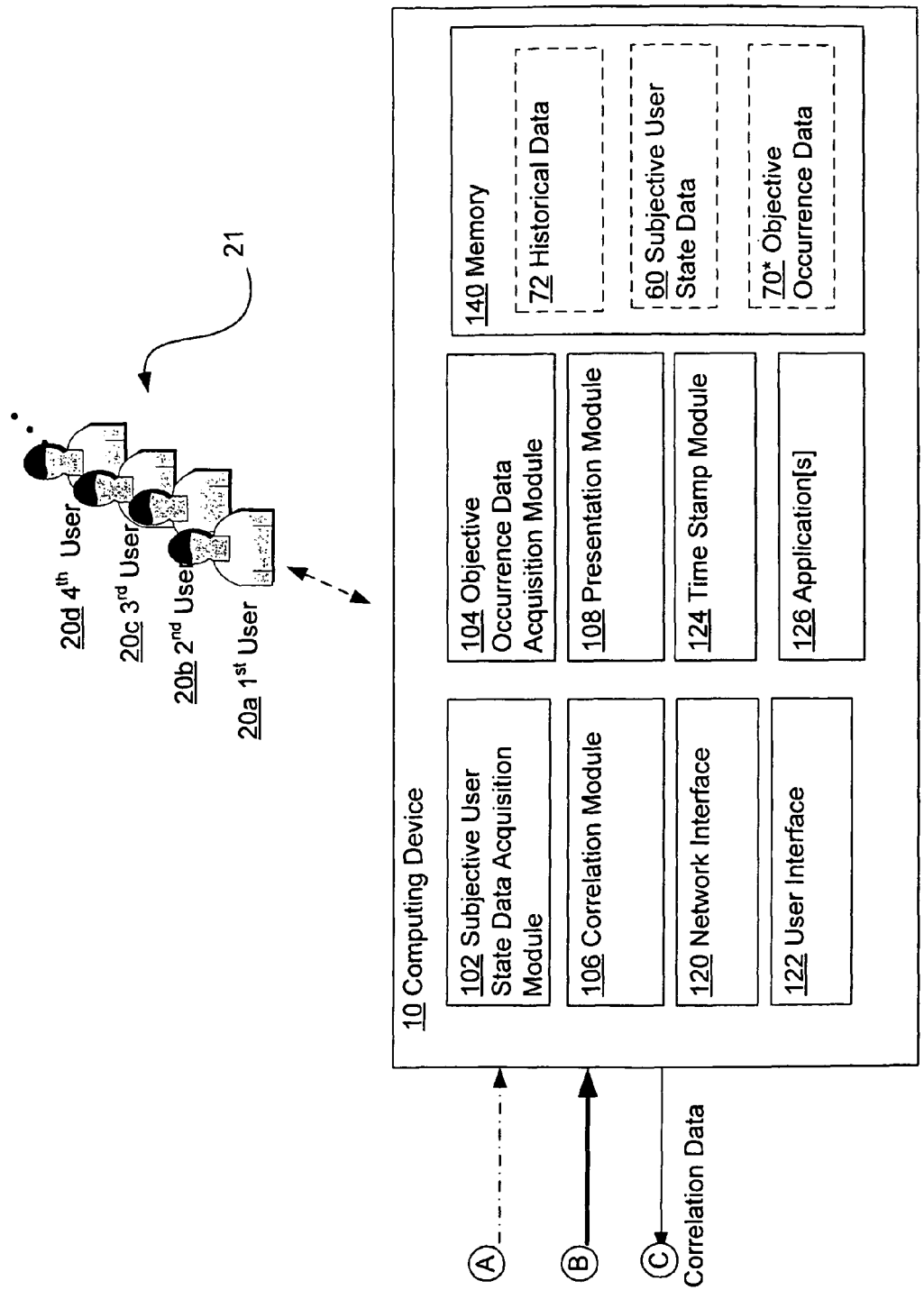

FIGS. 1a and 1b illustrate an example environment in accordance with various embodiments. In the illustrated environment, an exemplary system 100 may include at least a computing device 10 (see FIG. 1b) that may be employed in order to, among other things, collect subjective user state data 60 and objective occurrence data 70*, and to correlate the subjective user state data 60 with the objective occurrence data 70*. Note that in the following, "*" indicates a wildcard. Thus, user 20* may represent a first user 20a, a second user 20b, a third user 20c, a fourth user 20d, and/or other users 20* as illustrated in FIGS. 1a and 1b.

In some embodiments, the computing device 10 may be a network server in which case the computing device 10 may communicate with a plurality of users 20* via mobile devices 30* and through a wireless and/or wired network 40. A network server, as will be described herein, may be in reference to a network server located at a single network site or located across multiple network sites or a conglomeration of servers located at multiple network sites. A mobile device 30* may be a variety of computing/communication devices including, for example, a cellular phone, a personal digital assistant (PDA), a laptop, a desktop, or other types of computing/communication device that can communicate with the computing device 10.

In alternative embodiments, the computing device 10 may be a local computing device such as a client device that communicates directly with one or more users 20* as indicated by ref 21 as illustrated in FIG. 1b. For these embodiments, the computing device 10 may be any type of handheld device such as a cellular telephone or a PDA, or other types of computing/communication devices such as a laptop computer, a desktop computer, a workstation, and so forth. In certain embodiments, the computing device 10 may be a peer-to-peer network component device. In some embodiments, the computing device 10 may operate via a web 2.0 construct.

In embodiments where the computing device 10 is a server, the computing device 10 may obtain subjective user state data 60 indirectly from one or more users 20* via a network interface 120. Alternatively, the subjective user state data 60 may be received from one or more third party sources 50 such as other network servers. In still other embodiments, subjective user state data 60 may be retrieved from a memory 140. In embodiments in which the computing device 10 is a local device rather than a server, the subjective user state data 60 may be directly obtained from one or more users 20* via a user interface 122. As will be further described herein, the computing device 10 may acquire the objective occurrence data 70* from one or more sources.

For ease of illustration and explanation, the following systems and operations to be described herein will be generally described in the context of the computing device 10 being a network server. However, those skilled in the art will recognize that these systems and operations may also be implemented when the computing device 10 is a local device such as a handheld device that may communicate directly with one or more users 20*.

Assuming that the computing device 10 is a server, the computing device 10, in some implementations, may be configured to acquire subjective user state data 60 including data indicating incidence of at least a first subjective user state 60a associated with a first user 20a and data indicating incidence of at least a second subjective user state 60b associated with a second user 20b via mobile devices 30a and 30b and through wireless and/or wired networks 40. In some embodiments, the subjective user state data 60 may further include data indicating incidence of at least a third subjective user state 60c associated with a third user 20c, data indicating incidence of at least a fourth subjective user state 60d associated with a fourth user 20d, and so forth.

In various embodiments, the data indicating incidence of at least a first subjective user state 60a associated with a first user 20a, as well as the data indicating incidence of at least a second subjective user state 60b associated with a second user 20b may be acquired in the form of blog entries, such as microblog entries, status reports (e.g., social networking status reports), electronic messages (email, text messages, instant messages, etc.) or other types of electronic messages or documents. The data indicating the incidence of at least a first subjective user state 60a and the data indicating the incidence of at least a second subjective user state 60b may, in some instances, indicate the same, contrasting, or completely different subjective user states. Examples of subjective user states that may be indicated by the subjective user state data 60 include, for example, subjective mental states of a user 20* (e.g., a user 20* is sad or angry), subjective physical states of a user 20* (e.g., physical or physiological characteristic of a user 20* such as the presence or absence of a stomach ache or headache), and/or subjective overall states of a user 20* (e.g., a user 20* is "well" or any other subjective states that may not be classified as a subjective physical state or a subjective mental state).

The computing device 10 may be further configured to acquire objective occurrence data 70* from one or more sources. In various embodiments, the objective occurrence data 70* acquired by the computing device 10 may include data indicative of at least one objective occurrence. In some embodiments, the objective occurrence data 70* may include at least data indicating incidence of at least a first objective occurrence and data indicating incidence of at least a second objective occurrence, wherein the first and the second objective occurrence may or may not be the same objective occurrence (e.g., stormy weather on a particular day that may affect multiple users 20*). In some embodiments, the first objective occurrence may be associated with the first user 20*a* (e.g., physical characteristic of the first user 20*a*) while the second objective occurrence may be associated with the second user 20*b*. (e.g., physical characteristic of the second user 20*b*).

The objective occurrence data 70* may be acquired from various sources. For example, in some embodiments, objective occurrence data 70*a* may be acquired from one or more third party sources 50 (e.g., one or more third parties). Examples of third party sources 50 include, for example, network servers and other network devices associated with third parties. Examples of third parties include, for example, other users 20*, a health care provider, a hospital, a place of employment, a content provider, and so forth.

In some embodiments, objective occurrence data 70*b* may be acquired from one or more sensors 35 for sensing or monitoring various aspects associated with one or more users 20*. For example, in some implementations, sensors 35 may include a global positioning system (GPS) device for determining the locations of one or more users 20* or a physical activity sensor for measuring physical activities of one or more users 20*. Examples of a physical activity sensor include, for example, a pedometer for measuring physical activities of one or more users 20*. In certain implementations, the one or more sensors 35 may include one or more physiological sensor devices for measuring physiological characteristics of one or more user s20*. Examples of physiological sensor devices include, for example, a blood pressure monitor, a heart rate monitor, a glucometer, and so forth. In some implementations, the one or more sensors 35 may include one or more image capturing devices such as a video or digital camera.

In some embodiments, objective occurrence data 70*c* may be acquired from one or more users 20* via one or more mobile devices 30*. For these embodiments, the objective occurrence data 70*c* may be in the form of blog entries (e.g., microblog entries), status reports, or other types of electronic messages that may be generated by one or more users 20*. In various implementations, the objective occurrence data 70*c* acquired from one or more users 20* may indicate, for example, activities (e.g., exercise or food or medicine intake) performed by one or more users 20*, certain physical characteristics (e.g., blood pressure or location) associated with one or more users 20*, or other aspects associated with one or more users 20* that the one or more users 20* can report objectively. In still other implementations, objective occurrence data 70* may be acquired from a memory 140.

After acquiring the subjective user state data 60 and the objective occurrence data 70*, the computing device 10 may be configured to correlate the acquired subjective user data 60 with the acquired objective occurrence data 70* based, at least in part, on a determination of multiple sequential patterns including at least a first sequential pattern and a second sequential pattern. The first sequential pattern being a sequential pattern of at least the first subjective user state and at least the first objective occurrence, and the second sequential pattern being a sequential pattern of at least the second subjective user state and at least the second objective occurrence, the first subjective user state being associated with the first user 20*a* and the second subjective user state being associated with the second user 20*b*. The determined sequential patterns may then be compared to each other in order to correlate the subjective user state data 60 with the objective occurrence data 70*.

In some embodiments, and as will be further indicated in the operations and processes to be described herein, the computing device 10 may be further configured to present one or more results of the correlation operation. In various embodiments, one or more correlation results 80 may be presented to one or more users 20* and/or to one or more third parties (e.g., one or more third party sources 50) in various alternative forms. The one or more third parties may be other users 20* such as other microbloggers, health care providers, advertisers, and/or content providers.

As illustrated in FIG. 1*b*, computing device 10 may include one or more components or sub-modules. For instance, in various implementations, computing device 10 may include a subjective user state data acquisition module 102, an objective occurrence data acquisition module 104, a correlation module 106, a presentation module 108, a network interface 120, a user interface 122, one or more applications 126, and/or memory 140. The functional roles of these components/modules will be described in the processes and operations to be described herein.

Figure 2A:
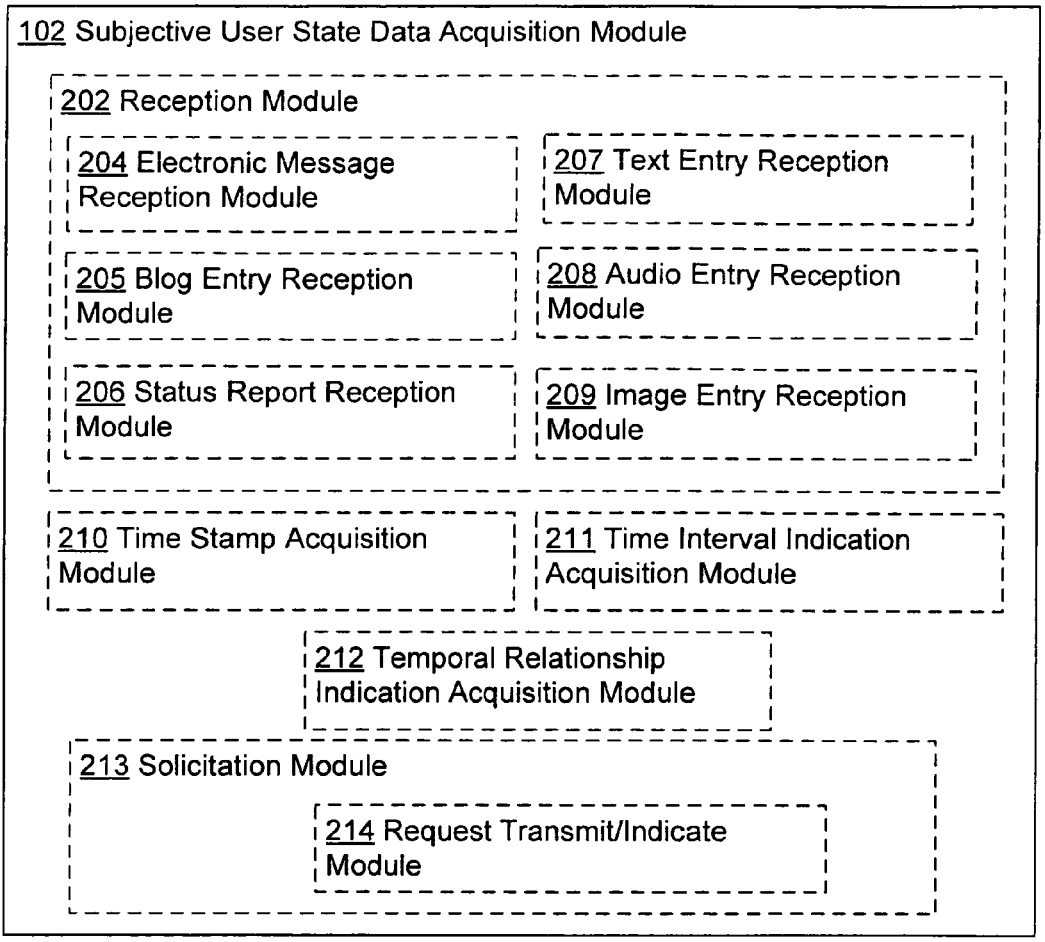
FIG. 2a shows another perspective of the subjective user state data acquisition module 102 of the computing device 10 of FIG. 1b.

FIG. 2*a* illustrates particular implementations of the subjective user state data acquisition module 102 of the computing device 10 of FIG. 1*b*. In brief, the subjective user state data acquisition module 102 may be designed to, among other things, acquire subjective user state data 60 including at least data indicating incidence of at least a first subjective user state 60*a* associated with a first user 20*a* and data indicating incidence of at least a second subjective user state 60*b* associated with a second user 20*b*. As further illustrated, the subjective user state data acquisition module 102, in various embodiments, may include a reception module 202 designed to, among other things, receive subjective user state data 60 including receiving one, or both, of the data indicating incidence of at least a first subjective user state 60*a* and the data indicating incidence of at least a second subjective user state 60*b*. In various embodiments, the reception module 202 may be configured to receive the subjective user state data 60 via a network interface 120 (e.g., network interface card or NIC) and/or via a user interface 122 (e.g., a display monitor, a keyboard, a touch screen, a mouse, a keypad, a microphone, a camera, and/or other interface devices).

In some implementations, the reception module 202 may further include an electronic message reception module 204, a blog entry reception module 205, a status report reception module 206, a text entry reception module 207, an audio entry reception module 208, and/or an image entry reception module 209. In brief, and as will be further described in the processes and operations to be described herein, the electronic message reception module 204 may be configured to acquire subjective user state data 60 including one, or both, of the data indicating incidence of at least a first subjective user state 60*a* and the data indicating incidence of at least a second subjective user state 60*b* in the form of one or more electronic messages (e.g., text message, email, and so forth).

In contrast, the blog entry reception module 205 may be configured to receive subjective user state data 60 including one, or both, of the data indicating incidence of at least a first subjective user state 60*a* and the data indicating incidence of at least a second subjective user state 60*b* in the form of one or more blog entries (e.g., microblog entries). The status report reception module 206 may be configured to receive subjective user state data 60 including one, or both, of the data indicating incidence of at least a first subjective user state 60*a* and the data indicating incidence of at least a second subjective user state 60*b* via one or more status reports (e.g., social networking status reports).

The text entry reception module 207 may be configured to receive subjective user state data 60 including one, or both, of the data indicating incidence of at least a first subjective user state 60*a* and the data indicating incidence of at least a second subjective user state 60*b* via one or more text entries. The audio entry reception module 208 may be configured to receive subjective user state data 60 including one, or both, of the data indicating incidence of at least a first subjective user state 60*a* and the data indicating incidence of at least a second subjective user state 60*b* via one or more audio entries (e.g., audio recordings of user voice). The image entry reception module 209 may be configured to receive subjective user state data 60 including one, or both, of the data indicating incidence of at least a first subjective user state 60*a* and the data indicating incidence of at least a second subjective user state 60*b* via one or more image entries (e.g., digital still or motion images showing, for example, one or more gestures made by one or more users 20* and/or one or more facial expressions of one or more users 20*****).

In some embodiments, the subjective user state data acquisition module 102 may include a time stamp acquisition module 210 designed to acquire (e.g., by receiving or by self-generating) one or more time stamps associated with incidences of one or more subjective user states associated with one or more users 20*. In some embodiments, the subjective user state data acquisition module 102 may include a time interval indication acquisition module 211 designed to acquire (e.g., by receiving or by self-generating) one or more indications of time intervals associated with incidences of one or more subjective user states associated with one or more users 20***. In some embodiments, the subjective user state data acquisition module 102 may include a temporal relationship indication acquisition module 212 designed to acquire (e.g., by receiving or by self-generating) one or more indications of temporal relationships associated with incidences of one or more subjective user states associated with one or more users 20*****.

In some embodiments, the subjective user state data acquisition module 102 may include a solicitation module 213 configured to solicit subjective user state data 60 including soliciting at least one, or both, of the data indicating incidence of at least a first subjective user state 60*a* and data indicating incidence of at least a second subjective user state 60*b*. In various embodiments, the solicitation module 213 may solicit the subjective user state data 60 from one or more users 20* via a network interface 120 (e.g., in the case where the computing device 10 is a network server) or via a user interface 122 (e.g., in the case where the computing device 10 is a local device used directly by a user 20***b*). In some alternative implementations, the solicitation module 213 may solicit the subjective user state data 60 from one or more third party sources 50 (e.g., network servers associated with third parties).

In some embodiments, the solicitation module 213 may include a request transmit/indicate module 214 configured to transmit (e.g., via network interface 120) and/or to indicate (e.g., via a user interface 122) a request for subjective user state data 60 including requesting for at least one, or both, of the data indicating incidence of at least a first subjective user state 60*a* and data indicating incidence of at least a second subjective user state 60*b*. In some implementations, the solicitation of the subjective user state data 60 may involve requesting a user 20* to select one or more subjective user states from a list of alternative subjective user state options (e.g., a user 20*** may choose at least one from a choice of "I'm feeling alert," "I'm feeling sad," "My back is hurting," "I have an upset stomach," and so forth). In certain embodiments, the request to select from a list of alternative subjective user state options may mean requesting a user 20***** to select one subjective user state from at least two contrasting subjective user state options (e.g., "I'm feeling good" or "I'm feeling bad").

Figure 2B:
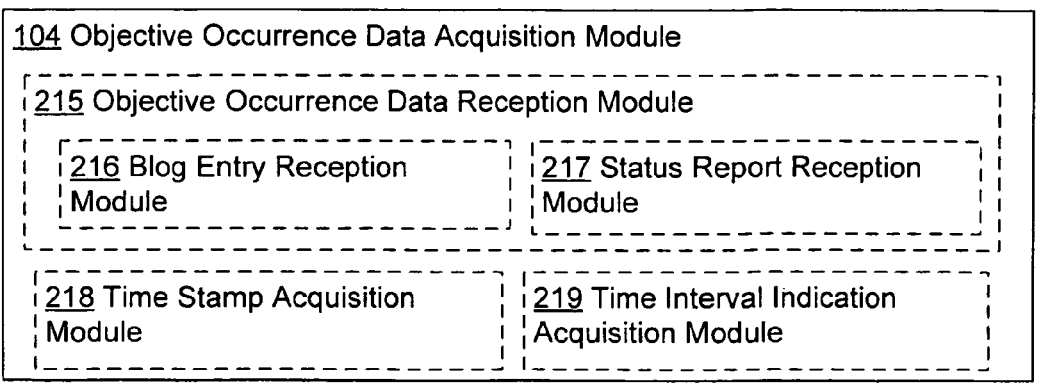
FIG. 2b shows another perspective of the objective occurrence data acquisition module 104 of the computing device 10 of FIG. 1b.

Referring now to FIG. 2*b* illustrating particular implementations of the objective occurrence data acquisition module 104 of the computing device 10 of FIG. 1*b*. In various implementations, the objective occurrence data acquisition module 104 may be configured to acquire (e.g., receive, solicit, and/or retrieve from a user 20*, one or more third party sources 50, one or more sensors 35, and/or a memory 140) objective occurrence data 70*** including data indicative of incidences of one or more objective occurrences that may be directly or indirectly associated with one or more users 20***. Note that an objective occurrence such as the incidence of a particular physical characteristic of a user 20*** may be directly associated with the user 20*** while an objective occurrence such as the local weather on a particular day may be indirectly associated with a user 20***. In some embodiments, the objective occurrence data acquisition module 104 may include an objective occurrence data reception module 215 configured to receive (e.g., via network interface 120 or via user interface 122) objective occurrence data 70*** including receiving at least data indicating incidence of at least a first objective occurrence and data indicating incidence of at least a second objective occurrence. In some situations, the first objective occurrence and the second objective occurrence may be the same objective occurrence (e.g., local weather that may affect multiple users 20*****).

In various embodiments, the objective occurrence data reception module 215 may include a blog entry reception module 216 and/or a status report reception module 217. The blog entry reception module 216 may be designed to receive (e.g., via a network interface 120 or via a user interface 122) the objective occurrence data 70* including receiving one, or both, of the data indicating incidence of at least a first objective occurrence and the data indicating incidence of at least a second objective occurrence in the form of one or more blog entries (e.g., microblog entries). Such blog entries may be generated by one or more users 20*** or by one or more third party sources 50**.

In contrast, the status report reception module 217 may be designed to receive (e.g., via a network interface 120 or via a user interface 122) the objective occurrence data 70* including receiving one, or both, of the data indicating incidence of at least a first objective occurrence and the data indicating incidence of at least a second objective occurrence in the form of one or more status reports (e.g., social networking status reports). Such status reports may be provided by one or more users 20*** or by one or more third party sources 50. Although not depicted, the objective occurrence data acquisition module 104 may additionally include an electronic message reception module for receiving the objective occurrence data 70\*** via one or more electronic messages (e.g., email, text message, and so forth).

In the same or different embodiments, the objective occurrence data acquisition module 104 may include a time stamp acquisition module 218 for acquiring (e.g., either by receiving or self-generating) one or more time stamps associated with one or more objective occurrences. In the same or different implementations, the objective occurrence data acquisition module 104 may include a time interval indication acquisition module 219 for acquiring (e.g., either by receiving or self-generating) indications of one or more time intervals associated with one or more objective occurrences. Although not depicted, in some implementations, the objective occurrence data acquisition module 104 may include a temporal relationship indication acquisition module for acquiring indications of temporal relationships associated with objective occurrences (e.g., indications that objective occurrences occurred before, after, or at least partially concurrently with incidences of subjective user states).

Figure 2C:
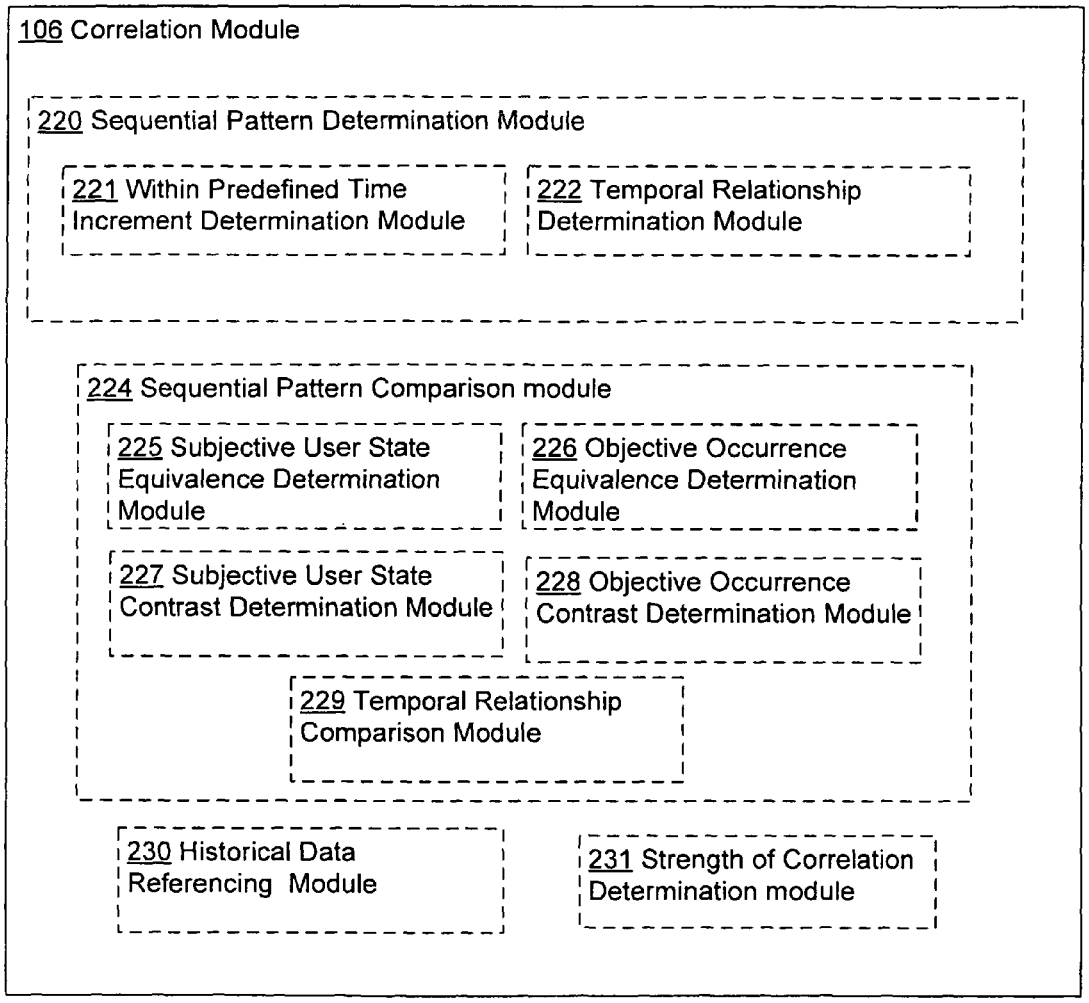
FIG. 2c shows another perspective of the correlation module 106 of the computing device 10 of FIG. 1b.

Turning now to FIG. 2c illustrating particular implementations of the correlation module 106 of the computing device 10 of FIG. 1b. The correlation module 106 may be configured to, among other things, correlate subjective user state data 60 with objective occurrence data 70\* based, at least in part, on a determination of at least one sequential pattern of at least a first objective occurrence and at least a first subjective user state associated with a first user 20a. In various embodiments, the correlation module 106 may include a sequential pattern determination module 220 configured to determine one or more sequential patterns, where each sequential pattern is associated with at least one subjective user state of at least one user 20\* and at least one objective occurrence.

The sequential pattern determination module 220, in various implementations, may include one or more sub-modules that may facilitate in the determination of one or more sequential patterns. As depicted, the one or more sub-modules that may be included in the sequential pattern determination module 220 may include, for example, a "within predefined time increment determination" module 221 and/or a temporal relationship determination module 222. In brief, the within predefined time increment determination module 221 may be configured to determine whether, for example, a subjective user state associated with a user 20\* occurred within a predefined time increment from an incidence of an objective occurrence. For example, determining whether a user 20\* feeling "bad" (i.e., a subjective user state) occurred within ten hours (i.e., predefined time increment) of eating a large chocolate sundae (i.e., an objective occurrence). Such a process may be used in order to determine that reported events, such as objective occurrences and subjective user states, are not or likely not related to each other, or to facilitate in determining the strength of correlation between subjective user states as identified by subjective user state data 60 and objective occurrences as identified by objective occurrence data 70\*.

The temporal relationship determination module 222 may be configured to determine the temporal relationships between one or more subjective user states and one or more objective occurrences. For example, this may entail determining whether a particular subjective user state (e.g., sore back) of a user 20\* occurred before, after, or at least partially concurrently with incidence of an objective occurrence (e.g., sub-freezing temperature).

In various embodiments, the correlation module 106 may include a sequential pattern comparison module 224. As will be further described herein, the sequential pattern comparison module 224 may be configured to compare multiple sequential patterns with each other to determine, for example, whether the sequential patterns at least substantially match each other or to determine whether the sequential patterns are contrasting sequential patterns. In some embodiments, at least two of the sequential patterns to be compared may be associated with different users 20\*. For example, the sequential pattern comparison module 224 may be designed to compare a first sequential pattern of incidence of at least a first subjective user state and incidence of at least a first objective occurrence to a second sequential pattern of incidence of at least a second subjective user state and incidence of at least a second objective occurrence. For these embodiments, the first subjective user state may be a subjective user state associated with a first user 20a and the second subjective user state may be a subjective user state associated with a second user 20b.

As depicted in FIG. 2c, in various implementations, the sequential pattern comparison module 224 may further include one or more sub-modules that may be employed in order to, for example, facilitate in the comparison between different sequential patterns. For example, in various implementations, the sequential pattern comparison module 224 may include one or more of a subjective user state equivalence determination module 225, an objective occurrence equivalence determination module 226, a subjective user state contrast determination module 227, an objective occurrence contrast determination module 228, and/or a temporal relationship comparison module 229.

The subjective user state equivalence determination module 225 may be configured to determine whether subjective user states associated with different sequential patterns are equivalent. For example, the subjective user state equivalence determination module 225 may be designed to determine whether a first subjective user state associated with a first user 20a of a first sequential pattern is equivalent to a second subjective user state associated with a second user 20b of a second sequential pattern. For instance, suppose a first user 20a reports that he had a stomach ache (e.g., first subjective user state) after eating at a particular restaurant (e.g., a first objective occurrence), and suppose further a second user 20b also reports having a stomach ache (e.g., a second subjective user state) after eating at the same restaurant (e.g., a second objective occurrence, then the subjective user state equivalence determination module 225 may be employed in order to compare the first subjective user state (e.g., stomach ache) with the second subjective user state (e.g., stomach ache) to determine whether they are at least equivalent.

In contrast, the objective occurrence equivalence determination module 226 may be configured to determine whether objective occurrences of different sequential patterns are equivalent. For example, the objective occurrence equivalence determination module 226 may be designed to determine whether a first objective occurrence of a first sequential pattern is equivalent to a second objective occurrence of a second sequential pattern. For instance, for the above example the objective occurrence equivalence determination module 226 may compare eating at the particular restaurant by the first user 20a (e.g., first objective occurrence) with eating at the same restaurant (e.g., second objective occurrence) by the second user 20b in order to determine whether the first objective occurrence is equivalent to the second objective occurrence.

In some implementations, the sequential pattern comparison module 224 may include a subjective user state contrast determination module 227, which may be configured to determine whether subjective user states associated with different sequential patterns are contrasting subjective user states. For example, the subjective user state contrast determination module 227 may determine whether a first subjective user state associated with a first user 20*a* of a first sequential pattern is a contrasting subjective user state from a second subjective user state associated with a second user 20*b* of a second sequential pattern. For instance, suppose a first user 20*a* reports that he felt very "good" (e.g., first subjective user state) after jogging for an hour (e.g., first objective occurrence), while a second user 20*b* reports that he felt "bad" (e.g., second subjective user state) when he did not exercise (e.g., second objective occurrence), then the subjective user state contrast determination module 227 may compare the first subjective user state (e.g., feeling good) with the second subjective user state (e.g., feeling bad) to determine that they are contrasting subjective user states.

In some implementations, the sequential pattern comparison module 224 may include an objective occurrence contrast determination module 228 that may be configured to determine whether objective occurrences of different sequential patterns are contrasting objective occurrences. For example, the objective occurrence contrast determination module 228 may determine whether a first objective occurrence of a first sequential pattern is a contrasting objective occurrence from a second objective occurrence of a second sequential pattern. For instance, for the above example, the objective occurrence contrast determination module 228 may be configured to compare the first user 20*a* jogging (e.g., first objective occurrence) with the no jogging or exercise by the second user 20*b* (e.g., second objective occurrence) in order to determine whether the first objective occurrence is a contrasting objective occurrence from the second objective occurrence. Based on the contrast determination, an inference may be made that a user 20* may feel better by jogging rather than by not jogging at all.

In some embodiments, the sequential pattern comparison module 224 may include a temporal relationship comparison module 229, which may be configured to make comparisons between different temporal relationships of different sequential patterns. For example, the temporal relationship comparison module 229 may compare a first temporal relationship between a first subjective user state and a first objective occurrence of a first sequential pattern with a second temporal relationship between a second subjective user state and a second objective occurrence of a second sequential pattern in order to determine whether the first temporal relationship at least substantially matches the second temporal relationship.

For example, suppose in the above example the first user 20*a* eating at the particular restaurant (e.g., first objective occurrence) and the subsequent stomach ache (e.g., first subjective user state) represents a first sequential pattern while the second user 20*b* eating at the same restaurant (e.g., second objective occurrence) and the subsequent stomach ache (e.g., second subjective user state) represents a second sequential pattern. In this example, the occurrence of the stomach ache after (rather than before or concurrently) eating at the particular restaurant by the first user 20*a* represents a first temporal relationship associated with the first sequential pattern while the occurrence of a second stomach ache after (rather than before or concurrently) eating at the same restaurant by the second user 20*b* represents a second temporal relationship associated with the second sequential pattern. Under such circumstances, the temporal relationship comparison module 229 may compare the first temporal relationship to the second temporal relationship in order to determine whether the first temporal relationship and the second temporal relationship at least substantially match (e.g., stomach aches in both temporal relationships occurring after eating at the same restaurant). Such a match may result in the inference that a stomach ache is associated with eating at the particular restaurant.

In some embodiments, the correlation module 106 may include a historical data referencing module 230. For these embodiments, the historical data referencing module 230 may be employed in order to facilitate the correlation of the subjective user state data 60 with the objective occurrence data 70*. For example, in some implementations, the historical data referencing module 230 may be configured to reference historical data 72, which may be stored in a memory 140, in order to facilitate in determining sequential patterns.

For example, in various implementations, the historical data 72 that may be referenced may include, for example, general population trends (e.g., people having a tendency to have a hangover after drinking or ibuprofen being more effective than aspirin for toothaches in the general population), medical information such as genetic, metabolome, or proteome information related to a user 20* (e.g., genetic information of the user 20* indicating that the user 20* is susceptible to a particular subjective user state in response to occurrence of a particular objective occurrence), or historical sequential patterns such as known sequential patterns of the general population or of one or more users 20* (e.g., people tending to have difficulty sleeping within five hours after consumption of coffee). In some instances, such historical data 72 may be useful in associating one or more subjective user states with one or more objective occurrences as represented by, for example, a sequential pattern.

In some embodiments, the correlation module 106 may include a strength of correlation determination module 231 for determining a strength of correlation between subjective user state data 60 and objective occurrence data 70*. In some implementations, the strength of correlation may be determined based, at least in part, on the results provided by the other sub-modules of the correlation module 106 (e.g., the sequential pattern determination module 220, the sequential pattern comparison module 224, and their sub-modules).

Figure 2D:
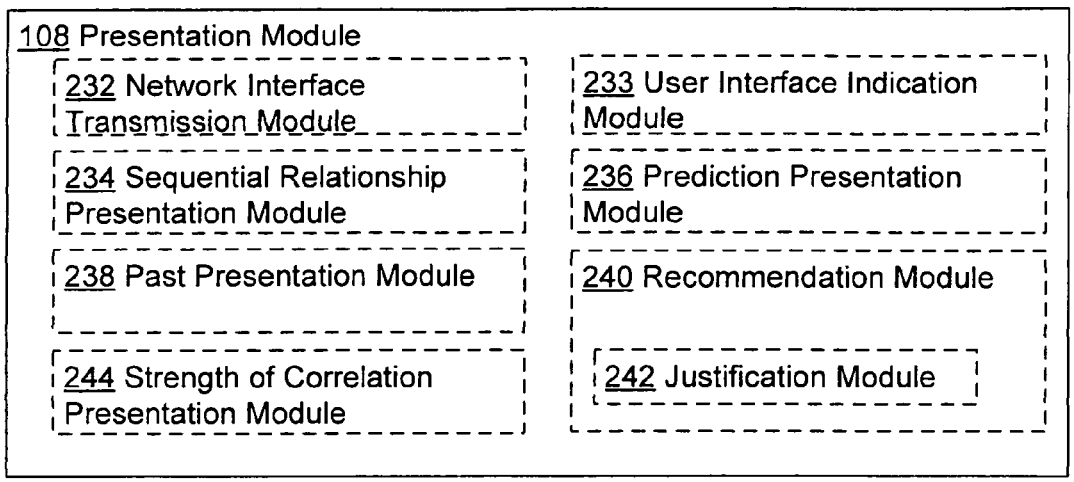
FIG. 2d shows another perspective of the presentation module 108 of the computing device 10 of FIG. 1b.

FIG. 2*d* illustrates particular implementations of the presentation module 108 of the computing device 10 of FIG. 1*b*. In various implementations, the presentation module 108 may be configured to present one or more results of the correlation operations performed by the correlation module 106. In some embodiments, the presentation of the one or more results of the correlation operations may be by transmitting the results via a network interface 120 or by indicating the results via a user interface 122. The one or more results of the correlation operations may be presented in a variety of different forms in various alternative embodiments. For example, in some implementations this may entail the presentation module 108 presenting to the user 20* an indication of a sequential relationship between a subjective user state and an objective occurrence associated with a user 20* (e.g., "whenever you eat a banana, you have a stomach ache"). In alternative implementations, other ways of presenting the results of the correlation may be employed. For example, in various alternative implementations, a notification may be provided to notify past tendencies or patterns associated with a user 20*. In some implementations, a notification of a possible future outcome may be provided. In other implementations, a recommendation for a future course of action based on past patterns may be provided. These and other ways of presenting the correlation results will be described in the processes and operations to be described herein.

In various implementations, the presentation module 108 may include a network interface transmission module 232 for transmitting one or more results of the correlation performed by the correlation module 106. For example, in the case where the computing device 10 is a server, the network interface transmission module 232 may be configured to transmit to one or more users 20* or to a third party (e.g., third party sources 50) the one or more results of the correlation performed by the correlation module 106 via a network interface 120.

In the same or different implementations, the presentation module 108 may include a user interface indication module 233 for indicating via a user interface 122 the one or more results of the correlation operations performed by the correlation module 106. For example, in the case where the computing device 10 is a local device, the user interface indication module 233 may be configured to indicate, via user interface 122 such as a display monitor and/or an audio system, the one or more results of the correlation performed by the correlation module 106.

In some implementations, the presentation module 108 may include a sequential relationship presentation module 234 configured to present an indication of a sequential relationship between at least one subjective user state and at least one objective occurrence. In some implementations, the presentation module 108 may include a prediction presentation module 236 configured to present a prediction of a future subjective user state associated with a user 20* resulting from a future objective occurrence. In the same or different implementations, the prediction presentation module 236 may also be designed to present a prediction of a future subjective user state associated with a user 20* resulting from a past objective occurrence. In some implementations, the presentation module 108 may include a past presentation module 238 that is designed to present a past subjective user state associated with a user 20* in connection with a past objective occurrence.

In some implementations, the presentation module 108 may include a recommendation module 240 that is configured to present a recommendation for a future action based, at least in part, on the results of a correlation of the subjective user state data 60 with the objective occurrence data 70* performed by the correlation module 106. In certain implementations, the recommendation module 240 may further include a justification module 242 for presenting a justification for the recommendation presented by the recommendation module 240. In some implementations, the presentation module 108 may include a strength of correlation presentation module 244 for presenting an indication of a strength of correlation between subjective user state data 60 and objective occurrence data 70*.

As will be further described herein, in some embodiments, the presentation module 108 may be prompted to present the one or more results of a correlation operation performed by the correlation module 106 in response to a reporting of one or more events, objective occurrences, and/or subjective user states.

As briefly described earlier, in various embodiments, the computing device 10 may include a network interface 120 that may facilitate in communicating with a remotely located user 20* and/or one or more third parties. For example, in embodiments whereby the computing device 10 is a server, the computing device 10 may include a network interface 120 that may be configured to receive from a user 20* subjective user state data 60. In some embodiments, objective occurrence data 70a, 70b, or 70c may also be received through the network interface 120. Examples of a network interface 120 includes, for example, a network interface card (NIC).

The computing device 10, in various embodiments, may also include a memory 140 for storing various data. For example, in some embodiments, memory 140 may be employed in order to store subjective user state data 60 of one or more users 20* including data that may indicate one or more past subjective user states of one or more users 20* and objective occurrence data 70* including data that may indicate one or more past objective occurrences. In some embodiments, memory 140 may store historical data 72 such as historical medical data of one or more users 20* (e.g., genetic, metoblome, proteome information), population trends, historical sequential patterns derived from general population, and so forth.

In various embodiments, the computing device 10 may include a user interface 122 to communicate directly with a user 20b. For example, in embodiments in which the computing device 10 is a local device, the user interface 122 may be configured to directly receive from the user 20b subjective user state data 60. The user interface 122 may include, for example, one or more of a display monitor, a touch screen, a key board, a key pad, a mouse, an audio system, an imaging system including a digital or video camera, and/or other user interface devices.

Figure 2E:
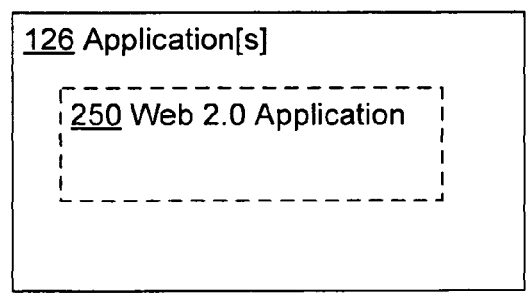
FIG. 2e shows another perspective of the one or more applications 126 of the computing device 10 of FIG. 1b.

FIG. 2e illustrates particular implementations of the one or more applications 126 of FIG. 1b. For these implementations, the one or more applications 126 may include, for example, communication applications such as a text messaging application and/or an audio messaging application including a voice recognition system application. In some implementations, the one or more applications 126 may include a web 2.0 application 250 to facilitate communication via, for example, the World Wide Web.

The functional roles of the various components, modules, and sub-modules of the computing device 10 presented thus far will be described in greater detail with respect to the processes and operations to be described herein. Note that the subjective user state data 60 may be in a variety of forms including, for example, text messages (e.g., blog entries, microblog entries, instant messages, email messages, and so forth), audio messages, and/or image files (e.g., an image capturing user's facial expression or user gestures).

Figure 3:
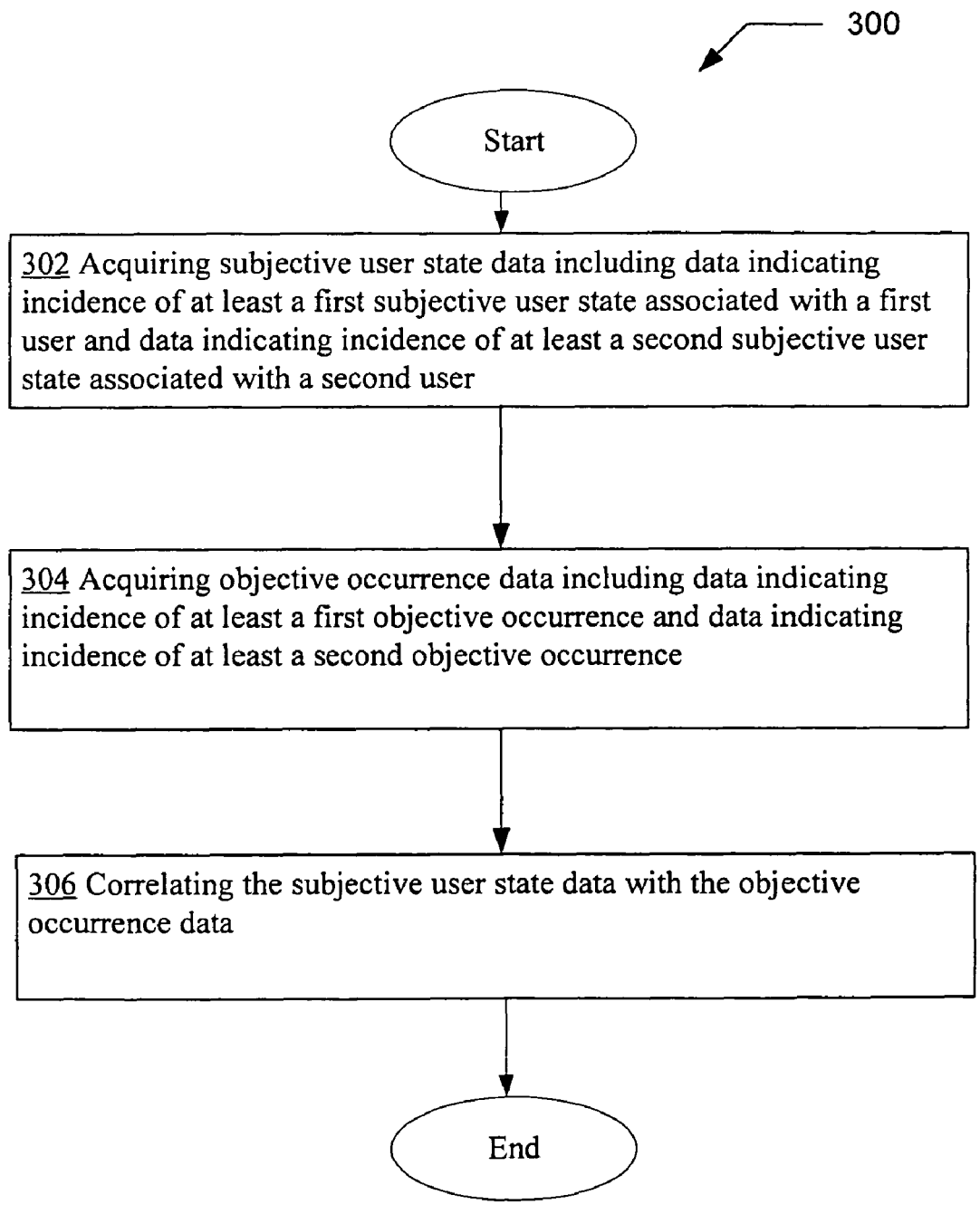
FIG. 3 is a high-level logic flowchart of a process.

FIG. 3 illustrates an operational flow 300 representing example operations related to acquisition and correlation of subjective user state data including data indicating incidences of subjective user states associated with multiple users 20* and objective occurrence data 70* including data indicating incidences of one or more objective occurrences in accordance with various embodiments. In some embodiments, the operational flow 300 may be executed by, for example, the computing device 10 of FIG. 1b.

In FIG. 3 and in the following figures that include various examples of operational flows, discussions and explanations may be provided with respect to the above-described exemplary environment of FIGS. 1a and 1b, and/or with respect to other examples (e.g., as provided in FIGS. 2a-2e) and contexts. However, it should be understood that the operational flows may be executed in a number of other environments and contexts, and/or in modified versions of FIGS. 1a, 1b, and 2a-2e. Also, although the various operational flows are presented in the sequence(s) illustrated, it should be understood that the various operations may be performed in other orders than those which are illustrated, or may be performed concurrently.

Further, in FIG. 3 and in following figures, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 300 may move to a subjective user state data acquisition operation 302 for acquiring subjective user state data including data indicating incidence of at least a first subjective user state associated with a first user and data indicating incidence of at least a second subjective user state associated with a second user. For instance, the subjective user state data acquisition module 102 of the computing device 10 of FIG. 1b acquiring (e.g., receiving via network interface 120 or via user interface 122 or retrieving from memory 140) subjective user state data 60 including data indicating incidence of at least a first subjective user state 60a (e.g., a subjective mental state, a subjective physical state, or a subjective overall state) associated with a first user 20a and data indicating incidence of at least a second subjective user state 60b associated with a second user 20b. Note that and as will be described herein, the first subjective user state associated with the first user 20a and the second subjective user state associated with the second user 20b may be the same or different subjective user states. For example, both the first user 20a and the second user 20b feeling "sad." Alternatively, the first subjective user state associated with the first user 20a may be the first user 20a feeling "happy," while the second subjective user state associated with the second user 20b may be the second user 20b feeling "sad" or some other subjective user state.

Operational flow 300 may also include an objective occurrence data acquisition operation 304 for acquiring objective occurrence data including data indicating incidence of at least a first objective occurrence and data indicating incidence of at least a second objective occurrence. For instance, the objective occurrence data acquisition module 104 of the computing device 10 acquiring, via the network interface 120 or via the user interface 122, objective occurrence data 70* including data indicating incidence of at least one objective occurrence (e.g., ingestion of a food, medicine, or nutraceutical by the first user 20a) and data indicating incidence of at least a second objective occurrence (e.g., ingestion of a food, medicine, or nutraceutical by the second user 20b).

In various implementations, and as will be further described herein, the first objective occurrence and the second objective occurrence may be related to the same event (e.g., both the first and the second objective occurrence relating to the same "cloudy weather" in Seattle on Mar. 3, 2010), related to the same types of events (e.g., the first objective occurrence relating to "cloudy weather" in Seattle on Mar. 3, 2010 while the second objective occurrence relating to "cloudy weather" in Los Angeles on Feb. 20, 2010), or related to different types of events (e.g., the first objective occurrence relating to "cloudy" weather" in Seattle on Mar. 3, 2010 while the second objective occurrence relating to "sunny weather" in Los Angeles on Feb. 20, 2010).

Again, note that "*" represents a wildcard. Thus, in the above, objective occurrence data 70* may represent objective occurrence data 70a, objective occurrence data 70b, and/or objective occurrence data 70c. As those skilled in the art will recognize, the subjective user state data acquisition operation 302 does not have to be performed prior to the objective occurrence data acquisition operation 304 and may be performed subsequent to the performance of the objective occurrence data acquisition operation 304 or may be performed concurrently with the objective occurrence data acquisition operation 304.

Finally, operational flow 300 may further include a correlation operation 306 for correlating the subjective user state data with the objective occurrence data. For instance, the correlation module 106 of the computing device 10 correlating (e.g., linking or determining a relationship) the subjective user state data 60 with the objective occurrence data 70*.

Figure 4A:
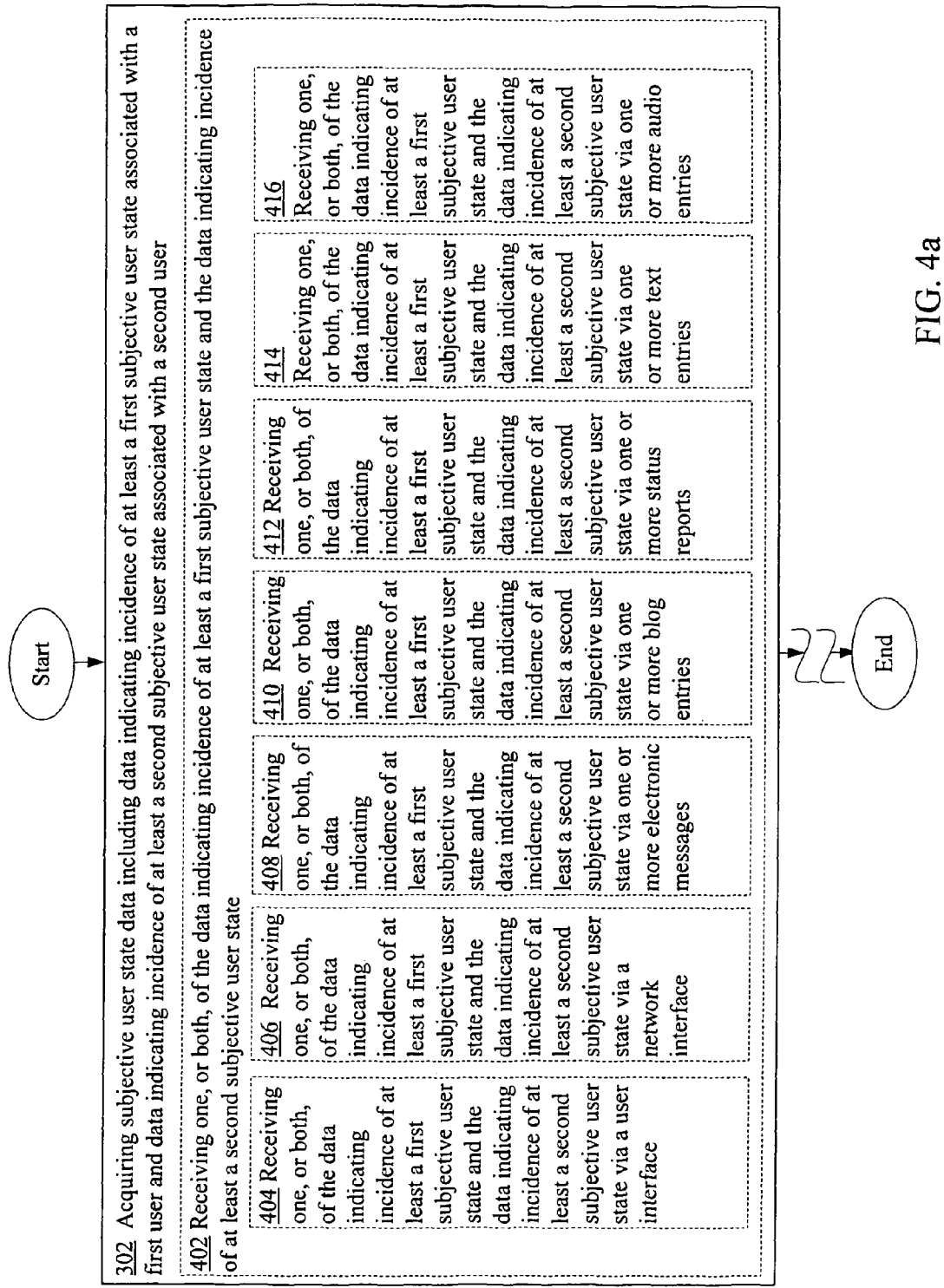
FIG. 4a is a high-level logic flowchart of a process depicting alternate implementations of the subjective user state data acquisition operation 302 of FIG. 3.
Figure 4B:
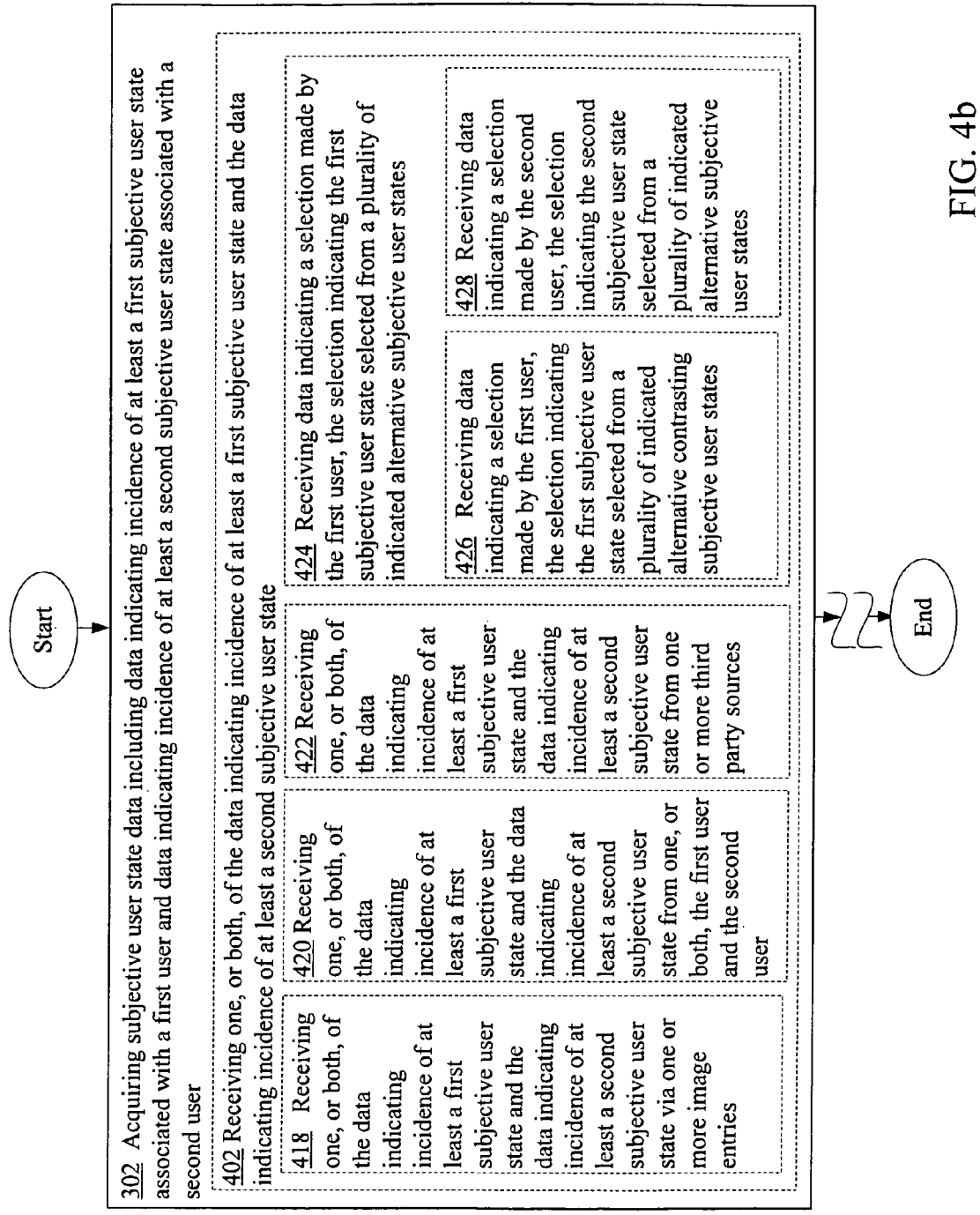
FIG. 4b is a high-level logic flowchart of a process depicting alternate implementations of the subjective user state data acquisition operation 302 of FIG. 3.

In various implementations, the subjective user state data acquisition operation 302 may include one or more additional operations as illustrated in FIGS. 4a, 4b, 4c, 4d, 4e, and 4f. For example, in some implementations the subjective user state data acquisition operation 302 may include a reception operation 402 for receiving one, or both, of the data indicating incidence of at least a first subjective user state and the data indicating incidence of at least a second subjective user state as depicted in FIGS. 4a and 4b. For instance, the reception module 202 (see FIG. 2a) of the computing device 10 receiving (e.g., via network interface 120 and/or via the user interface 122) one, or both, of the data indicating incidence of at least a first subjective user state 60a (e.g., a first user 20a feeling depressed) and the data indicating incidence of at least a second subjective user state 60b (e.g., a second user 20b also feeling depressed or alternatively, feeling happy or feeling some other way).

The reception operation 402 may, in turn, further include one or more additional operations. For example, in some implementations, the reception operation 402 may include an operation 404 for receiving one, or both, of the data indicating incidence of at least a first subjective user state and the data indicating incidence of at least a second subjective user state via a user interface as depicted in FIG. 4a. For instance, the reception module 202 of the computing device 10 receiving one, or both, of the data indicating incidence of at least a first subjective user state 60a and the data indicating incidence of at least a second subjective user state 60b via a user interface 122 (e.g., a keypad, a keyboard, a display monitor, a touchscreen, a mouse, an audio system including a microphone, an image capturing system including a video or digital camera, and/or other interface devices).

In some implementations, the reception operation 402 may include an operation 406 for receiving one, or both, of the data indicating incidence of at least a first subjective user state and the data indicating incidence of at least a second subjective user state via a network interface as depicted in FIG. 4a. For instance, the reception module 202 of the computing device 10 receiving one, or both, of the data indicating incidence of at least a first subjective user state 60a and the data indicating incidence of at least a second subjective user state 60b via a network interface 120 (e.g., a NIC).

The subjective user state data 60 including the data indicating incidence of at a least first subjective user state 60a and the data indicating incidence of at least a second subjective user state 60b may be received in various forms. For example, in some implementations, the reception operation 402 may include an operation 408 for receiving one, or both, of the data indicating incidence of at least a first subjective user state and the data indicating incidence of at least a second subjective user state via one or more electronic messages as depicted in FIG. 4a. For instance, the electronic message reception module 204 of the computing device 10 receiving one, or both, of the data indicating incidence of at least a first subjective user state 60a (e.g., subjective mental state such as feelings of happiness, sadness, anger, frustration, mental fatigue, drowsiness, alertness, and so forth) and the data indicating incidence of at least a second subjective user state 60b (e.g., subjective mental state such as feelings of happiness, sadness, anger, frustration, mental fatigue, drowsiness, alertness, and so forth) via one or more electronic messages (e.g., email, IM, or text message).

In some implementations, the reception operation 402 may include an operation 410 for receiving one, or both, of the data indicating incidence of at least a first subjective user state and the data indicating incidence of at least a second subjective user state via one or more blog entries as depicted in FIG. 4a. For instance, the blog entry reception module 205 of the computing device 10 receiving one, or both, of the data indicating incidence of at least a first subjective user state 60a (e.g., subjective physical state such as physical exhaustion, physical pain such as back pain or toothache, upset stomach, blurry vision, and so forth) and the data indicating incidence of at least a second subjective user state 60b (e.g., subjective physical state such as physical exhaustion, physical pain such as back pain or toothache, upset stomach, blurry vision, and so forth) via one or more blog entries (e.g., one or more microblog entries).

In some implementations, operation 402 may include an operation 412 for receiving one, or both, of the data indicating incidence of at least a first subjective user state and the data indicating incidence of at least a second subjective user state via one or more status reports as depicted in FIG. 4a. For instance, the status report reception module 206 of the computing device 10 receiving one, or both, of the data indicating incidence of at least a first subjective user state 60a (e.g., subjective overall state of the first user 20a such as "good," "bad," "well," "exhausted," and so forth) and the data indicating incidence of at least a second subjective user state 60b (e.g., subjective overall state of the second user 20b such as "good," "bad," "well," "exhausted," and so forth) via one or more status reports (e.g., one or more social networking status reports).

In some implementations, the reception operation 402 may include an operation 414 for receiving one, or both, of the data indicating incidence of at least a first subjective user state and the data indicating incidence of at least a second subjective user state via one or more text entries as depicted in FIG. 4a. For instance, the text entry reception module 207 of the computing device 10 receiving one, or both, of the data indicating incidence of at least a first subjective user state 60a and the data (e.g., a subjective mental state, a subjective physical state, or a subjective overall state) indicating incidence of at least a second subjective user state 60b (e.g., a subjective mental state, a subjective physical state, or a subjective overall state) via one or more text entries (e.g., text data as provided through one or more mobile devices 30* or through a user interface 122).

In some implementations, the reception operation 402 may include an operation 416 for receiving one, or both, of the data indicating incidence of at least a first subjective user state and the data indicating incidence of at least a second subjective user state via one or more audio entries as depicted in FIG. 4a. For instance, the audio entry reception module 208 of the computing device 10 receiving one, or both, of the data indicating incidence of at least a first subjective user state 60a (e.g., a subjective mental state, a subjective physical state, or a subjective overall state associated with the first user 20a) and the data indicating incidence of at least a second subjective user state 60b (e.g., a subjective mental state, a subjective physical state, or a subjective overall state associated with the second user 20b) via one or more audio entries (e.g., audio recording made via one or more mobile devices 30* or via the user interface 122).

In some implementations, the reception operation 402 may include an operation 418 for receiving one, or both, of the data indicating incidence of at least a first subjective user state and the data indicating incidence of at least a second subjective user state via one or more image entries as depicted in FIG. 4b. For instance, the image entry reception module 209 of the computing device 10 receiving one, or both, of the data indicating incidence of at least a first subjective user state 60a (e.g., a subjective mental state, a subjective physical state, or a subjective overall state associated with the first user 20a) and the data indicating incidence of at least a second subjective user state 60b (e.g., a subjective mental state, a subjective physical state, or a subjective overall state associated with the second user 20b) via one or more image entries (e.g., image data obtained via one or more mobile devices 30* or via the user interface 122).

The subjective user state data 60 may be obtained from various alternative and/or complementary sources. For example, in some implementations, the reception operation 402 may include an operation 420 for receiving one, or both, of the data indicating incidence of at least a first subjective user state and the data indicating incidence of at least a second subjective user state from one, or both, the first user and the second user as depicted in FIG. 4b. For instance, the reception module 202 of the computing device 10 receiving, via the network interface 120 or via the user interface 122, one or both, of the data indicating incidence of at least a first subjective user state 60a (e.g., a subjective mental state, a subjective physical state, or a subjective overall state associated with the first user 20a) and the data indicating incidence of at least a second subjective user state 60b (e.g., a subjective mental state, a subjective physical state, or a subjective overall state associated with the second user 20b) from one, or both, the first user 20a and the second user 20b.

In some implementations, the reception operation 402 may include an operation 422 for receiving one, or both, of the data indicating incidence of at least a first subjective user state and the data indicating incidence of at least a second subjective user state from one or more third party sources as depicted in FIG. 4b. For instance, the reception module 202 of the computing device 10 receiving, via the network interface 120 or via the user interface 122, one, or both, of the data indicating incidence of at least a first subjective user state 60a (e.g., a subjective mental state, a subjective physical state, or a subjective overall state associated with the first user 20a) and the data indicating incidence of at least a second subjective user state 60b (e.g., a subjective mental state, a subjective physical state, or a subjective overall state associated with the second user 20b) from one or more third party sources 50 (e.g., network service providers through network servers).

In some implementations, the reception operation 402 may include an operation 424 for receiving data indicating a selection made by the first user, the selection indicating the first subjective user state selected from a plurality of indicated alternative subjective user states as depicted in FIG. 4b. For instance, the reception module 202 of the computing device 10 receiving, via the network interface 120 or via the user interface 122, data indicating a selection (e.g., a selection made via a mobile device 30a or via a user interface 122) made by the first user 20a, the selection indicating the first subjective user state (e.g., "feeling good") selected from a plurality of indicated alternative subjective user states (e.g., "feeling good," "feeling bad," "feeling tired," "having a headache," and so forth).

In some implementations, operation 424 may further include an operation 426 for receiving data indicating a selection made by the first user, the selection indicating the first subjective user state selected from a plurality of indicated alternative contrasting subjective user states as depicted in FIG. 4b. For instance, the reception module 202 of the computing device 10 receiving, via the network interface 120 or via the user interface 122, data indicating a selection (e.g., "feeling very good") made by the first user 20a, the selection indicating the first subjective user state selected from a plurality of indicated alternative contrasting subjective user states (e.g., "feeling very good," "feeling somewhat good," "feeling indifferent," "feeling a little bad," and so forth).

In some implementations, operation 424 may further include an operation 428 for receiving data indicating a selection made by the second user, the selection indicating the second subjective user state selected from a plurality of indicated alternative subjective user states as depicted in FIG. 4b. For instance, the reception module 202 of the computing device 10 receiving, via the network interface 120 or via the user interface 122, data indicating a selection made by the second user 20b, the selection indicating the second subjective user state (e.g., "feeling good") selected from a plurality of indicated alternative subjective user states (e.g., "feeling good," "feeling bad," "feeling tired," "having a headache," and so forth).

Figure 4C:
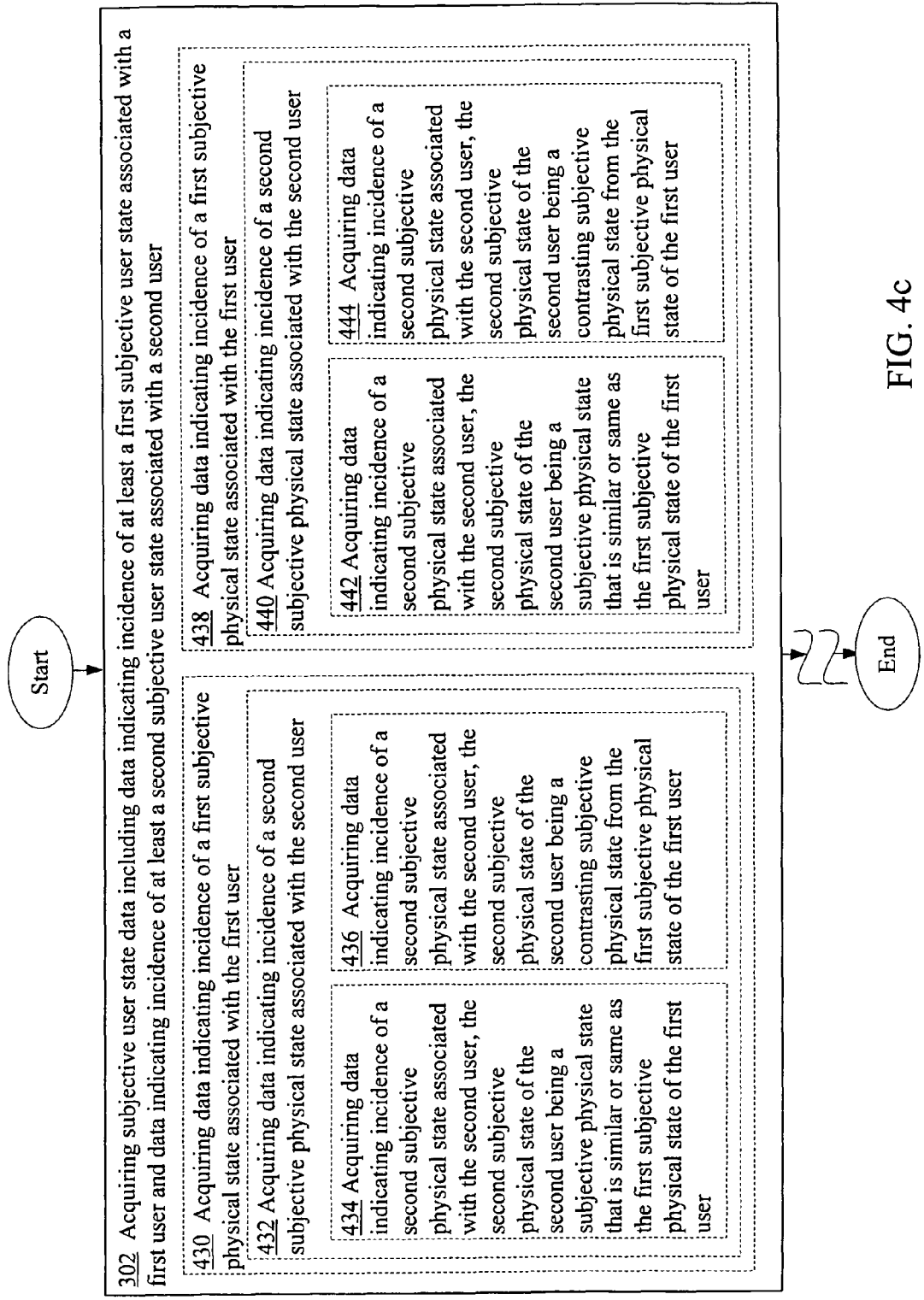
FIG. 4c is a high-level logic flowchart of a process depicting alternate implementations of the subjective user state data acquisition operation 302 of FIG. 3.

In some implementations, the subjective user state data acquisition operation 302 of FIG. 3 may include an operation 430 for acquiring data indicating incidence of a first subjective mental state associated with the first user as depicted in FIG. 4c. For instance, the subjective user state data acquisition module 102 of the computing device 10 acquiring (e.g., receiving via a network interface 120 or via a user interface 122, or by retrieving from memory 140) data indicating incidence of a first subjective mental state (e.g., sadness, happiness, alertness or lack of alertness, anger, frustration, envy, hatred, disgust, and so forth) associated with the first user 20a.

In various alternative implementations, operation 430 may further include an operation 432 for acquiring data indicating incidence of a second subjective mental state associated with the second user as depicted in FIG. 4c. For instance, the subjective user state data acquisition module 102 of the computing device 10 acquiring (e.g., receiving via a network interface 120 or via a user interface 122, or by retrieving from memory 140) data indicating incidence of a second subjective mental state (e.g., sadness, happiness, alertness or lack of alertness, anger, frustration, envy, hatred, disgust, and so forth) associated with the second user 20b.

Operation 432, in turn, may further include one or more additional operations in some implementations. For example, in some implementations, operation 432 may include an operation 434 for acquiring data indicating incidence of a second subjective mental state associated with the second user, the second subjective mental state of the second user being a subjective mental state that is similar or same as the first subjective mental state of the first user as depicted in FIG. 4c. For instance, the subjective user state data acquisition module 102 of the computing device 10 acquiring (e.g., receiving via a network interface 120 or via a user interface 122, or by retrieving from memory 140) data indicating incidence of a second subjective mental state (e.g., "exhausted") associated with the second user 20b, the second subjective mental state of the second user 20b being a subjective mental state that is similar or same as the first subjective mental state (e.g., "fatigued") of the first user 20a.

In some implementations, operation 432 may include an operation 436 for acquiring data indicating incidence of a second subjective mental state associated with the second user, the second subjective mental state of the second user being a contrasting subjective mental state from the first subjective mental state of the first user as depicted in FIG. 4c. For instance, the subjective user state data acquisition module 102 of the computing device 10 acquiring (e.g., receiving via a network interface 120 or via a user interface 122, or by retrieving from memory 140) data indicating incidence of a second subjective mental state (e.g., "slightly happy" or "sad") associated with the second user 20b, the second subjective mental state of the second user 20b being a contrasting subjective mental state from the first subjective mental state (e.g., "extremely happy") of the first user 20a.

In some implementations, the subjective user state data acquisition operation 302 of FIG. 3 may include an operation 438 for acquiring data indicating incidence of a first subjective physical state associated with the first user as depicted in FIG. 4c. For instance, the subjective user state data acquisition module 102 of the computing device 10 acquiring (e.g., receiving via a network interface 120 or via a user interface 122, or by retrieving from memory 140) data indicating incidence of a first subjective physical state (e.g., blurry vision, physical pain such as backache or headache, upset stomach, physical exhaustion, and so forth) associated with the first user 20a.

In various implementations, operation 438 may further include one or more additional operations. For example, in some implementations, operation 438 may include an operation 440 for acquiring data indicating incidence of a second subjective physical state associated with the second user as depicted in FIG. 4c. For instance, the subjective user state data acquisition module 102 of the computing device 10 acquiring (e.g., receiving via a network interface 120 or via a user interface 122, or by retrieving from memory 140) data indicating incidence of a second subjective physical state (e.g., blurry vision, physical pain such as backache or headache, upset stomach, physical exhaustion, and so forth) associated with the second user 20b.

In some implementations, operation 440 may further include an operation 442 for acquiring data indicating incidence of a second subjective physical state associated with the second user, the second subjective physical state of the second user being a subjective physical state that is similar or same as the first subjective physical state of the first user as depicted in FIG. 4c. For instance, the subjective user state data acquisition module 102 of the computing device 10 acquiring (e.g., receiving via a network interface 120 or via a user interface 122, or by retrieving from memory 140) data indicating incidence of a second subjective physical state (e.g., mild headache) associated with the second user 20b, the second subjective physical state of the second user 20b being a subjective physical state that is similar or same as the first subjective physical state (e.g., slight headache) of the first user 20a.

In some implementations, operation 440 may include an operation 444 for acquiring data indicating incidence of a second subjective physical state associated with the second user, the second subjective physical state of the second user being a contrasting subjective physical state from the first subjective physical state of the first user as depicted in FIG. 4c. For instance, the subjective user state data acquisition module 102 of the computing device 10 acquiring (e.g., receiving via a network interface 120 or via a user interface 122, or by retrieving from memory 140) data indicating incidence of a second subjective physical state (e.g., slight headache or no headache) associated with the second user 20b, the second subjective physical state of the second user 20b being a contrasting subjective physical state from the first subjective physical state (e.g., migraine headache) of the first user 20a.

Figure 4D:
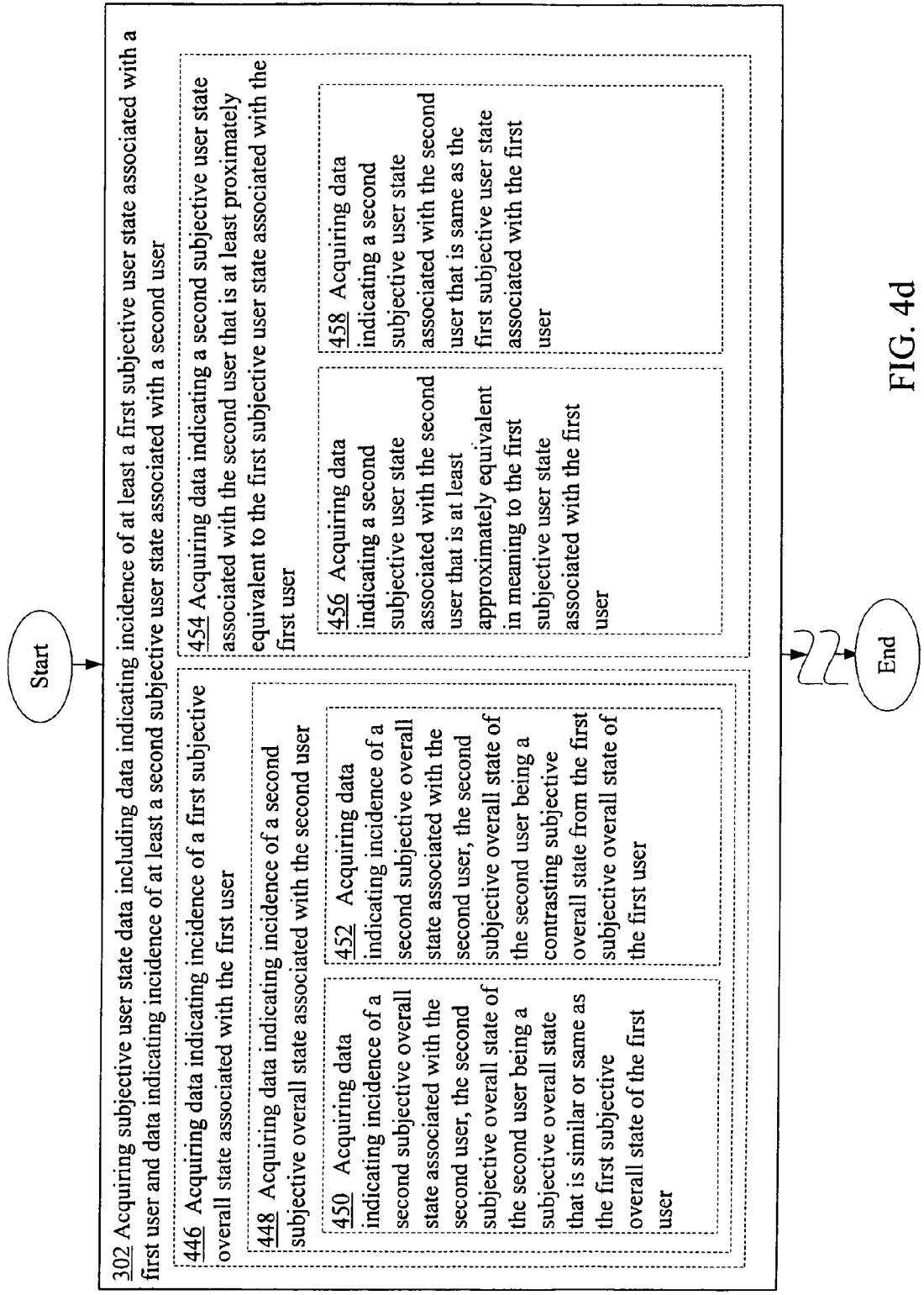
FIG. 4d is a high-level logic flowchart of a process depicting alternate implementations of the subjective user state data acquisition operation 302 of FIG. 3.

In some implementations, the subjective user state data acquisition operation 302 of FIG. 3 may include an operation 446 for acquiring data indicating incidence of a first subjective overall state associated with the first user as depicted in FIG. 4d. For instance, the subjective user state data acquisition module 102 of the computing device 10 acquiring (e.g., receiving via a network interface 120 or via a user interface 122, or by retrieving from memory 140) data indicating incidence of a first subjective overall state (e.g., good, bad, wellness, hangover, fatigue, nausea, and so forth) associated with the first user 20a. Note that a subjective overall state, as used herein, may be in reference to any subjective user state that may not fit neatly into the categories of subjective mental state or subjective physical state.

In various implementations, operation 446 may further include one or more additional operations. For example, in some implementations, operation 446 may include an operation 448 for acquiring data indicating incidence of a second subjective overall state associated with the second user as depicted in FIG. 4d. For instance, the subjective user state data acquisition module 102 of the computing device 10 acquiring (e.g., receiving via a network interface 120 or via a user interface 122, or by retrieving from memory 140) data indicating incidence of a second subjective overall state (e.g., good, bad, wellness, hangover, fatigue, nausea, and so forth) associated with the second user 20b.

In some implementations, operation 448 may further include an operation 450 for acquiring data indicating incidence of a second subjective overall state associated with the second user, the second subjective overall state of the second user being a subjective overall state that is similar or same as the first subjective overall state of the first user as depicted in FIG. 4d. For instance, the subjective user state data acquisition module 102 of the computing device 10 acquiring (e.g., receiving via a network interface 120 or via a user interface 122, or by retrieving from memory 140) data indicating incidence of a second subjective overall state (e.g., "excellent") associated with the second user 20b, the second subjective overall state of the second user 20b being a subjective overall state that is similar or same as the first subjective overall state (e.g., "excellent" or "great") of the first user 20a.

In some implementations, operation 448 may include an operation 452 for acquiring data indicating incidence of a second subjective overall state associated with the second user, the second subjective overall state of the second user being a contrasting subjective overall state from the first subjective overall state of the first user as depicted in FIG. 4d. For instance, the subjective user state data acquisition module 102 of the computing device 10 acquiring (e.g., receiving via a network interface 120 or via a user interface 122, or by retrieving from memory 140) data indicating incidence of a second subjective overall state (e.g., "bad" or "horrible") associated with the second user 20b, the second subjective overall state of the second user 20b being a contrasting subjective overall state from the first subjective overall state (e.g., "excellent") of the first user 20a.

In some implementations, the subjective user state data acquisition operation 302 of FIG. 3 may include an operation 454 for acquiring data indicating a second subjective user state associated with the second user that is at least proximately equivalent to the first subjective user state associated with the first user as depicted in FIG. 4d. For instance, the subjective user state data acquisition module 102 of the computing device 10 acquiring (e.g., receiving via a network interface 120 or via a user interface 122, or by retrieving from memory 140) data indicating a second subjective user state (e.g., very sad) associated with the second user 20b that is at least proximately equivalent to the first subjective user state (e.g., extremely sad) associated with the first user 20a.

In various implementations, operation 454 may further include one or more additional operations. For example, in some implementations, operation 454 may include an operation 456 for acquiring data indicating a second subjective user state associated with the second user that is at least approximately equivalent in meaning to the first subjective user state associated with the first user as depicted in FIG. 4d. For instance, the subjective user state data acquisition module 102 of the computing device 10 acquiring (e.g., receiving via a network interface 120 or via a user interface 122, or by retrieving from memory 140) data indicating a second subjective user state (e.g., gloomy) associated with the second user 20b that is at least approximately equivalent in meaning to the first subjective user state (e.g., depressed) associated with the first user 20a.

In some implementations, operation 454 may include an operation 458 for acquiring data indicating a second subjective user state associated with the second user that is same as the first subjective user state associated with the first user as depicted in FIG. 4d. For instance, the subjective user state data acquisition module 102 of the computing device 10 acquiring (e.g., receiving via a network interface 120 or via a user interface 122, or by retrieving from memory 140) data indicating a second subjective user state (e.g., mentally exhausted) associated with the second user 20b that is same as the first subjective user state (e.g., mentally exhausted) associated with the first user 20a.

Figure 4E:
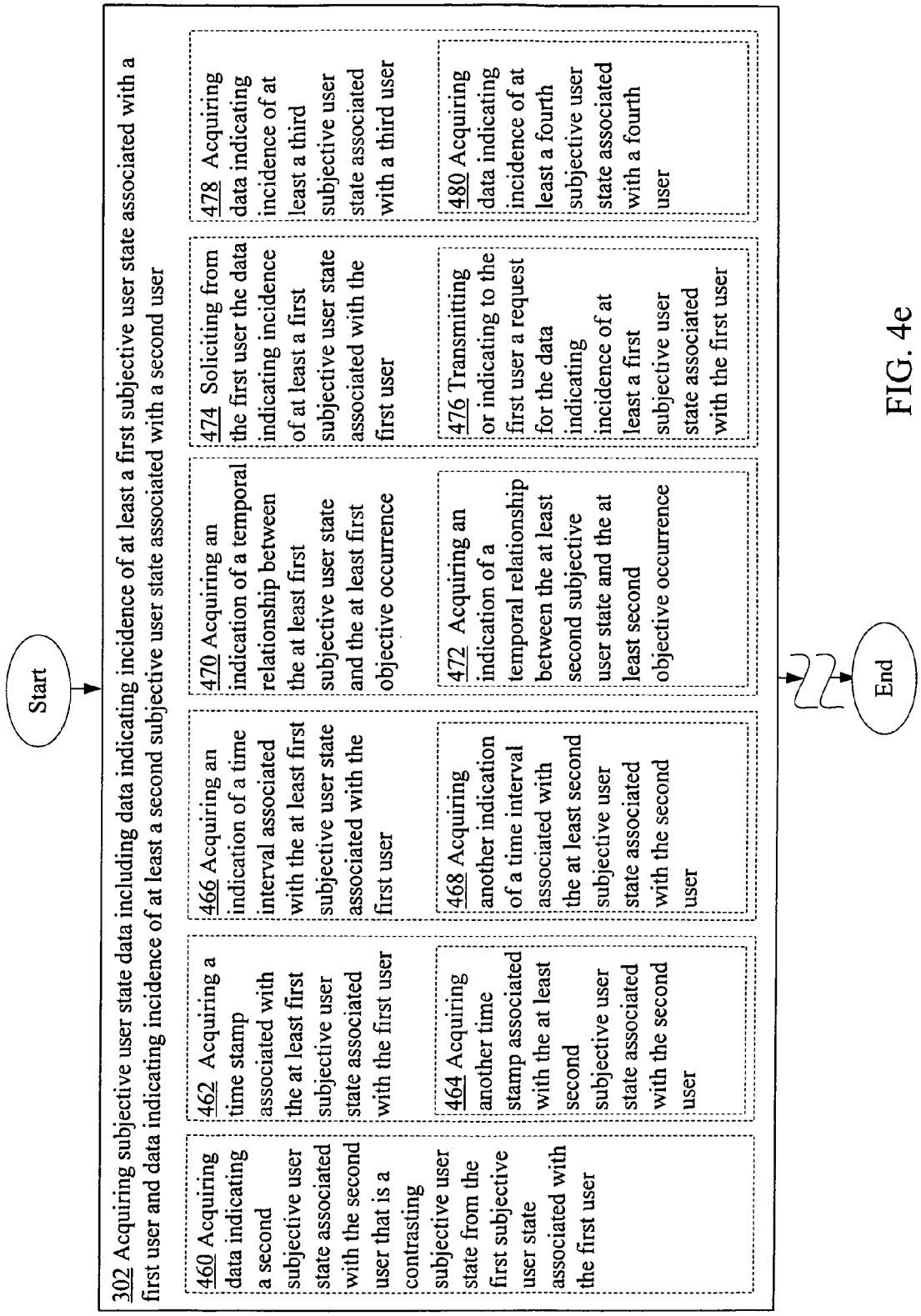
FIG. 4e is a high-level logic flowchart of a process depicting alternate implementations of the subjective user state data acquisition operation 302 of FIG. 3.

In some implementations, the subjective user state data acquisition operation 302 of FIG. 3 may include an operation 460 for acquiring data indicating a second subjective user state associated with the second user that is a contrasting subjective user state from the first subjective user state associated with the first user as depicted in FIG. 4e. For instance, the subjective user state data acquisition module 102 of the computing device 10 acquiring (e.g., receiving via a network interface 120 or via a user interface 122, or by retrieving from memory 140) data indicating a second subjective user state (e.g., "good") associated with the second user 20b that is a contrasting subjective user state from the first subjective user state (e.g., "bad") associated with the first user 20a. In some implementations, contrasting subjective user states may be in reference to subjective user states that may be variations of the same subjective user state type (e.g., subjective mental states such as different levels of happiness, which may also include different levels of sadness).

In some implementations, the subjective user state data acquisition operation 302 may include an operation 462 for acquiring a time stamp associated with the at least first subjective user state associated with the first user as depicted in FIG. 4e. For instance, the time stamp acquisition module 210 of the computing device 10 acquiring (e.g., receiving via a network interface 120 or via a user interface 122, or by self-generating) a time stamp (e.g., 10 PM Aug. 4, 2009) associated with the at least first subjective user state (e.g., very bad upset stomach) associated with the first user 20a.

Operation 462, in turn, may further include an operation 464 for acquiring another time stamp associated with the at least second subjective user state associated with the second user as depicted in FIG. 4e. For instance, the time stamp acquisition module 210 of the computing device 10 acquiring (e.g., receiving via a network interface 120 or via a user interface 122, or by self-generating) another time stamp (e.g., 8 PM Aug. 12, 2009) associated with the at least second subjective user state (e.g., a slight upset stomach) associated with the second user 20b.

In some implementations, the subjective user state data acquisition operation 302 may include an operation 466 for acquiring an indication of a time interval associated with the at least first subjective user state associated with the first user as depicted in FIG. 4e. For instance, the time interval indication acquisition module 211 of the computing device 10 acquiring (e.g., receiving via a network interface 120 or via a user interface 122, or by self-generating) an indication of a time interval (e.g., 8 AM to 10 AM Jul. 24, 2009) associated with the at least first subjective user state (e.g., feeling tired) associated with the first user 20a.

Operation 466, in turn, may further include an operation 468 for acquiring another indication of a time interval associated with the at least second subjective user state associated with the second user as depicted in FIG. 4e. For instance, the time interval indication acquisition module 211 of the computing device 10 acquiring (e.g., receiving via a network interface 120 or via a user interface 122, or by self-generating) another indication of a time interval (e.g., 2 PM to 8 PM Jul. 24, 2009) associated with the at least second subjective user state (e.g., feeling tired) associated with the second user 20b.

In some implementations, the subjective user state data acquisition operation 302 may include an operation 470 for acquiring an indication of a temporal relationship between the at least first subjective user state and the at least first objective occurrence as depicted in FIG. 4e. For instance, the temporal relationship indication acquisition module 212 acquiring (e.g., receiving via a network interface 120 or via a user interface 122, or by self-generating) an indication of a temporal relationship (e.g., before, after, or at least partially concurrently occurring) between the at least first subjective user state (e.g., easing of a headache) and the at least first objective occurrence (e.g., ingestion of aspirin).

Operation 470, in turn, may further include an operation 472 for acquiring an indication of a temporal relationship between the at least second subjective user state and the at least second objective occurrence as depicted in FIG. 4e. For instance, the temporal relationship indication acquisition module 212 acquiring (e.g., receiving via a network interface 120 or via a user interface 122, or by self-generating) an indication of a temporal relationship between the at least second subjective user state (e.g., easing of a headache) and the at least second objective occurrence (e.g., ingestion of aspirin).

In some implementations, the subjective user state data acquisition operation 302 may include an operation 474 for soliciting from the first user the data indicating incidence of at least a first subjective user state associated with the first user as depicted in FIG. 4e. For instance, the solicitation module 213 soliciting from the first user 20a (e.g., transmitting via a network interface 120 or indicating via a user interface 122) a request to be provided with the data indicating incidence of at least a first subjective user state 60a associated with the first user 20a. In some implementations, the solicitation of the at least first subjective user state may involve requesting the user 20a to select at least one subjective user state from a plurality of alternative subjective user states.

Operation 474, in turn, may further include an operation 476 for transmitting or indicating to the first user a request for the data indicating incidence of at least a first subjective user state associated with the first user as depicted in FIG. 4e. For instance, the request transmit/indicate module 214 (which may be designed to transmit a request via a network interface 120 and/or to indicate a request via a user interface 122) of the computing device 10 transmitting or indicating to the first user 20a a request for the data indicating incidence of at least a first subjective user state 60a associated with the first user 20a.

In some implementations, the subjective user state data acquisition operation 302 may include an operation 478 for acquiring data indicating incidence of at least a third subjective user state associated with a third user as depicted in FIG. 4e. For instance, the subjective user state data acquisition module 102 of the computing device 10 acquiring (e.g., receiving via a network interface 120 or via a user interface 122, or retrieving from memory 140) data indicating incidence of at least a third subjective user state 60c associated with a third user 20c.

Operation 478, in turn, may further include an operation 480 for acquiring data indicating incidence of at least a fourth subjective user state associated with a fourth user as depicted in FIG. 4e. For instance, the subjective user state data acquisition module 102 of the computing device 10 acquiring (e.g., receiving via a network interface 120 or via a user interface 122, or retrieving from memory 140) data indicating incidence of at least a fourth subjective user state 60d associated with a fourth user 20d.

Figure 4F:
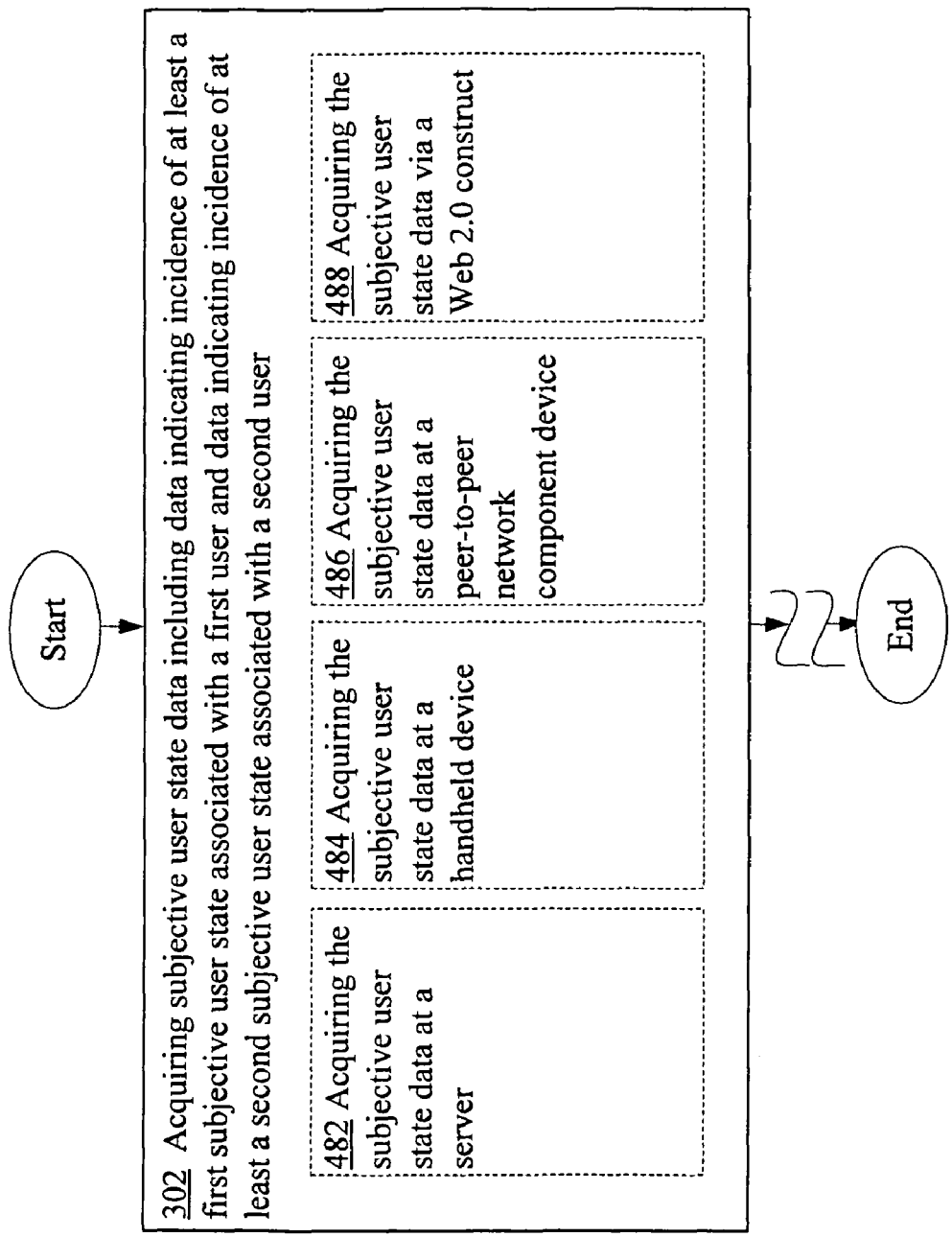
FIG. 4f is a high-level logic flowchart of a process depicting alternate implementations of the subjective user state data acquisition operation 302 of FIG. 3.

In some implementations, the subjective user state data acquisition operation 302 may include an operation 482 for acquiring the subjective user state data at a server as depicted in FIG. 4f. For instance, when the computing device 10 is a network server and is acquiring the subjective user state data 60.

In some implementations, the subjective user state data acquisition operation 302 may include an operation 484 for acquiring the subjective user state data at a handheld device as depicted in FIG. 4f. For instance, when the computing device 10 is a handheld device such as a mobile phone or a PDA and is acquiring the subjective user state data 60.

In some implementations, the subjective user state data acquisition operation 302 may include an operation 486 for acquiring the subjective user state data at a peer-to-peer network component device as depicted in FIG. 4f. For instance, when the computing device 10 is a peer-to-peer network component device and is acquiring the subjective user state data 60.

In some implementations, the subjective user state data acquisition operation 302 may include an operation 488 for acquiring the subjective user state data via a Web 2.0 construct as depicted in FIG. 4f. For instance, when the computing device 10 employs a Web 2.0 application 250 in order to acquire the subjective user state data 60.

Figure 5A:
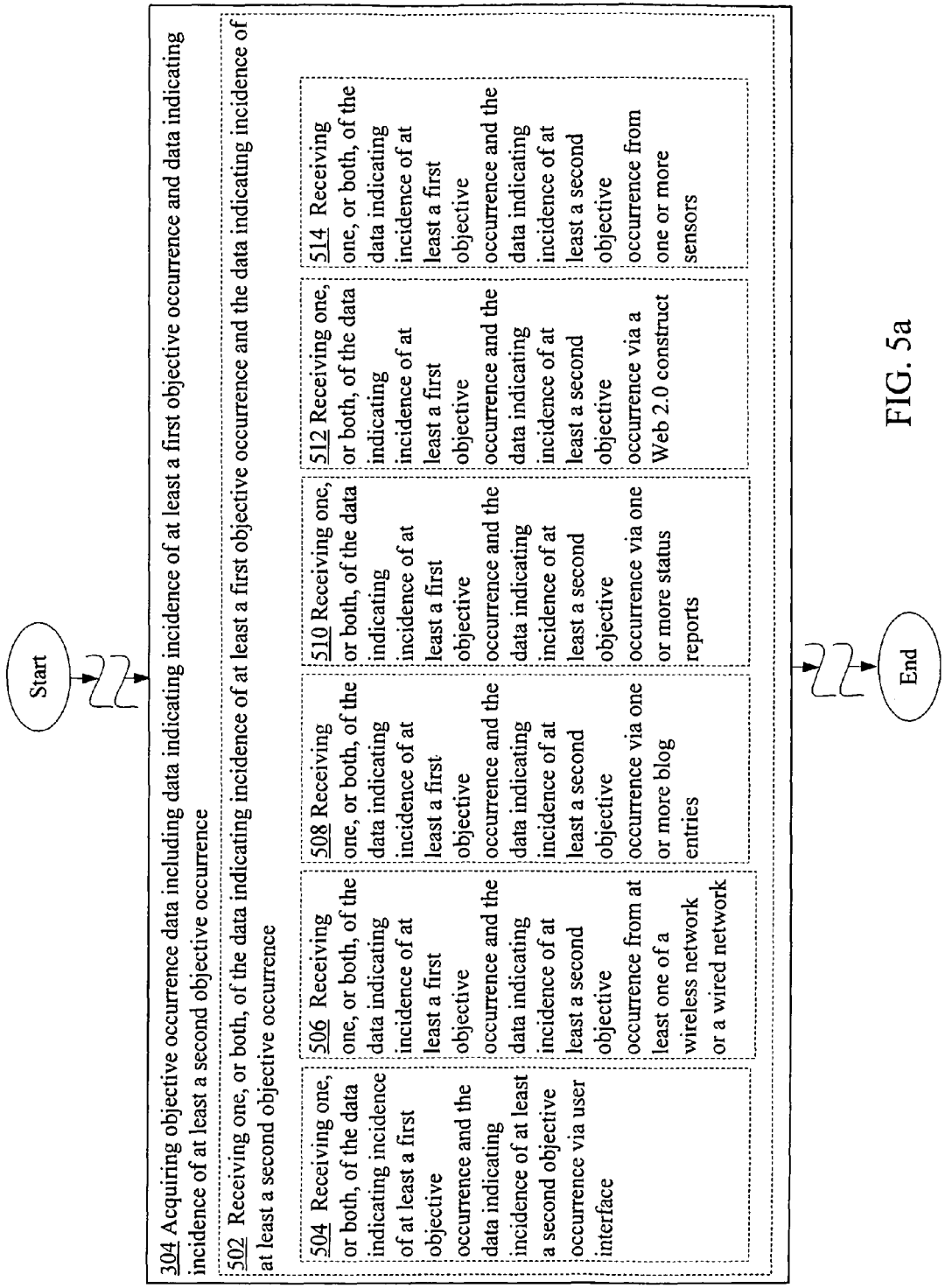
FIG. 5a is a high-level logic flowchart of a process depicting alternate implementations of the objective occurrence data acquisition operation 304 of FIG. 3.

Referring back to FIG. 3, the objective occurrence data acquisition operation 304 in various embodiments may include one or more additional operations as illustrated in FIGS. 5a to 5g. For example, in some implementations, the objective occurrence data acquisition operation 304 may include a reception operation 502 for receiving one, or both, of the data indicating incidence of at least a first objective occurrence and the data indicating incidence of at least a second objective occurrence as depicted in FIG. 5a. For instance, the objective occurrence data reception module 215 (see FIG. 2b) of the computing device 10 receiving (e.g., via the network interface 120 and/or via the user interface 122) one, or both, of the data indicating incidence of at least a first objective occurrence and the data indicating incidence of at least a second objective occurrence.

In various implementations, the reception operation 502 may include one or more additional operations. For example, in some implementations the reception operation 502 may include an operation 504 for receiving one, or both, of the data indicating incidence of at least a first objective occurrence and the data indicating incidence of at least a second objective occurrence via user interface as depicted in FIG. 5a. For instance, the objective occurrence data reception module 215 of the computing device 10 receiving one, or both, of the data indicating incidence of at least a first objective occurrence and the data indicating incidence of at least a second objective occurrence via user interface 122.

In some implementations, the reception operation 502 may include an operation 506 for receiving one, or both, of the data indicating incidence of at least a first objective occurrence and the data indicating incidence of at least a second objective occurrence from at least one of a wireless network or a wired network as depicted in FIG. 5a. For instance, the objective occurrence data reception module 215 of the computing device 10 receiving one, or both, of the data indicating incidence of at least a first objective occurrence (e.g., ingestion of a medicine, a food item, or a nutraceutical by a first user 20a) and the data indicating incidence of at least a second objective occurrence (e.g., ingestion of a medicine, a food item, or a nutraceutical by a second user 20b) from a wireless and/or wired network 40.

In some implementations, the reception operation 502 may include an operation 508 for receiving one, or both, of the data indicating incidence of at least a first objective occurrence and the data indicating incidence of at least a second objective occurrence via one or more blog entries as depicted in FIG. 5a. For instance, the blog entry reception module 216 of the computing device 10 receiving (e.g., via the network interface 120) one, or both, of the data indicating incidence of at least a first objective occurrence (e.g., an activity executed by a first user 20a) and the data indicating incidence of at least a second objective occurrence (e.g., an activity executed by a second user 20b) via one or more blog entries (e.g., microblog entries).

In some implementations, the reception operation 502 may include an operation 510 for receiving one, or both, of the data indicating incidence of at least a first objective occurrence and the data indicating incidence of at least a second objective occurrence via one or more status reports as depicted in FIG. 5a. For instance, the status report reception module 217 of the computing device 10 receiving (e.g., via the network interface 120) one, or both, of the data indicating incidence of at least a first objective occurrence (e.g., a first external event such as the weather on a particular day at a particular location associated with a first user 20a) and the data indicating incidence of at least a second objective occurrence (e.g., a second external event such as the weather on another day at another location associated with a second user 20b) via one or more status reports (e.g., social networking status reports).

In some implementations, the reception operation 502 may include an operation 512 for receiving one, or both, of the data indicating incidence of at least a first objective occurrence and the data indicating incidence of at least a second objective occurrence via a Web 2.0 construct as depicted in FIG. 5a. For instance, the objective occurrence data reception module 215 of the computing device 10 receiving (e.g., via the network interface 120) one, or both, of the data indicating incidence of at least a first objective occurrence (e.g., a location of a first user 20a) and the data indicating incidence of at least a second objective occurrence (e.g., a location of a second user 20b) via a Web 2.0 construct (e.g., Web 2.0 application 250).

In some implementations, the reception operation 502 may include an operation 514 for receiving one, or both, of the data indicating incidence of at least a first objective occurrence and the data indicating incidence of at least a second objective occurrence from one or more sensors as depicted in FIG. 5a. For instance, the objective occurrence data reception module 215 of the computing device 10 receiving (e.g., via the network interface 120) one, or both, of the data indicating incidence of at least a first objective occurrence (e.g., an objective physical characteristic of a first user 20a) and the data indicating incidence of at least a second objective occurrence (e.g., an objective physical characteristic of a second user 20b) from one or more sensors 35.

Figure 5B:
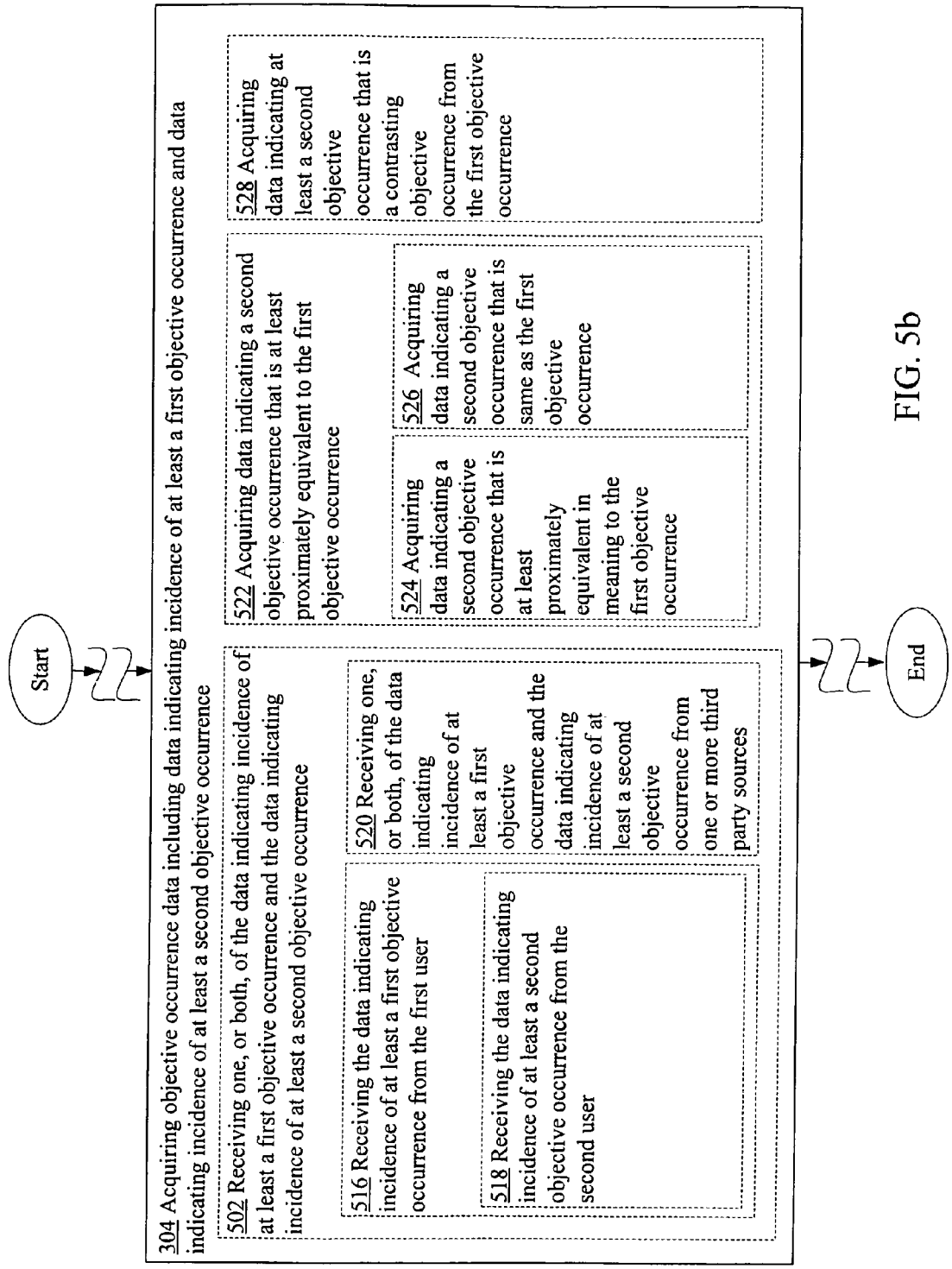
FIG. 5b is a high-level logic flowchart of a process depicting alternate implementations of the objective occurrence data acquisition operation 304 of FIG. 3.

In various implementations, the reception operation 502 may include an operation 516 for receiving the data indicating incidence of at least a first objective occurrence from the first user as depicted in FIG. 5b. For instance, the objective occurrence data reception module 215 of the computing device 10 receiving (e.g., via the network interface 120 or via the user interface 122) the data indicating incidence of at least a first objective occurrence (e.g., a social or professional activity executed by the first user 20a) from the first user 20a.

In some implementations, operation 516 may further include an operation 518 for receiving the data indicating incidence of at least a second objective occurrence from the second user as depicted in FIG. 5b. For instance, the objective occurrence data reception module 215 of the computing device 10 receiving (e.g., via the network interface 120 or via the user interface 122) the data indicating incidence of at least a second objective occurrence (e.g., a social or professional activity executed by the second user 20b) from the second user 20b.

In some implementations, the reception operation 502 may include an operation 520 for receiving one, or both, of the data indicating incidence of at least a first objective occurrence and the data indicating incidence of at least a second objective occurrence from one or more third party sources as depicted in FIG. 5b. For instance, the objective occurrence data reception module 215 of the computing device 10 receiving (e.g., via the network interface 120) one, or both, of the data indicating incidence of at least a first objective occurrence (e.g., game performance of a professional football team) and the data indicating incidence of at least a second objective occurrence (e.g., another game performance of another professional football team) from one or more third party sources 50 (e.g., a content provider or web service via a network server).

In various implementations, the objective occurrence data acquisition operation 304 of FIG. 3 may include an operation 522 for acquiring data indicating a second objective occurrence that is at least proximately equivalent to the first objective occurrence as depicted in FIG. 5b. For instance, the objective occurrence data acquisition module 104 of the computing device 10 acquiring (e.g., receiving via a network interface 120 or via a user interface 122, or by retrieving from memory 140) data indicating a second objective occurrence (e.g., a first user 20a jogging 30 minutes) that is at least proximately equivalent to the first objective occurrence (e.g., a second user 20b jogging 35 minutes).

Operation 522, in turn, may include one or more additional operations in various alternative implementations. For example, in some implementations, operation 522 may further include an operation 524 for acquiring data indicating a second objective occurrence that is at least proximately equivalent in meaning to the first objective occurrence as depicted in FIG. 5b. For instance, the objective occurrence data acquisition module 104 of the computing device 10 acquiring (e.g., receiving via a network interface 120 or via a user interface 122, or by retrieving from memory 140) data indicating a second objective occurrence (e.g., overcast day) that is at least proximately equivalent in meaning to the first objective occurrence (e.g., cloudy day).

In some implementations, operation 522 may include an operation 526 for acquiring data indicating a second objective occurrence that is same as the first objective occurrence as depicted in FIG. 5b. For instance, the objective occurrence data acquisition module 104 of the computing device 10 acquiring (e.g., receiving via a network interface 120 or via a user interface 122, or by retrieving from memory 140) data indicating a second objective occurrence (e.g., drop in price for a particular stock on a particular day) that is same as the first objective occurrence (e.g., the same drop in price for the same stock on the same day).

In some implementations, the objective occurrence data acquisition operation 304 of FIG. 3 may include an operation 528 for acquiring data indicating at least a second objective occurrence that is a contrasting objective occurrence from the first objective occurrence as depicted in FIG. 5b. For instance, the objective occurrence data acquisition module 104 of the computing device 10 acquiring (e.g., receiving via a network interface 120 or via a user interface 122, or by retrieving from memory 140) data indicating at least a second objective occurrence (e.g., high blood pressure of a first user 20a) that is a contrasting objective occurrence from the first objective occurrence (e.g., low blood pressure of a second user 20b).

Figure 5C:
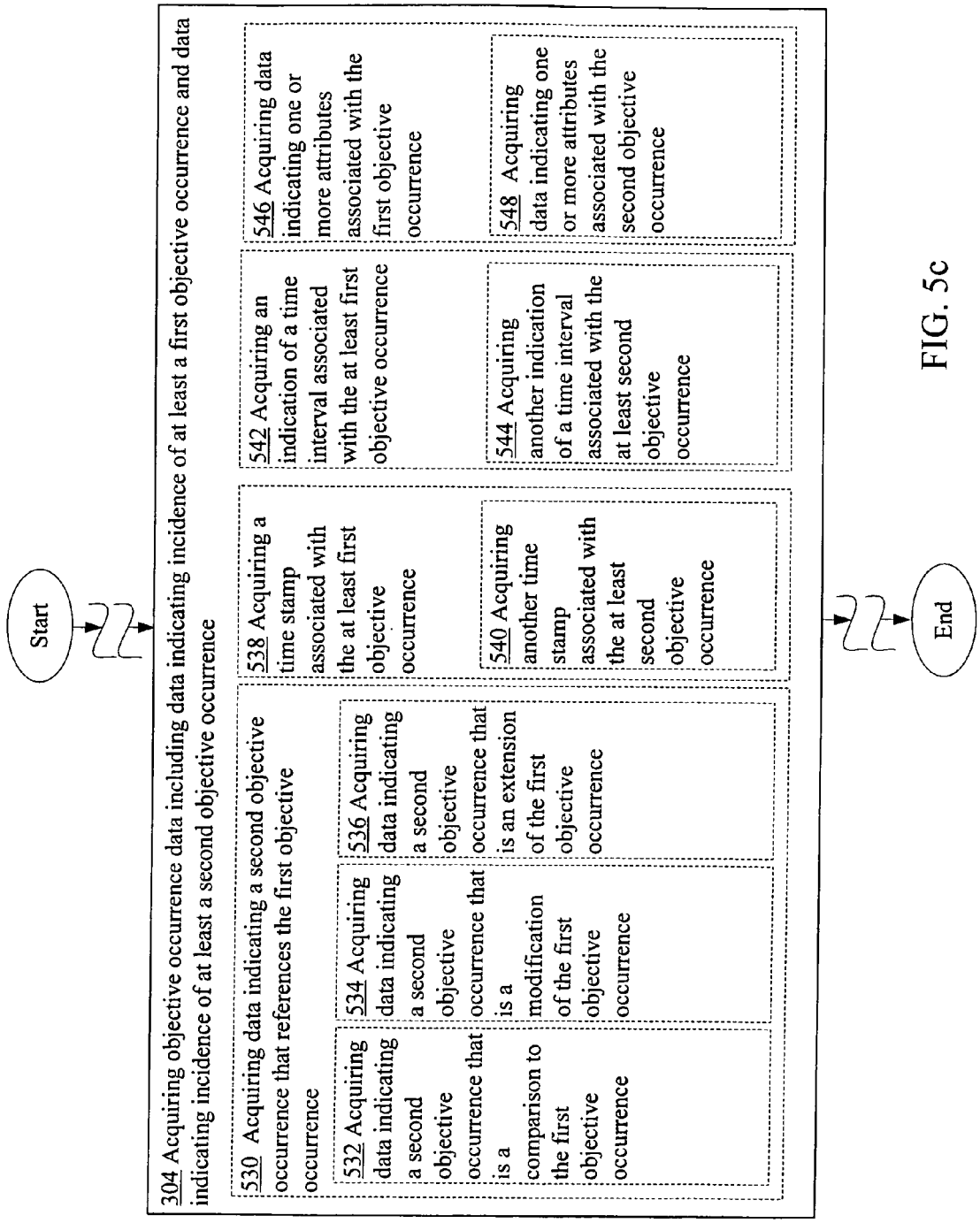
FIG. 5c is a high-level logic flowchart of a process depicting alternate implementations of the objective occurrence data acquisition operation 304 of FIG. 3.

In some implementations, the objective occurrence data acquisition operation 304 may include an operation 530 for acquiring data indicating a second objective occurrence that references the first objective occurrence as depicted in FIG. 5c. For instance, the objective occurrence data acquisition module 104 of the computing device 10 acquiring (e.g., receiving via a network interface 120 or via a user interface 122, or by retrieving from memory 140) data indicating a second objective occurrence that references the first objective occurrence (e.g., Tuesday's temperature was the same as Monday's temperature or a blood pressure of a second user 20b is higher, lower, or the same as the blood pressure of a first user 20a).

In various alternative implementations, operation 530 may further include one or more additional operations. For example, in some implementations, operation 530 may include an operation 532 for acquiring data indicating a second objective occurrence that is a comparison to the first objective occurrence as depicted in FIG. 5c. For instance, the objective occurrence data acquisition module 104 of the computing device 10 acquiring (e.g., receiving via a network interface 120 or via a user interface 122, or by retrieving from memory 140) data indicating a second objective occurrence that is a comparison to the first objective occurrence. For example, acquiring data that indicates that it is hotter today (e.g., first objective occurrence) than yesterday (e.g., second objective occurrence).

In some implementations, operation 530 may include an operation 534 for acquiring data indicating a second objective occurrence that is a modification of the first objective occurrence as depicted in FIG. 5c. For instance, the objective occurrence data acquisition module 104 of the computing device 10 acquiring (e.g., receiving via a network interface 120 or via a user interface 122, or by retrieving from memory 140) data indicating a second objective occurrence that is a modification of the first objective occurrence (e.g., the rain showers yesterday has changed over to a snow storm).

In some implementations, operation 530 may include an operation 536 for acquiring data indicating a second objective occurrence that is an extension of the first objective occurrence as depicted in FIG. 5c. For instance, the objective occurrence data acquisition module 104 of the computing device 10 acquiring (e.g., receiving via a network interface 120 or via a user interface 122, or by retrieving from memory 140) data indicating a second objective occurrence that is an extension of the first objective occurrence (e.g., yesterday's hot weather continues today).

In some implementations, the objective occurrence data acquisition operation 304 may include an operation 538 for acquiring a time stamp associated with the at least first objective occurrence as depicted in FIG. 5c. For instance, the time stamp acquisition module 218 of the computing device 10 acquiring (e.g., receiving or generating) a time stamp associated with the at least first objective occurrence.

Operation 538, in various implementations, may further include an operation 540 for acquiring another time stamp associated with the at least second objective occurrence as depicted in FIG. 5c. For instance, the time stamp acquisition module 218 of the computing device 10 acquiring (e.g., receiving or self-generating) another time stamp associated with the at least second objective occurrence.

In some implementations, the objective occurrence data acquisition operation 304 of FIG. 3 may include an operation 542 for acquiring an indication of a time interval associated with the at least first objective occurrence as depicted in FIG. 5c. For instance, the time interval indication acquisition module 219 of the computing device 10 acquiring (e.g., receiving or self-generating) an indication of a time interval associated with the at least first objective occurrence.

Operation 542, in various implementations, may further include an operation 544 for acquiring another indication of a time interval associated with the at least second objective occurrence as depicted in FIG. 5c. For instance, the time interval indication acquisition module 219 of the computing device 10 acquiring (e.g., receiving or self-generating) another indication of a time interval associated with the at least second objective occurrence.

In some implementations, the objective occurrence data acquisition operation 304 may include an operation 546 for acquiring data indicating one or more attributes associated with the first objective occurrence as depicted in FIG. 5c. For instance, the objective occurrence data acquisition module 104 of the computing device 10 acquiring (e.g., via the network interface 120, via the user interface 122, or by retrieving from a memory 140) data indicating one or more attributes (e.g., type of exercising machine or length of time on the exercise machine by a first user 20a) associated with the first objective occurrence (e.g., exercising on an exercising machine by the first user 20a).

Operation 546, in turn, may further include an operation 548 for acquiring data indicating one or more attributes associated with the second objective occurrence as depicted in FIG. 5c. For instance, the objective occurrence data acquisition module 104 of the computing device 10 acquiring (e.g., via the network interface 120, via the user interface 122, or by retrieving from a memory 140) data indicating one or more attributes (e.g., type of exercising machine or length of time on the exercise machine by a second user 20b) associated with the second objective occurrence (e.g., exercising on an exercising machine by the second user 20b).

Figure 5D:
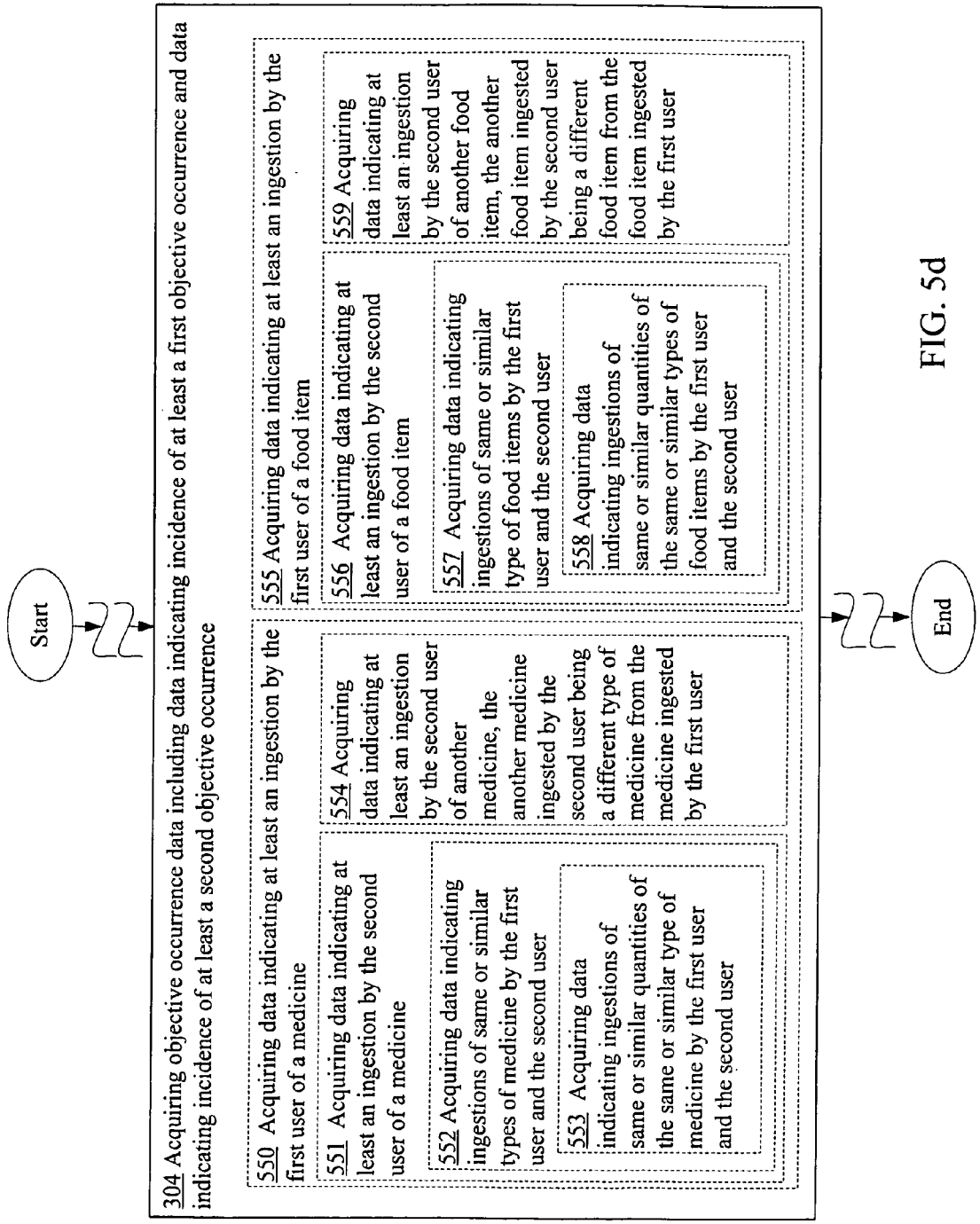
FIG. 5d is a high-level logic flowchart of a process depicting alternate implementations of the objective occurrence data acquisition operation 304 of FIG. 3.

In some implementations, the objective occurrence data acquisition operation 304 of FIG. 3 may include an operation 550 for acquiring data indicating at least an ingestion by the first user of a medicine as depicted in FIG. 5d. For instance, the objective occurrence data acquisition module 104 of the computing device 10 acquiring (e.g., via the network interface 120, via the user interface 122, or by retrieving from a memory 140) data indicating at least an ingestion by the first user 20a of a medicine (e.g., a dosage of a beta blocker).

Operation 550, in turn, may include one or more additional operations in various alternative implementations. For example, in some implementations, operation 550 may include an operation 551 for acquiring data indicating at least an ingestion by the second user of a medicine as depicted in FIG. 5*d*. For instance, the objective occurrence data acquisition module 104 of the computing device 10 acquiring (e.g., via the network interface 120, via the user interface 122, or by retrieving from a memory 140) data indicating at least an ingestion by the second user 20*b* of a medicine (e.g., ingestion of the same type of beta blocker ingested by the first user 20*a*, ingestion of a different type of beta blocker, or ingestion of a completely different type of medicine).

In some implementations, operation 551 may further include an operation 552 for acquiring data indicating ingestions of same or similar types of medicine by the first user and the second user as depicted in FIG. 5*d*. For instance, the objective occurrence data acquisition module 104 of the computing device 10 acquiring (e.g., via the network interface 120, via the user interface 122, or by retrieving from a memory 140) data indicating ingestions of same or similar types of medicine by the first user 20*a* and the second user 20*b* (e.g., ingestions of the same or similar quantities of the same or similar brands of beta blockers).

Operation 552, in turn, may further include an operation 553 for acquiring data indicating ingestions of same or similar quantities of the same or similar type of medicine by the first user and the second user as depicted in FIG. 5*d*. For instance, the objective occurrence data acquisition module 104 of the computing device 10 acquiring (e.g., via the network interface 120, via the user interface 122, or by retrieving from a memory 140) data indicating ingestions of same or similar types of medicine (e.g., same or similar quantities of the same brand of beta blockers) by the first user 20*a* and the second user 20*b*.

In some implementations, operation 550 may include an operation 554 for acquiring data indicating at least an ingestion by the second user of another medicine, the another medicine ingested by the second user being a different type of medicine from the medicine ingested by the first user as depicted in FIG. 5*d*. For instance, the objective occurrence data acquisition module 104 of the computing device 10 acquiring (e.g., via the network interface 120, via the user interface 122, or by retrieving from a memory 140) data indicating at least an ingestion by the second user 20*b* of another medicine, the another medicine ingested by the second user 20*b* being a different type of medicine from the medicine ingested by the first user 20*a* (e.g., the second user 20*b* ingesting acetaminophen instead of ingesting an aspirin as ingested by the first user 20*a*).

In some implementations, the objective occurrence data acquisition operation 304 of FIG. 3 may include an operation 555 for acquiring data indicating at least an ingestion by the first user of a food item as depicted in FIG. 5*d*. For instance, the objective occurrence data acquisition module 104 of the computing device 10 acquiring (e.g., via the network interface 120, via the user interface 122, or by retrieving from a memory 140) data indicating at least an ingestion by the first user 20*a* of a food item (e.g., an apple).

Operation 555, in turn, may include one or more additional operations in various alternative implementations. For example, in some implementations, operation 555 may include an operation 556 for acquiring data indicating at least an ingestion by the second user of a food item as depicted in FIG. 5*d*. For instance, the objective occurrence data acquisition module 104 of the computing device 10 acquiring (e.g., via the network interface 120, via the user interface 122, or by retrieving from a memory 140) data indicating at least an ingestion by the second user 20*b* of a food item (e.g., an apple, an orange, a hamburger, or some other food item).

Operation 556, in turn, may further include an operation 557 for acquiring data indicating ingestions of same or similar types of food items by the first user and the second user as depicted in FIG. 5*d*. For instance, the objective occurrence data acquisition module 104 of the computing device 10 acquiring (e.g., via the network interface 120, via the user interface 122, or by retrieving from a memory 140) data indicating ingestions of same or similar types of food items (e.g., same or different types of apple) by the first user 20*a* and the second user 20*b*.

In some implementations, operation 557 may include an operation 558 for acquiring data indicating ingestions of same or similar quantities of the same or similar types of food items by the first user and the second user as depicted in FIG. 5*d*. For instance, the objective occurrence data acquisition module 104 of the computing device 10 acquiring (e.g., via the network interface 120, via the user interface 122, or by retrieving from a memory 140) data indicating ingestions of same or similar quantities of the same or similar types of food items (e.g., consuming 10 ounces of the same or different types of apple) by the first user 20*a* and the second user 20*b*.

In some implementations, operation 555 may include an operation 559 for acquiring data indicating at least an ingestion by the second user of another food item, the another food item ingested by the second user being a different food item from the food item ingested by the first user as depicted in FIG. 5*d*. For instance, the objective occurrence data acquisition module 104 of the computing device 10 acquiring (e.g., via the network interface 120, via the user interface 122, or by retrieving from a memory 140) data indicating at least an ingestion by the second user 20*b* of another food item (e.g., hamburger), the another food item ingested by the second user 20*b* being a different food item from the food item (e.g., apple) ingested by the first user 20*a*.

Figure 5E:
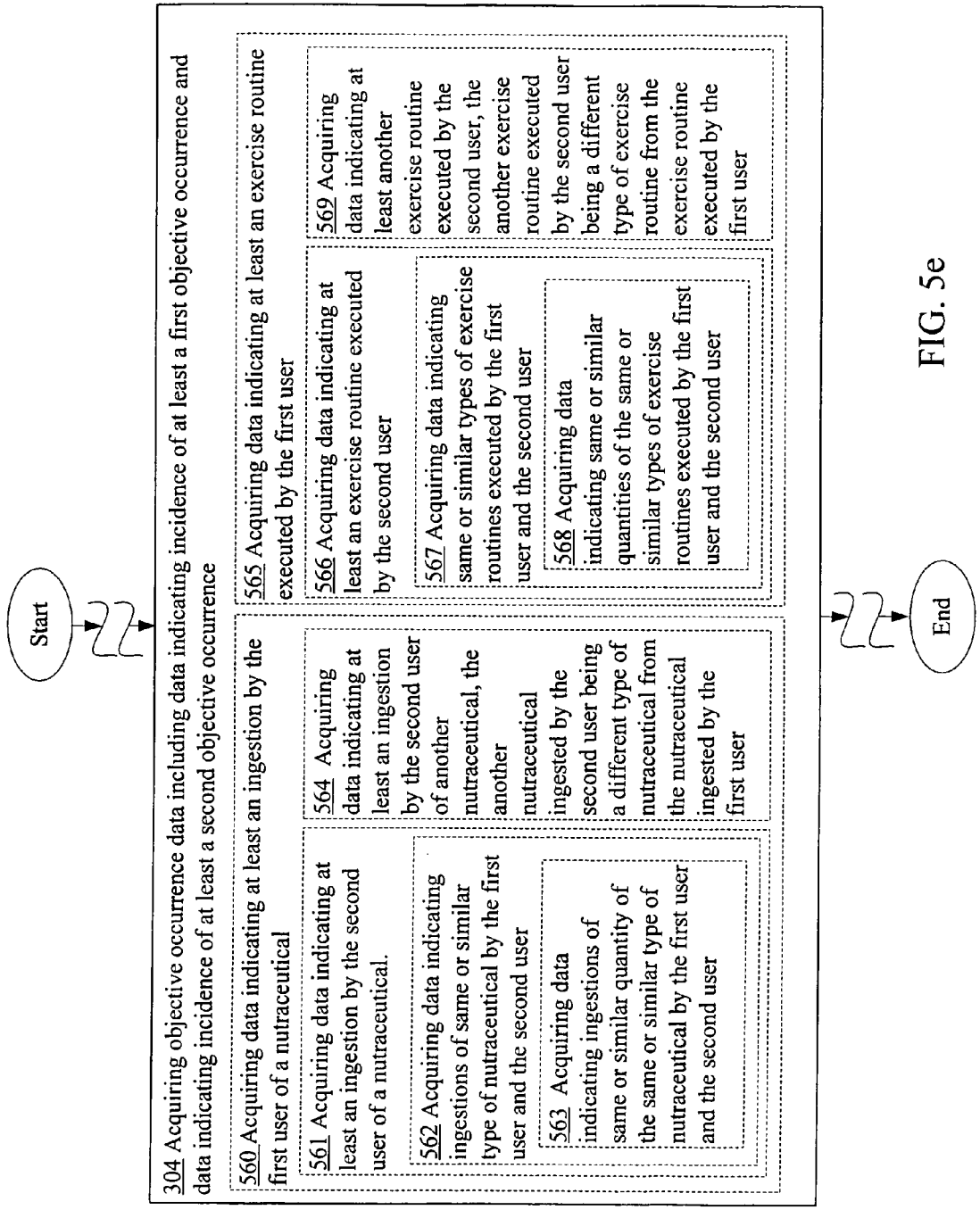
FIG. 5e is a high-level logic flowchart of a process depicting alternate implementations of the objective occurrence data acquisition operation 304 of FIG. 3.

In some implementations, the objective occurrence data acquisition operation 304 of FIG. 3 may include an operation 560 for acquiring data indicating at least an ingestion by the first user of a nutraceutical as depicted in FIG. 5*e*. For instance, the objective occurrence data acquisition module 104 of the computing device 10 acquiring (e.g., via the network interface 120, via the user interface 122, or by retrieving from a memory 140) data indicating at least an ingestion by the first user 20*a* of a nutraceutical (e.g., broccoli).

Operation 560, in turn, may include one or more additional operations in various alternative implementations. For example, in some implementations, operation 560 may include an operation 561 for acquiring data indicating at least an ingestion by the second user of a nutraceutical as depicted in FIG. 5*e*. For instance, the objective occurrence data acquisition module 104 of the computing device 10 acquiring (e.g., via the network interface 120, via the user interface 122, or by retrieving from a memory 140) data indicating at least an ingestion by the second user 20*b* of a nutraceutical (e.g., broccoli, red grapes, soy beans, or some other type of nutraceutical).

Operation 561, in turn, may further include an operation 562 for acquiring data indicating ingestions of same or similar type of nutraceutical by the first user and the second user as depicted in FIG. 5*e*. For instance, the objective occurrence data acquisition module 104 of the computing device 10 acquiring (e.g., via the network interface 120, via the user interface 122, or by retrieving from a memory 140) data indicating ingestions of same or similar type (e.g., same or different types of red grapes) of nutraceutical by the first user 20*a* and the second user 20*b*.

In some implementations, operation 562 may further include an operation 563 for acquiring data indicating ingestions of same or similar quantity of the same or similar type of nutraceutical by the first user and the second user as depicted in FIG. 5e. For instance, the objective occurrence data acquisition module 104 of the computing device 10 acquiring (e.g., via the network interface 120, via the user interface 122, or by retrieving from a memory 140) data indicating ingestions of same or similar quantity of the same or similar type of nutraceutical (e.g., 10 ounces of the same or different types of red grapes) by the first user 20a and the second user 20b.

In some implementations, operation 560 may include an operation 564 for acquiring data indicating at least an ingestion by the second user of another nutraceutical, the another nutraceutical ingested by the second user being a different type of nutraceutical from the nutraceutical ingested by the first user as depicted in FIG. 5e. For instance, the objective occurrence data acquisition module 104 of the computing device 10 acquiring (e.g., via the network interface 120, via the user interface 122, or by retrieving from a memory 140) data indicating at least an ingestion by the second user 20b of another nutraceutical (e.g., red grapes), the another nutraceutical ingested by the second user 20b being a different type of nutraceutical from the nutraceutical (e.g., broccoli) ingested by the first user 20a.

In some implementations, the objective occurrence data acquisition operation 304 of FIG. 3 may include an operation 565 for acquiring data indicating at least an exercise routine executed by the first user as depicted in FIG. 5e. For instance, the objective occurrence data acquisition module 104 of the computing device 10 acquiring (e.g., via the network interface 120, via the user interface 122, or by retrieving from a memory 140) data indicating at least an exercise routine (e.g., jogging) executed by the first user 20a.

Operation 565, in turn, may further include one or more additional operations in various alternative implementations. For example, in some implementations, operation 565 may include an operation 566 for acquiring data indicating at least an exercise routine executed by the second user as depicted in FIG. 5e. For instance, the objective occurrence data acquisition module 104 of the computing device 10 acquiring (e.g., via the network interface 120, via the user interface 122, or by retrieving from a memory 140) data indicating at least an exercise routine (e.g., jogging or some other exercise routine such as weightlifting, aerobics, treadmill, and so forth) executed by the second user 20b.

Operation 566, in turn, may further include an operation 567 for acquiring data indicating same or similar types of exercise routines executed by the first user and the second user as depicted in FIG. 5e. For instance, the objective occurrence data acquisition module 104 of the computing device 10 acquiring (e.g., via the network interface 120, via the user interface 122, or by retrieving from a memory 140) data indicating same or similar types of exercise routines (e.g., swimming) executed by the first user 20a and the second user 20b.

In some implementations, operation 567 may further include an operation 568 for acquiring data indicating same or similar quantities of the same or similar types of exercise routines executed by the first user and the second user as depicted in FIG. 5e. For instance, the objective occurrence data acquisition module 104 of the computing device 10 acquiring (e.g., via the network interface 120, via the user interface 122, or by retrieving from a memory 140) data indicating same or similar quantities of the same or similar types of exercise routines executed (e.g., jogging for 30 minutes) by the first user 20a and the second user 20b.

In some implementations, operation 565 may include an operation 569 for acquiring data indicating at least another exercise routine executed by the second user, the another exercise routine executed by the second user being a different type of exercise routine from the exercise routine executed by the first user as depicted in FIG. 5e. For instance, the objective occurrence data acquisition module 104 of the computing device 10 acquiring (e.g., via the network interface 120, via the user interface 122, or by retrieving from a memory 140) data indicating at least another exercise routine (e.g., working out on a treadmill) executed by the second user 20b, the another exercise routine executed by the second user 20b being a different type of exercise routine from the exercise routine (e.g., working out on an elliptical machine) executed by the first user 20a.

Figure 5F:
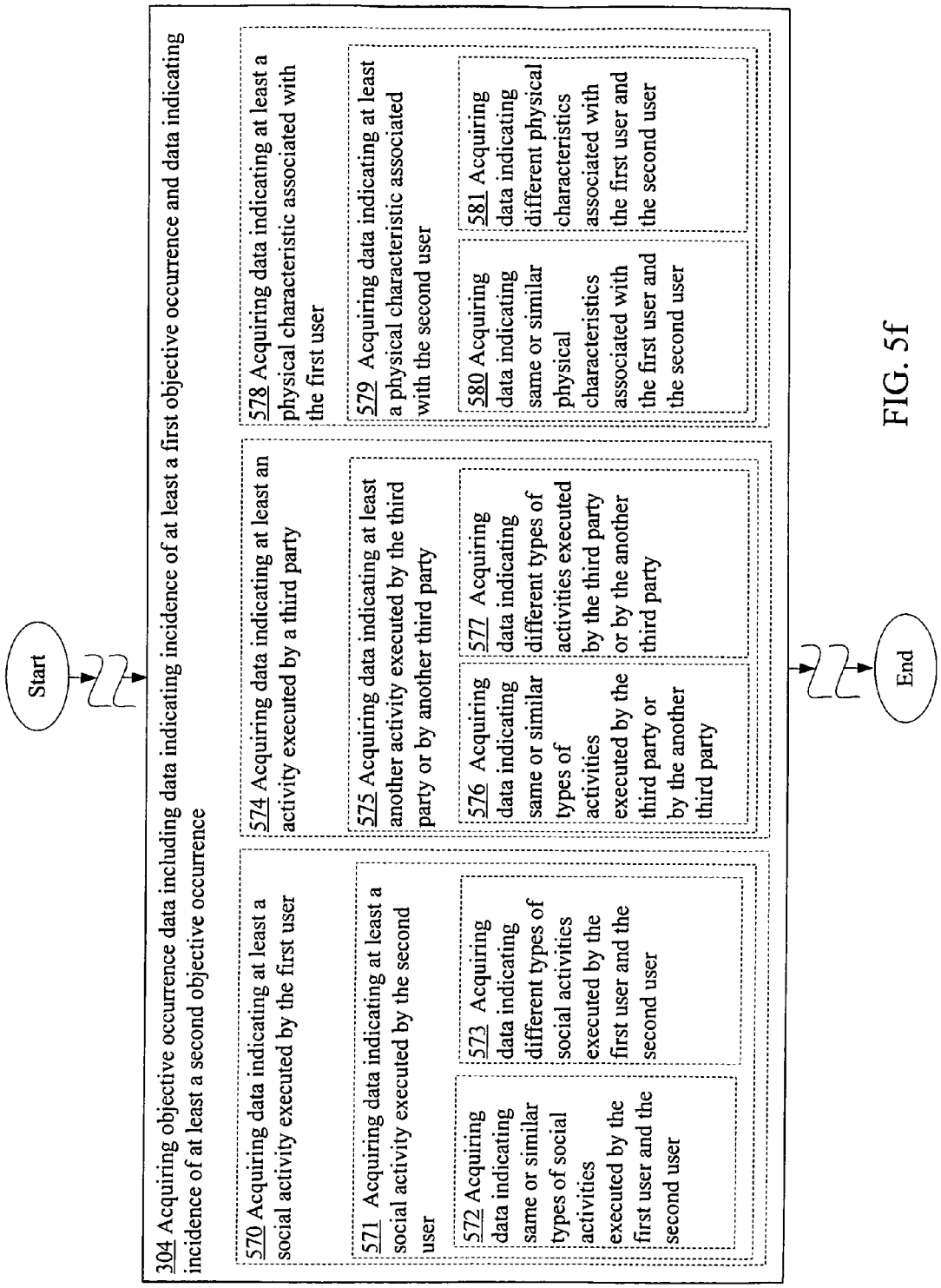
FIG. 5f is a high-level logic flowchart of a process depicting alternate implementations of the objective occurrence data acquisition operation 304 of FIG. 3.

In some implementations, the objective occurrence data acquisition operation 304 of FIG. 3 may include an operation 570 for acquiring data indicating at least a social activity executed by the first user as depicted in FIG. 5f. For instance, the objective occurrence data acquisition module 104 of the computing device 10 acquiring (e.g., via the network interface 120, via the user interface 122, or by retrieving from a memory 140) data indicating at least a social activity (e.g., hiking with friends) executed by the first user 20a.

Operation 570, in turn, may further include one or more additional operations in various alternative implementations. For example, in some implementations, operation 570 may include an operation 571 for acquiring data indicating at least a social activity executed by the second user as depicted in FIG. 5f. For instance, the objective occurrence data acquisition module 104 of the computing device 10 acquiring (e.g., via the network interface 120, via the user interface 122, or by retrieving from a memory 140) data indicating at least a social activity (e.g., hiking with friends or some other social activity such as skiing with friends, dining with friends, and so forth) executed by the second user 20b.

In some implementations, operation 571 may include an operation 572 for acquiring data indicating same or similar types of social activities executed by the first user and the second user as depicted in FIG. 5f For instance, the objective occurrence data acquisition module 104 of the computing device 10 acquiring (e.g., via the network interface 120, via the user interface 122, or by retrieving from a memory 140) data indicating same or similar types of social activities (e.g., visiting in-laws) executed by the first user 20a and the second user 20b.

In some implementations, operation 571 may include an operation 573 for acquiring data indicating different types of social activities executed by the first user and the second user as depicted in FIG. 5f. For instance, the objective occurrence data acquisition module 104 of the computing device 10 acquiring (e.g., via the network interface 120, via the user interface 122, or by retrieving from a memory 140) data indicating different types of social activities executed by the first user 20a (e.g., attending a family dinner) and the second user 20b (e.g., attending a dinner with friends).

In some implementations, the objective occurrence data acquisition operation 304 of FIG. 3 may include an operation 574 for acquiring data indicating at least an activity executed by a third party as depicted in FIG. 5f. For instance, the objective occurrence data acquisition module 104 of the computing device 10 acquiring (e.g., via the network interface 120, via the user interface 122, or by retrieving from a memory 140) data indicating at least an activity (e.g., a boss on a vacation) executed by a third party.

Operation 574, in turn, may further include one or more additional operations in various alternative implementations.

For example, in some implementations, operation 574 may include an operation 575 for acquiring data indicating at least another activity executed by the third party or by another third party as depicted in FIG. 5f. For instance, the objective occurrence data acquisition module 104 of the computing device 10 acquiring (e.g., via the network interface 120, via the user interface 122, or by retrieving from a memory 140) data indicating at least another activity (e.g., a boss on a vacation, a boss away from office on business trip, or a boss in the office) executed by the third party or by another third party.

In some implementations, operation 575 may include an operation 576 for acquiring data indicating same or similar types of activities executed by the third party or by the another third party as depicted in FIG. 5f. For instance, the objective occurrence data acquisition module 104 of the computing device 10 acquiring (e.g., via the network interface 120, via the user interface 122, or by retrieving from a memory 140) data indicating same or similar types of activities (e.g., a boss or bosses away on a business trip) executed by the third party or by the another third party.

In some implementations, operation 575 may include an operation 577 for acquiring data indicating different types of activities executed by the third party or by the another third party as depicted in FIG. 5f. For instance, the objective occurrence data acquisition module 104 of the computing device 10 acquiring (e.g., via the network interface 120, via the user interface 122, or by retrieving from a memory 140) data indicating different types of activities (e.g., a boss leaving for vacation as opposed to returning from a vacation) executed by the third party or by the another third party.

In some implementations, the objective occurrence data acquisition operation 304 of FIG. 3 may include an operation 578 for acquiring data indicating at least a physical characteristic associated with the first user as depicted in FIG. 5f. For instance, the objective occurrence data acquisition module 104 of the computing device 10 acquiring (e.g., via the network interface 120, via the user interface 122, or by retrieving from a memory 140) data indicating at least a physical characteristic (e.g., a blood sugar level) associated with the first user 20a. Note that a physical characteristic such as a blood sugar level could be determined using a device such as a blood sugar meter and then reported by the first user 20a or by a third party 50. Alternatively, such results may be reported or provided directly by the meter.

Operation 578, in turn, may further include one or more additional operations in various alternative implementations. For example, in some implementations, operation 578 may include an operation 579 for acquiring data indicating at least a physical characteristic associated with the second user as depicted in FIG. 5f. For instance, the objective occurrence data acquisition module 104 of the computing device 10 acquiring (e.g., via the network interface 120, via the user interface 122, or by retrieving from a memory 140) data indicating at least a physical characteristic (e.g., blood sugar level or a blood pressure level) associated with the second user 20b.

In some implementations, operation 579 may include an operation 580 for acquiring data indicating same or similar physical characteristics associated with the first user and the second user as depicted in FIG. 5f. For instance, the objective occurrence data acquisition module 104 of the computing device 10 acquiring (e.g., via the network interface 120, via the user interface 122, or by retrieving from a memory 140) data indicating same or similar physical characteristics (e.g., blood sugar levels) associated with the first user 20a and the second user 20b.

In some implementations, operation 579 may include an operation 581 for acquiring data indicating different physical characteristics associated with the first user and the second user as depicted in FIG. 5f. For instance, the objective occurrence data acquisition module 104 of the computing device 10 acquiring (e.g., via the network interface 120, via the user interface 122, or by retrieving from a memory 140) data indicating different physical characteristics (e.g., blood sugar level as opposed to blood pressure level) associated with the first user 20a and the second user 20b.

Figure 5G:
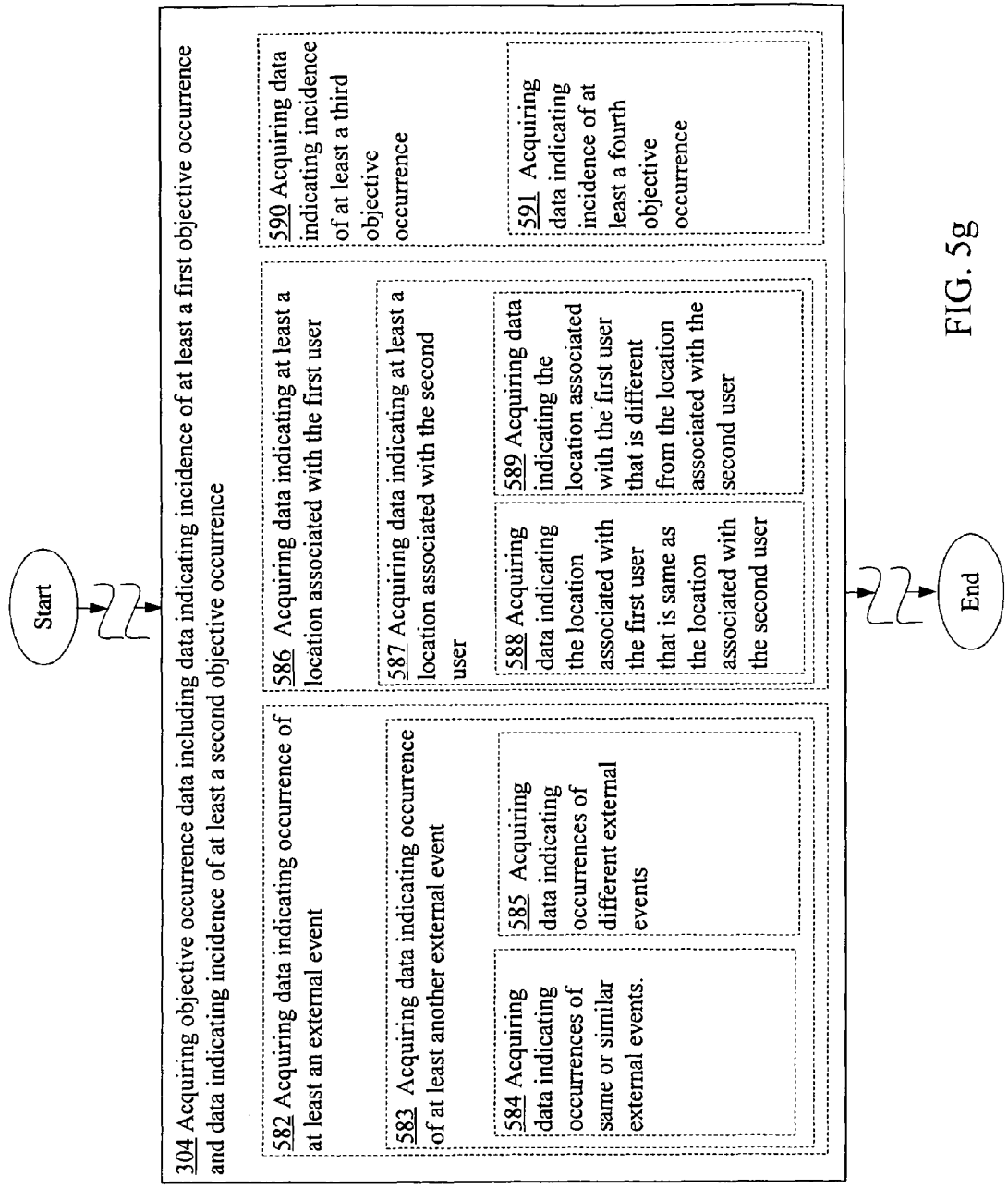
FIG. 5g is a high-level logic flowchart of a process depicting alternate implementations of the objective occurrence data acquisition operation 304 of FIG. 3.

In some implementations, the objective occurrence data acquisition operation 304 of FIG. 3 may include an operation 582 for acquiring data indicating occurrence of at least an external event as depicted in FIG. 5g. For instance, the objective occurrence data acquisition module 104 of the computing device 10 acquiring (e.g., via the network interface 120, via the user interface 122, or by retrieving from a memory 140) data indicating occurrence of at least an external event (e.g., rain storm).

Operation 582, in turn, may further include one or more additional operations in various alternative implementations. For example, in some implementations, operation 582 may include an operation 583 for acquiring data indicating occurrence of at least another external event as depicted in FIG. 5g. For instance, the objective occurrence data acquisition module 104 of the computing device 10 acquiring (e.g., via the network interface 120, via the user interface 122, or by retrieving from a memory 140) data indicating occurrence of at least another external event (e.g., another rain storm or sunny weather).

In some implementations, operation 583 may include an operation 584 for acquiring data indicating occurrences of same or similar external events as depicted in FIG. 5g. For instance, the objective occurrence data acquisition module 104 of the computing device 10 acquiring (e.g., via the network interface 120, via the user interface 122, or by retrieving from a memory 140) data indicating occurrences of same or similar external events (e.g., rain storms).

In some implementations, operation 583 may include an operation 585 for acquiring data indicating occurrences of different external events as depicted in FIG. 5g. For instance, the objective occurrence data acquisition module 104 of the computing device 10 acquiring (e.g., via the network interface 120, via the user interface 122, or by retrieving from a memory 140) data indicating occurrences of different external events (e.g., rain storm and sunny weather).

In some implementations, the objective occurrence data acquisition operation 304 of FIG. 3 may include an operation 586 for acquiring data indicating at least a location associated with the first user as depicted in FIG. 5g. For instance, the objective occurrence data acquisition module 104 of the computing device 10 acquiring (e.g., via the network interface 120, via the user interface 122, or by retrieving from a memory 140) data indicating at least a location (e.g., work place) associated with the first user 20a.

Operation 586, in turn, may further include one or more additional operations in various alternative implementations. For example, in some implementations, operation 586 may include an operation 587 for acquiring data indicating at least a location associated with the second user as depicted in FIG. 5g. For instance, the objective occurrence data acquisition module 104 of the computing device 10 acquiring (e.g., via the network interface 120, via the user interface 122, or by retrieving from a memory 140) data indicating at least a location (e.g., work place or home) associated with the second user 20b.

In some implementations, operation 587 may include an operation 588 for acquiring data indicating the location associated with the first user that is same as the location associated with the second user as depicted in FIG. 5g. For instance, the objective occurrence data acquisition module 104 of the computing device 10 acquiring (e.g., via the network interface 120, via the user interface 122, or by retrieving from a memory 140) data indicating the location (e.g., Syracuse) associated with the first user 20a that is same as the location (e.g., Syracuse) associated with the second user 20b.

In some implementations, operation 587 may include an operation 589 for acquiring data indicating the location associated with the first user that is different from the location associated with the second user as depicted in FIG. 5g. For instance, the objective occurrence data acquisition module 104 of the computing device 10 acquiring (e.g., via the network interface 120, via the user interface 122, or by retrieving from a memory 140) data indicating the location (e.g., Syracuse) associated with the first user 20a that is different from the location (e.g., Waikiki) associated with the second user 20b.

In some implementations, the objective occurrence data acquisition operation 304 of FIG. 3 may include an operation 590 for acquiring data indicating incidence of at least a third objective occurrence as depicted in FIG. 5g. For instance, the objective occurrence data acquisition module 104 of the computing device 10 acquiring (e.g., via the network interface 120, via the user interface 122, or by retrieving from a memory 140) data indicating incidence of at least a third objective occurrence (e.g., a third objective occurrence that may be associated with a third user 20c including, for example, a physical characteristic associated with the third user 20c, an activity associated with the third user 20c, a location associated with the third user 20c, and so forth).

In some implementations, operation 590 may further include an operation 591 for acquiring data indicating incidence of at least a fourth objective occurrence as depicted in FIG. 5g. For instance, the objective occurrence data acquisition module 104 of the computing device 10 acquiring (e.g., via the network interface 120, via the user interface 122, or by retrieving from a memory 140) data indicating incidence of at least a fourth objective occurrence (e.g., a fourth objective occurrence that may be associated with a fourth user 20d including, for example, a physical characteristic associated with the fourth user 20d, an activity associated with the fourth user 20d, a location associated with the fourth user 20d, and so forth).

Figure 6A:
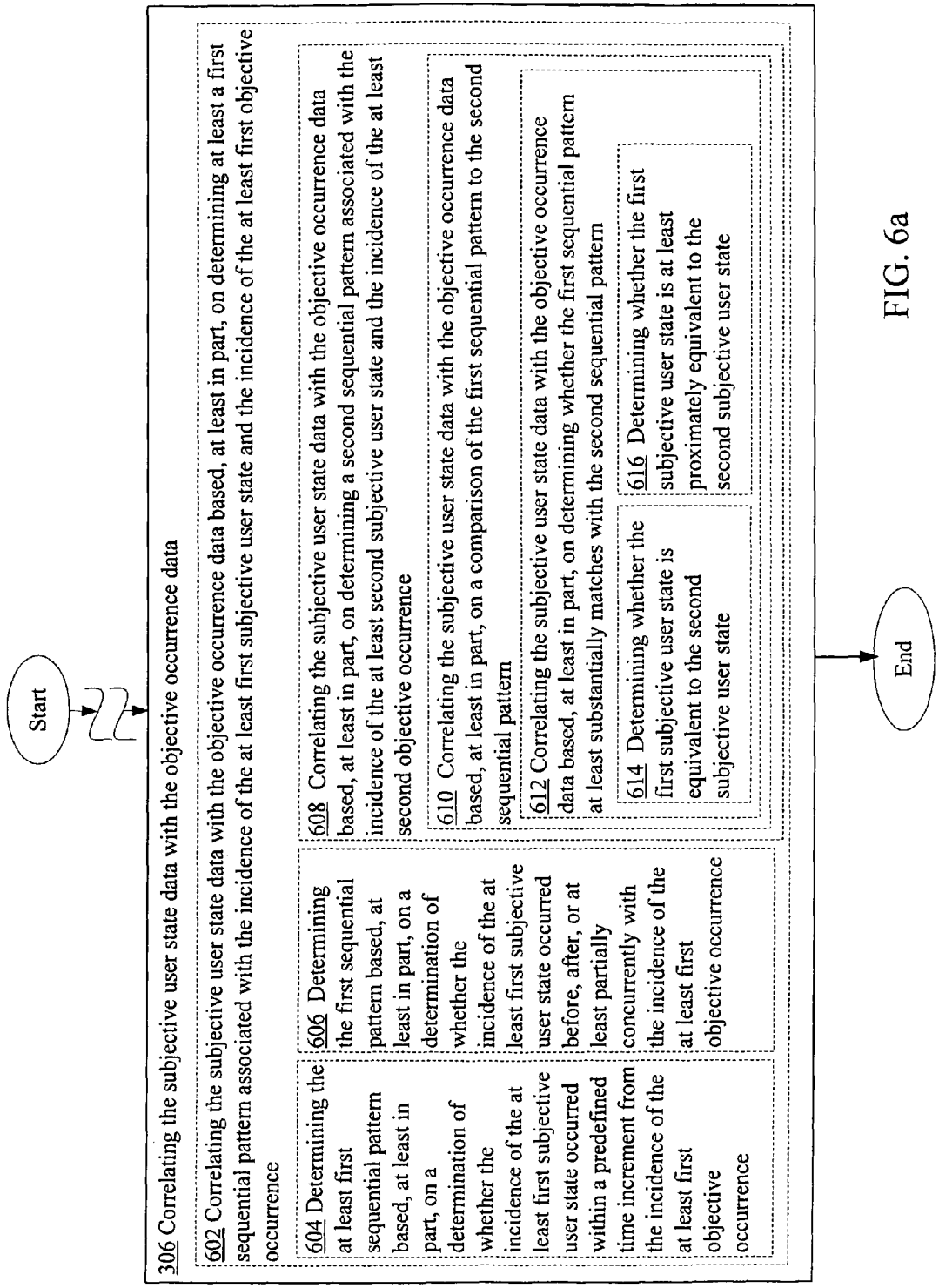
FIG. 6a is a high-level logic flowchart of a process depicting alternate implementations of the correlation operation 306 of FIG. 3.

In various implementations, the correlation operation 306 of FIG. 3 may include one or more additional operations as illustrated in FIGS. 6a, 6b, 6c, 6d, and 6e. For example, in some implementations, the correlation operation 306 may include an operation 602 for correlating the subjective user state data with the objective occurrence data based, at least in part, on determining at least a first sequential pattern associated with the incidence of the at least first subjective user state and the incidence of the at least first objective occurrence as depicted in FIG. 6a. For instance, the correlation module 106 of the computing device 10 correlating the subjective user state data 60 with the objective occurrence data 70\* based, at least in part, on the sequential pattern determination module 220 determining at least a first sequential pattern associated with the incidence of the at least first subjective user state (e.g., a first user 20a having an upset stomach) and the incidence of the at least first objective occurrence (e.g., the first user 20a eating a hot fudge sundae).

In various alternative implementations, operation 602 may include one or more additional operations. For example, in some implementations, operation 602 may include an operation 604 for determining the at least first sequential pattern based, at least in part, on a determination of whether the incidence of the at least first subjective user state occurred within a predefined time increment from the incidence of the at least first objective occurrence as depicted in FIG. 6a. For instance, the sequential pattern determination module 220 of the computing device 10 determining the at least first sequential pattern based, at least in part, on the "within predefined time increment determination" module 221 determining whether the incidence of the at least first subjective user state (e.g., a first user 20a having an upset stomach) occurred within a predefined time increment (e.g., four hours) from the incidence of the at least first objective occurrence (e.g., the first user 20a eating a hot fudge sundae).

In some implementations, operation 602 may include an operation 606 for determining the first sequential pattern based, at least in part, on a determination of whether the incidence of the at least first subjective user state occurred before, after, or at least partially concurrently with the incidence of the at least first objective occurrence as depicted in FIG. 6a. For instance, the sequential pattern determination module 220 of the computing device 10 determining the at least first sequential pattern based, at least in part, on the temporal relationship determination module 222 determining whether the incidence of the at least first subjective user state (e.g., a first user 20a having an upset stomach) occurred before, after, or at least partially concurrently with the incidence of the at least first objective occurrence (e.g., the first user 20a eating a hot fudge sundae).

In some implementations, operation 602 may include an operation 608 for correlating the subjective user state data with the objective occurrence data based, at least in part, on determining a second sequential pattern associated with the incidence of the at least second subjective user state and the incidence of the at least second objective occurrence as depicted in FIG. 6a. For instance, the correlation module 106 of the computing device 10 correlating the subjective user state data 60 with the objective occurrence data 70\* based, at least in part, on the sequential pattern determination module 220 determining a second sequential pattern associated with the incidence of the at least second subjective user state (e.g., a second user 20b having an upset stomach) and the incidence of the at least second objective occurrence (e.g., the second user 20b also eating a hot fudge sundae).

In various alternative implementations, operation 608 may include one or more additional operations. For example, in some implementations, operation 608 may include an operation 610 for correlating the subjective user state data with the objective occurrence data based, at least in part, on a comparison of the first sequential pattern to the second sequential pattern as depicted in FIG. 6a. For instance, the correlation module 106 of the computing device 10 correlating the subjective user state data 60 with the objective occurrence data 70\* based, at least in part, on the sequential pattern comparison module 224 comparing the first sequential pattern to the second sequential pattern (e.g., comparing to determine whether they are the same, similar, or different patterns).

In various implementations, operation 610 may further include an operation 612 for correlating the subjective user state data with the objective occurrence data based, at least in part, on determining whether the first sequential pattern at least substantially matches with the second sequential pattern as depicted in FIG. 6a. For instance, the correlation module 106 of the computing device 10 correlating the subjective user state data 60 with the objective occurrence data 70\* based, on the sequential pattern comparison module 224 determining whether the first sequential pattern at least substantially matches with the second sequential pattern.

In some implementations, operation 612 may include an operation 614 for determining whether the first subjective user state is equivalent to the second subjective user state as depicted in FIG. 6*a*. For instance, the subjective user state equivalence determination module 225 (see FIG. 2*c*) of the computing device 10 determining whether the first subjective user state (e.g., upset stomach) associated with the first user 20*a* is equivalent to the second subjective user state (e.g., stomach ache) associated with the second user 20*b*.

In some implementations, operation 612 may include an operation 616 for determining whether the first subjective user state is at least proximately equivalent to the second subjective user state as depicted in FIG. 6*a*. For instance, the subjective user state equivalence determination module 225 (see FIG. 2*c*) of the computing device 10 determining whether the first subjective user state (e.g., upset stomach) is at least proximately equivalent to the second subjective user state (e.g., stomach ache).

Figure 6B:
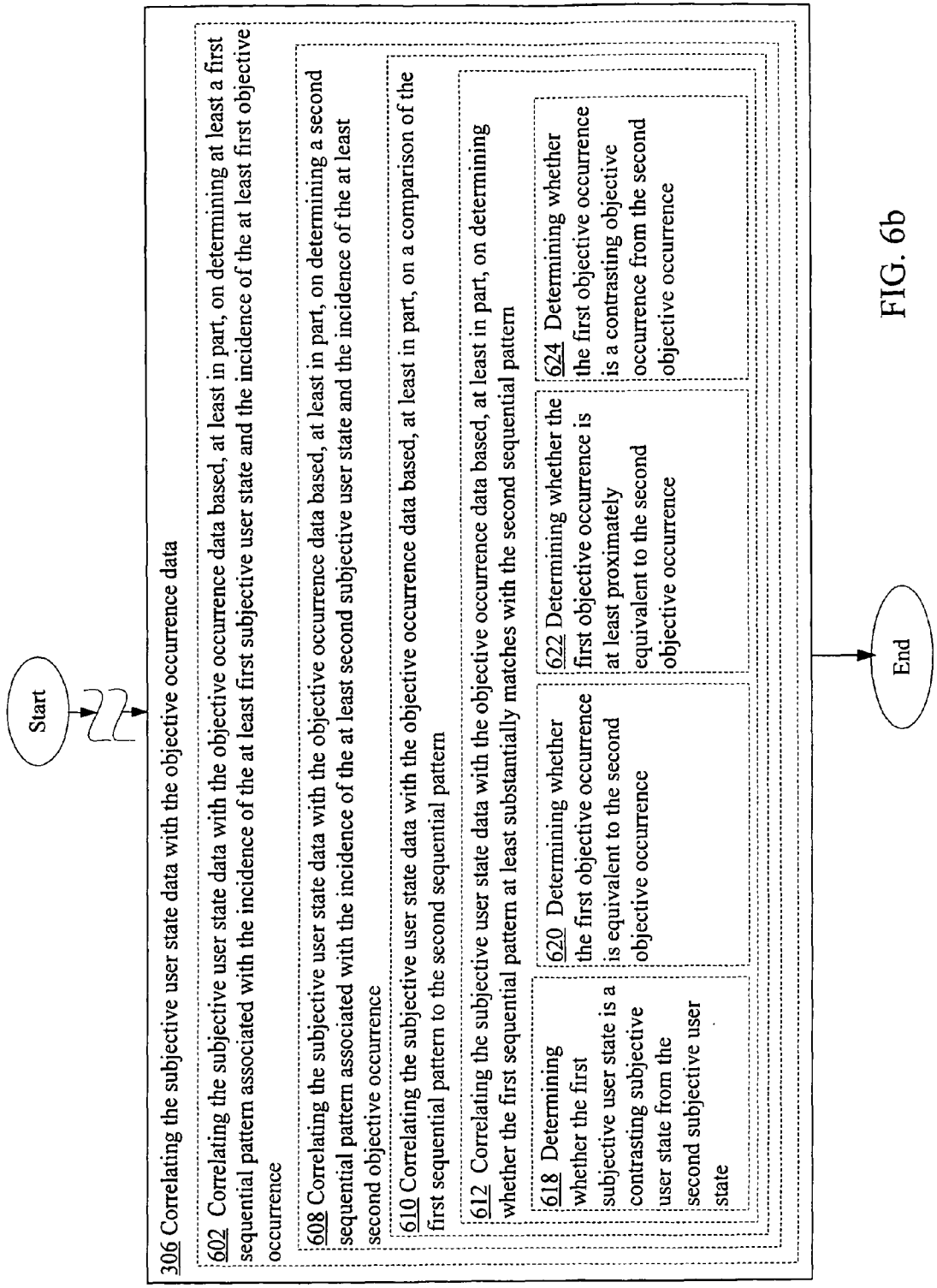
FIG. 6b is a high-level logic flowchart of a process depicting alternate implementations of the correlation operation 306 of FIG. 3.

In various implementations, operation 612 of FIG. 6*a* may include an operation 618 for determining whether the first subjective user state is a contrasting subjective user state from the second subjective user state as depicted in FIG. 6*b*. For instance, the subjective user state contrast determination module 227 of the computing device 10 determining whether the first subjective user state (e.g., extreme pain) is a contrasting subjective user state from the second subjective user state (e.g., moderate or no pain).

In some implementations, operation 612 may include an operation 620 for determining whether the first objective occurrence is equivalent to the second objective occurrence as depicted in FIG. 6*b*. For instance, the objective occurrence equivalence determination module 226 of the computing device 10 determining whether the first objective occurrence (e.g., consuming green tea by a first user 20*a*) is equivalent to the second objective occurrence (e.g., consuming green tea by a second user 20*b*).

In some implementations, operation 612 may include an operation 622 for determining whether the first objective occurrence is at least proximately equivalent to the second objective occurrence as depicted in FIG. 6*b*. For example, the objective occurrence equivalence determination module 226 of the computing device determining whether the first objective occurrence (e.g., overcast day) is at least proximately equivalent to the second objective occurrence (e.g., cloudy day).

In some implementations, operation 612 may include an operation 624 for determining whether the first objective occurrence is a contrasting objective occurrence from the second objective occurrence as depicted in FIG. 6*b*. For instance, the objective occurrence contrast determination module 228 of the computing device 10 determining whether the first objective occurrence (e.g., a first user 20*a* jogging for 30 minutes) is a contrasting objective occurrence from the second objective occurrence (e.g., a second user 20*b* jogging for 25 minutes).

Figure 6C:
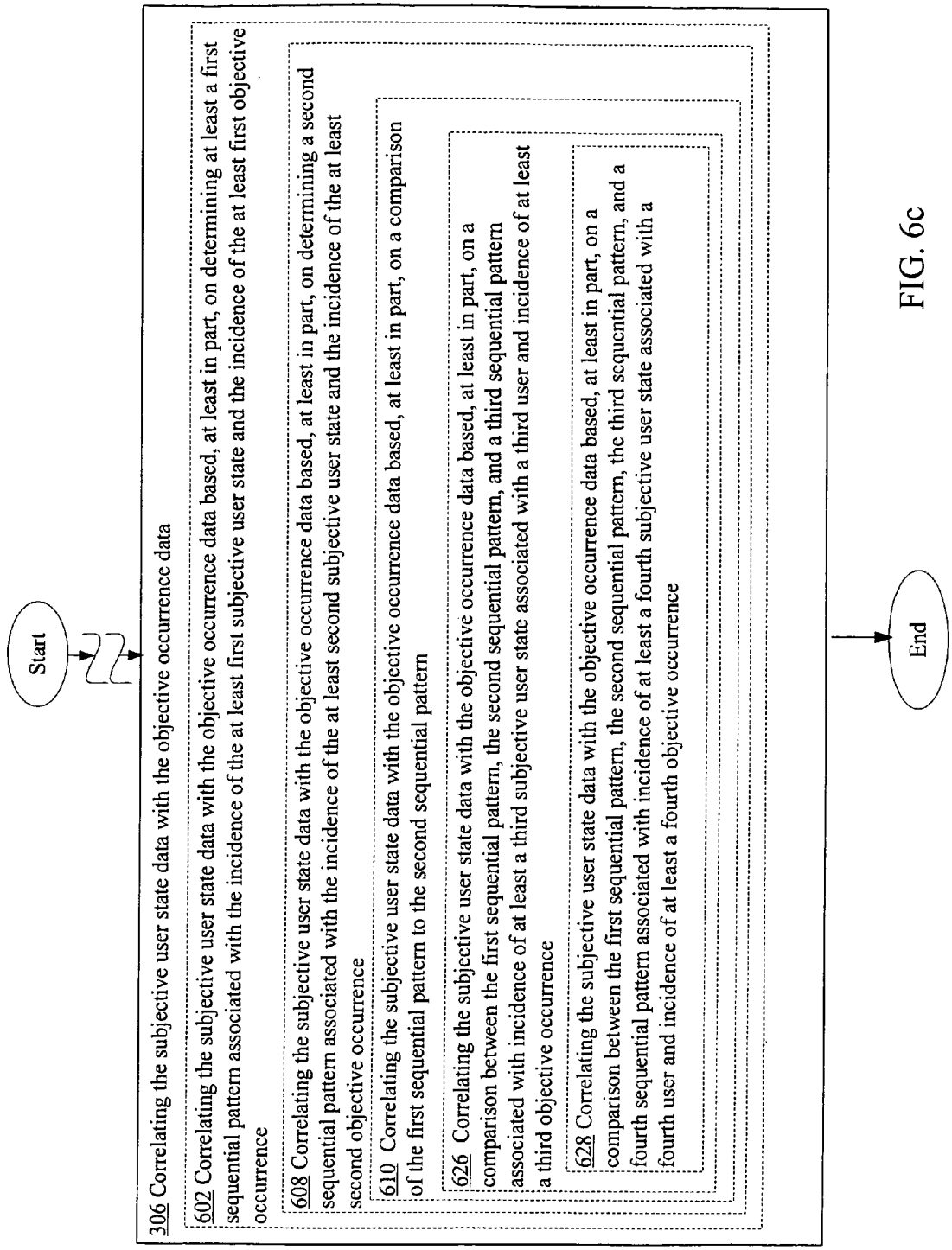
FIG. 6c is a high-level logic flowchart of a process depicting alternate implementations of the correlation operation 306 of FIG. 3.

In various implementations, operation 610 of FIGS. 6*a* and 6*b* may include an operation 626 for correlating the subjective user state data with the objective occurrence data based, at least in part, on a comparison between the first sequential pattern, the second sequential pattern, and a third sequential pattern associated with incidence of at least a third subjective user state associated with a third user and incidence of at least a third objective occurrence as depicted in FIG. 6*c*. For example, the correlation module 106 of the computing device 10 correlating the subjective user state data 60 with the objective occurrence data 70* based, at least in part, on the sequential pattern comparison module 224 making a comparison between the first sequential pattern, the second sequential pattern, and a third sequential pattern associated with incidence of at least a third subjective user state associated with a third user 20*c* and incidence of at least a third objective occurrence.

In some implementations, operation 626 may include an operation 628 for correlating the subjective user state data with the objective occurrence data based, at least in part, on a comparison between the first sequential pattern, the second sequential pattern, the third sequential pattern, and a fourth sequential pattern associated with incidence of at least a fourth subjective user state associated with a fourth user and incidence of at least a fourth objective occurrence as depicted in FIG. 6*c*. For example, the correlation module 106 of the computing device 10 correlating the subjective user state data 60 with the objective occurrence data 70* based, at least in part, on the sequential pattern comparison module 224 making a comparison between the first sequential pattern, the second sequential pattern, the third sequential pattern, and a fourth sequential pattern associated with incidence of at least a fourth subjective user state associated with a fourth user 20*d* and incidence of at least a fourth objective occurrence.

Figure 6D:
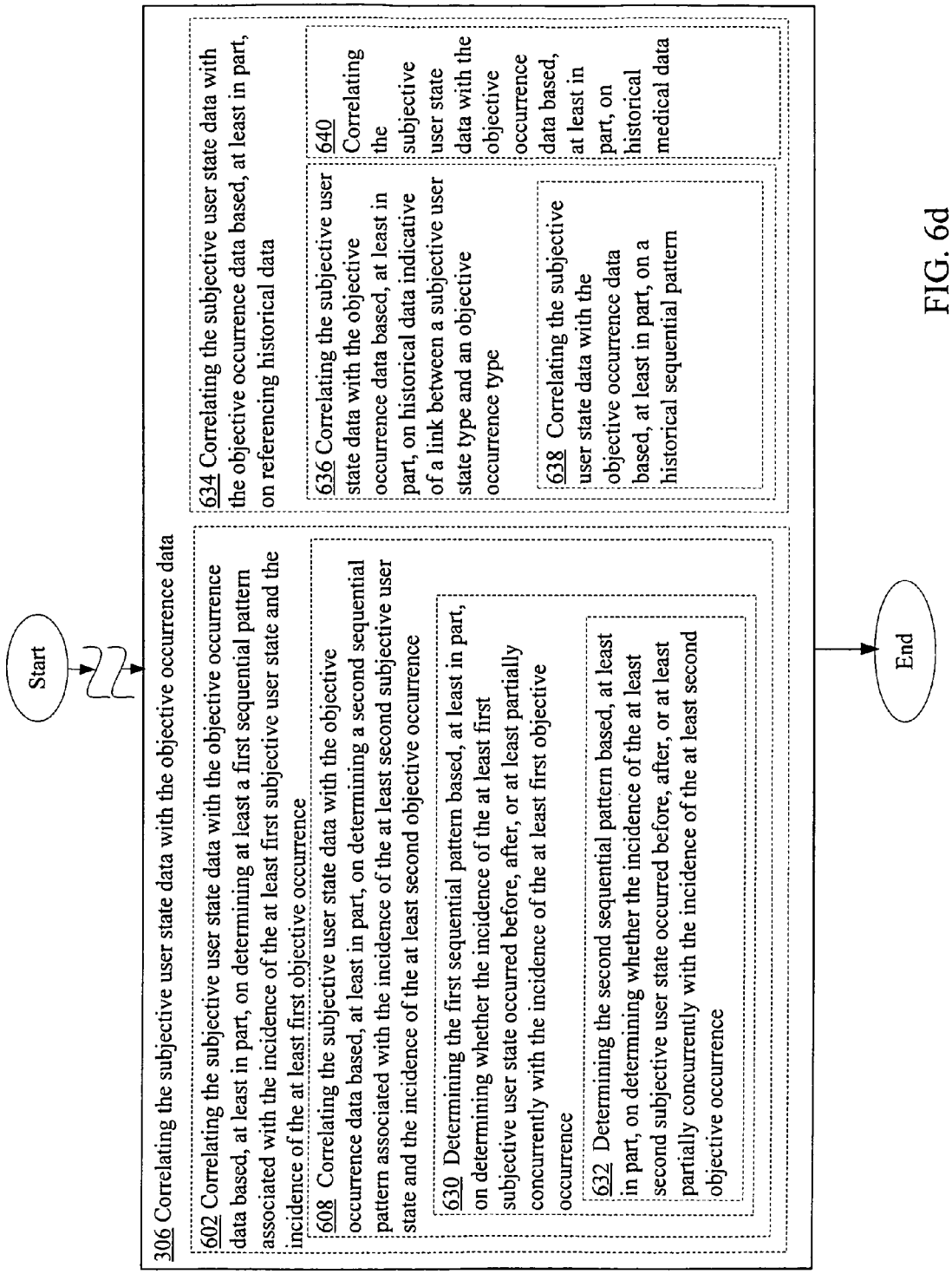
FIG. 6d is a high-level logic flowchart of a process depicting alternate implementations of the correlation operation 306 of FIG. 3.

In various implementations, operation 608 of FIGS. 6*a*, 6*b*, and 6*c* may include an operation 630 for determining the first sequential pattern based, at least in part, on determining whether the incidence of the at least first subjective user state occurred before, after, or at least partially concurrently with the incidence of the at least first objective occurrence as depicted in FIG. 6*d*. For instance, the sequential pattern determination module 220 of the computing device 10 determining the first sequential pattern based, at least in part, on the temporal relationship determination module 222 determining whether the incidence of the at least first subjective user state (e.g., depression) occurred before, after, or at least partially concurrently with the incidence of the at least first objective occurrence (e.g., overcast weather).

In some implementations, operation 630 may further include an operation 632 for determining the second sequential pattern based, at least in part, on determining whether the incidence of the at least second subjective user state occurred before, after, or at least partially concurrently with the incidence of the at least second objective occurrence as depicted in FIG. 6*d*. For instance, the sequential pattern determination module 220 of the computing device 10 determining the second sequential pattern based, at least in part, on the temporal relationship determination module 222 determining whether the incidence of the at least second subjective user state (e.g., sadness) occurred before, after, or at least partially concurrently with the incidence of the at least second objective occurrence (e.g., overcast weather).

In various implementations, the correlation operation 306 of FIG. 3 may include an operation 634 for correlating the subjective user state data with the objective occurrence data based, at least in part, on referencing historical data as depicted in FIG. 6*d*. For instance, the historical data referencing module 230 (see FIG. 2*c*) of the computing device 10 correlating the subjective user state data 60 with the objective occurrence data 70* based, at least in part, on referencing historical data 72 (e.g., population trends such as the superior efficacy of ibuprofen as opposed to acetaminophen in reducing toothaches in the general population, user medical data such as genetic, metabolome, or proteome information, historical sequential patterns particular to the user 20* or to the overall population such as people having a hangover after drinking excessively, and so forth).

In various implementations, operation 634 may include one or more additional operations. For example, in some implementations, operation 634 may include an operation 636 for correlating the subjective user state data with the objective occurrence data based, at least in part, on historical data indicative of a link between a subjective user state type and an objective occurrence type as depicted in FIG. 6d. For instance, the historical data referencing module 230 of the computing device 10 correlating the subjective user state data 60 with the objective occurrence data 70* based, at least in part, on historical data 72 indicative of a link between a subjective user state type and an objective occurrence type (e.g., historical data 72 suggests or indicate a link between a person's mental well-being and exercise).

Operation 636, in turn, may further include an operation 638 for correlating the subjective user state data with the objective occurrence data based, at least in part, on a historical sequential pattern as depicted in FIG. 6d. For instance, the historical data referencing module 230 of the computing device 10 correlating the subjective user state data 60 with the objective occurrence data 70* based, at least in part, on a historical sequential pattern (e.g., research indicates that people tend to feel better after exercising).

In some implementations, operation 634 may further include an operation 640 for correlating the subjective user state data with the objective occurrence data based, at least in part, on historical medical data as depicted in FIG. 6d. For instance, the historical data referencing module 230 of the computing device 10 correlating the subjective user state data 60 with the objective occurrence data 70* based, at least in part, on a historical medical data (e.g., genetic, metabolome, or proteome information or medical records of one or more users 20* or of others).

Figure 6E:
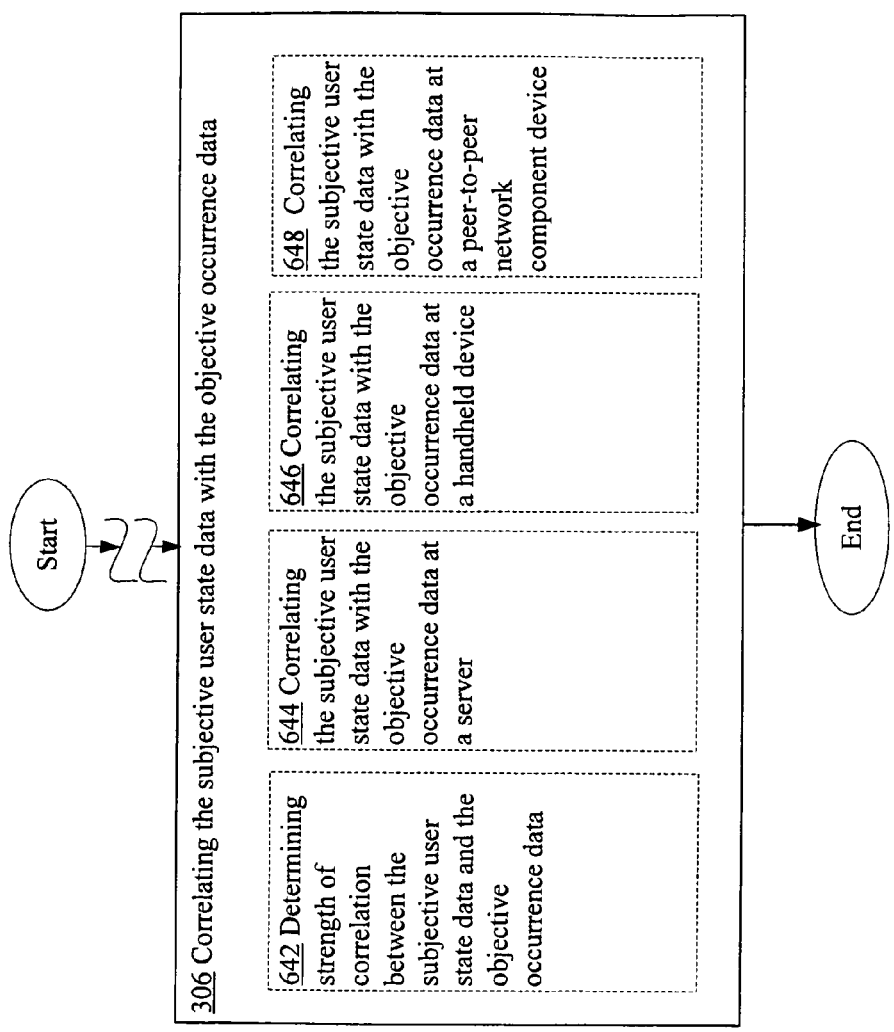
FIG. 6e is a high-level logic flowchart of a process depicting alternate implementations of the correlation operation 306 of FIG. 3.

In some implementations, the correlation operation 306 of FIG. 3 may include an operation 642 for determining strength of correlation between the subjective user state data and the objective occurrence data as depicted in FIG. 6e. For instance, the strength of correlation determination module 231 (see FIG. 2c) of the computing device 10 determining strength of correlation between the subjective user state data 60 and the objective occurrence data 70*.

In some implementations, the correlation operation 306 may include an operation 644 for correlating the subjective user state data with the objective occurrence data at a server as depicted in FIG. 6e. For instance, the correlation module 106 of the computing device 10 correlating the subjective user state data 60 with the objective occurrence data 70* when the computing device 10 is a network server.

In some implementations, the correlation operation 306 may include an operation 646 for correlating the subjective user state data with the objective occurrence data at a handheld device as depicted in FIG. 6e. For instance, the correlation module 106 of the computing device 10 correlating the subjective user state data 60 with the objective occurrence data 70* when the computing device 10 is a handheld device.

In some implementations, the correlation operation 306 may include an operation 648 for correlating the subjective user state data with the objective occurrence data at a peer-to-peer network component device as depicted in FIG. 6e. For instance, the correlation module 106 of the computing device 10 correlating the subjective user state data 60 with the objective occurrence data 70* when the computing device 10 is a peer-to-peer network component device.

Figure 7:
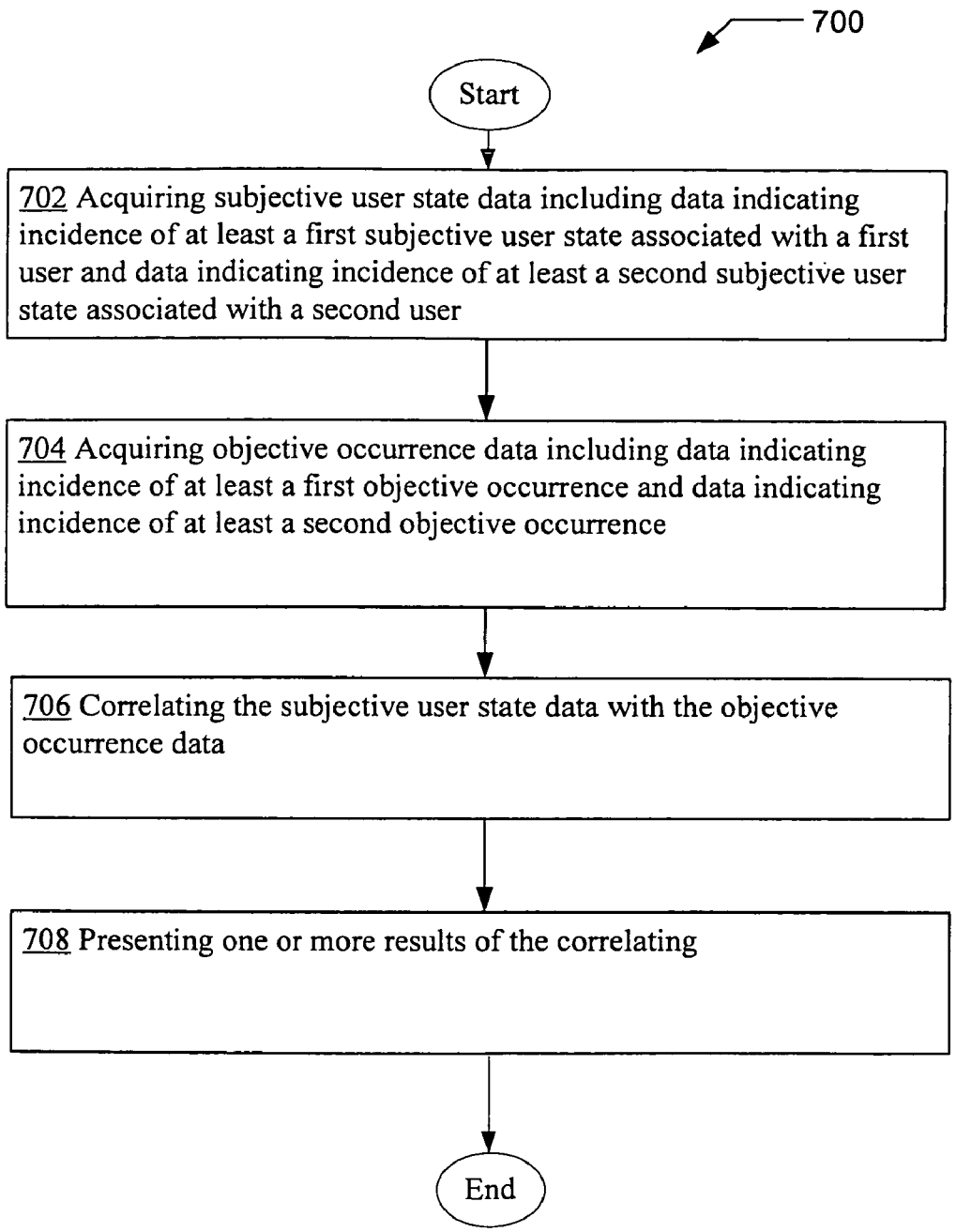
FIG. 7 is a high-level logic flowchart of another process.

Referring to FIG. 7 illustrating another operational flow 700 in accordance with various embodiments. Operational flow 700 includes operations that mirror the operations included in the operational flow 300 of FIG. 3. These operations include a subjective user state data acquisition operation 702, an objective occurrence data acquisition operation 704, and a correlation operation 706 that correspond to and mirror the subjective user state data acquisition operation 302, the objective occurrence data acquisition operation 304, and the correlation operation 306, respectively, of FIG. 3.

In addition, operational flow 700 includes a presentation operation 708 for presenting one or more results of the correlating as depicted in FIG. 7. For instance, the presentation module 108 of the computing device 10 presenting (e.g., by transmitting via network interface 120 or by indicating via user interface 122) one or more results of a correlating performed by the correlation module 106.

Figure 8:
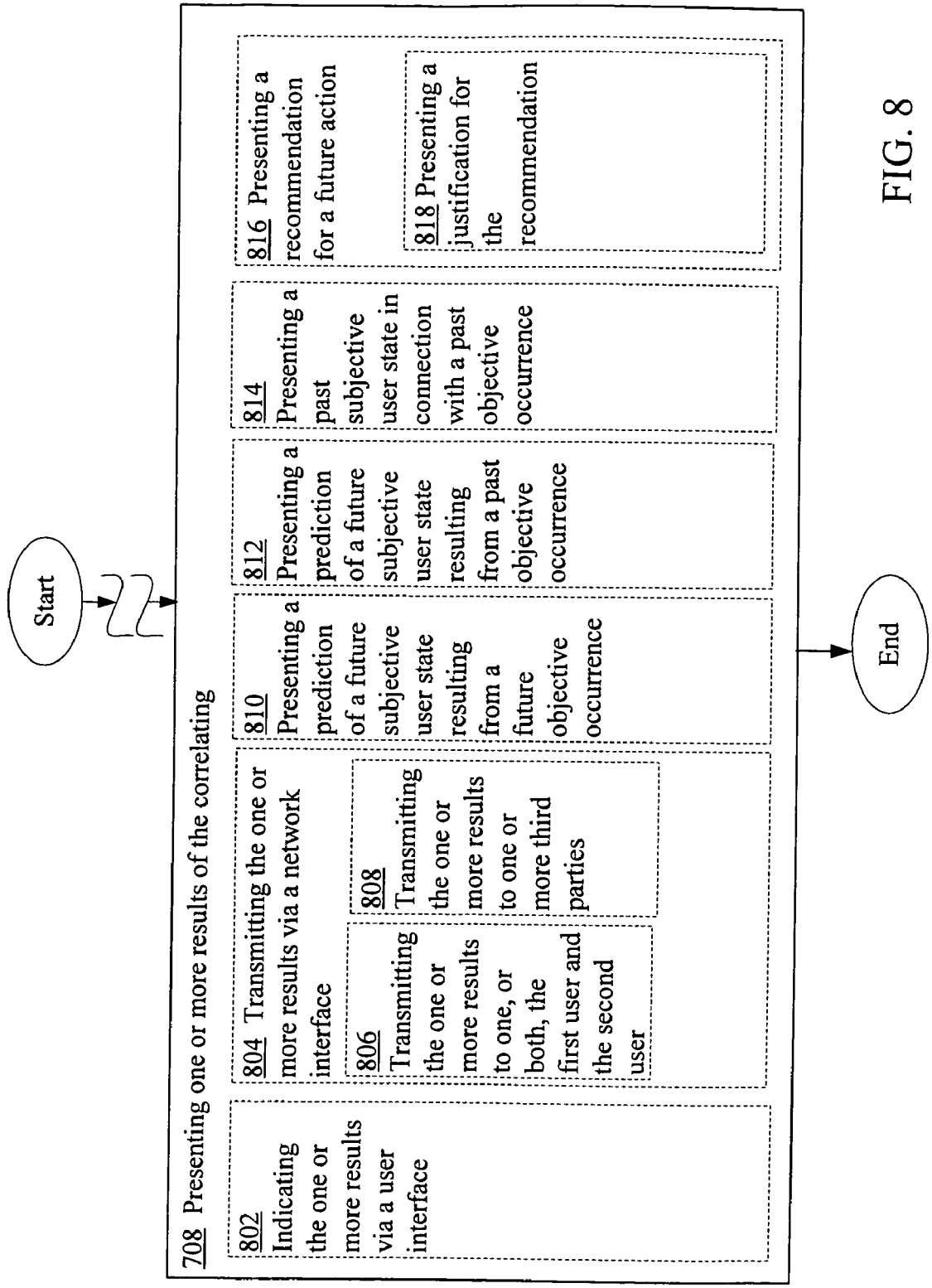
FIG. 8 is a high-level logic flowchart of a process depicting alternate implementations of the presentation operation 708 of FIG. 7.

In various implementations, the presentation operation 708 may include one or more additional operations as depicted in FIG. 8. For example, in some implementations, the presentation operation 708 may include an operation 802 for indicating the one or more results via a user interface. For instance, the user interface indication module 233 (see FIG. 2d) of the computing device 10 indicating the one or more results of the correlation operation performed by the correlation module 106 via a user interface 122 (e.g., a touchscreen, a display monitor, an audio system including a speaker, and/or other devices).

In various implementations, the presentation operation 708 may include an operation 804 for transmitting the one or more results via a network interface. For instance, the network interface transmission module 232 of the computing device 10 transmitting the one or more results of the correlation operation performed by the correlation module 106 via a network interface 120.

In some implementations, operation 804 may further include an operation 806 for transmitting the one or more results to one, or both, the first user and the second user. For example, the network interface transmission module 232 of the computing device 10 transmitting the one or more results of the correlation operation performed by the correlation module 106 to one, or both, the first user 20a and the second user 20b.

In some implementations, operation 804 may further include an operation 808 for transmitting the one or more results to one or more third parties. For example, the network interface transmission module 232 of the computing device 10 transmitting the one or more results of the correlation operation performed by the correlation module 106 to one or more third parties (e.g., third party sources 50).

In some implementations, the presentation operation 708 may include an operation 810 for presenting a prediction of a future subjective user state resulting from a future objective occurrence as depicted in FIG. 8. For instance, the prediction presentation module 236 (see FIG. 2d) of the computing device 10 presenting (e.g., transmitting via a network interface 120 or by indicating via a user interface 122) a prediction of a future subjective user state resulting from a future objective occurrence. An example prediction might state that "if the user drinks five shots of whiskey tonight, the user will have a hangover tomorrow."

In some implementations, the presentation operation 708 may include an operation 812 for presenting a prediction of a future subjective user state resulting from a past objective occurrence as depicted in FIG. 8. For instance, the prediction presentation module 236 of the computing device 10 presenting (e.g., transmitting via a network interface 120 or by indicating via a user interface 122) a prediction of a future subjective user state resulting from a past objective occurrence.

An example prediction might state that "the user will have a hangover tomorrow since the user drank five shots of whiskey tonight."

In some implementations, the presentation operation 708 may include an operation 814 for presenting a past subjective user state in connection with a past objective occurrence as depicted in FIG. 8. For instance, the past presentation module 238 of the computing device 10 presenting (e.g., transmitting via a network interface 120 or by indicating via a user interface 122) a past subjective user state in connection with a past objective occurrence. An example of such a presentation might state that "the user got depressed the last time it rained."

In various implementations, the presentation operation 708 may include an operation 816 for presenting a recommendation for a future action as depicted in FIG. 8. For instance, the recommendation module 240 of the computing device 10 presenting (e.g., transmitting via a network interface 120 or by indicating via a user interface 122) a recommendation for a future action. An example recommendation might state that "the user should not drink five shots of whiskey."

In some implementations, operation 816 may include an operation 818 for presenting a justification for the recommendation as depicted in FIG. 8. For instance, the justification module 242 of the computing device 10 presenting (e.g., transmitting via a network interface 120 or by indicating via a user interface 122) a justification for the recommendation. An example justification might state that "the user should not drink five shots of whiskey because the last time the user drank five shots of whiskey, the user got a hangover."

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system in the form of a machine, article of manufacture, or composition of matter, comprising:
    an objective occurrence data acquisition module configured to acquire objective occurrence data, the objective occurrence data to be acquired including at least data indicating incidence of a first objective occurrence and data indicating incidence of a second objective occurrence;
    a subjective user state data acquisition module configured to acquire subjective user state data, the subjective user state data to be acquired including at least data indicating incidence of a first subjective user state associated with a first user and data indicating incidence of a second subjective user state associated with a second user; and
    a correlation module configured to correlate the subjective user state data with the objective occurrence data.

2. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:
    an objective occurrence data reception module configured to receive the objective occurrence data including at least one of the data indicating incidence of a first objective occurrence or the data indicating incidence of a second objective occurrence.

3. The system of claim 2, wherein said objective occurrence data reception module configured to receive the objective occurrence data including at least one of the data indicating incidence of a first objective occurrence or the data indicating incidence of a second objective occurrence comprises:
    a blog entry reception module configured to receive the objective occurrence data via one or more blog entries.

4. The system of claim 2, wherein said objective occurrence data reception module configured to receive the objective occurrence data including at least one of the data indicating incidence of a first objective occurrence or the data indicating incidence of a second objective occurrence comprises:

a status report reception module configured to receive the objective occurrence data via one or more status reports.

5. The system of claim 2, wherein said objective occurrence data reception module configured to receive the objective occurrence data including at least one of the data indicating incidence of a first objective occurrence or the data indicating incidence of a second objective occurrence comprises:

an objective occurrence data reception module configured to receive the objective occurrence data from one or more sensors.

6. The system of claim 2, wherein said objective occurrence data reception module configured to receive the objective occurrence data including at least one of the data indicating incidence of a first objective occurrence or the data indicating incidence of a second objective occurrence comprises:

an objective occurrence data reception module configured to receive the objective occurrence data including at least the data indicating incidence of a first objective occurrence from the first user.

7. The system of claim 6, wherein said objective occurrence data reception module configured to receive the objective occurrence data including at least the data indicating incidence of a first objective occurrence from the first user comprises:

an objective occurrence data reception module configured to receive the objective occurrence data including at least the data indicating incidence of a second objective occurrence from the second user.

8. The system of claim 2, wherein said objective occurrence data reception module configured to receive the objective occurrence data including at least one of the data indicating incidence of a first objective occurrence or the data indicating incidence of a second objective occurrence comprises:

an objective occurrence data reception module configured to receive from one or more third parties the objective occurrence data including at least the data indicating incidence of a first objective occurrence or the data indicating incidence of a second objective occurrence.

9. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating ingestions of medicines by the first user and the second user.

10. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating ingestions of food items by the first user and the second user.

11. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating ingestions of nutraceuticals by the first user and the second user.

12. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating the first user and the second user executing exercise routines.

13. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating the first user and the second user executing social activities.

14. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating one or more third parties executing one or more activities.

15. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating physical characteristics of the first user and the second user.

16. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating occurrence of at least one external event.

17. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating the first user's and the second user's locations.

18. The system of claim 1, wherein said an objective occurrence data acquisition module configured to acquire objective occurrence data, the objective occurrence data to be acquired including at least data indicating incidence of a first objective occurrence and data indicating incidence of a second objective occurrence comprises:

an objective occurrence data acquisition module configured to acquire data indicating a third objective occurrence.

19. The system of claim 18, wherein said objective occurrence data acquisition module configured to acquire data indicating a third objective occurrence comprises:
an objective occurrence data acquisition module configured to acquire data indicating a fourth objective occurrence.

20. The system of claim 1, wherein said a subjective user state data acquisition module configured to acquire subjective user state data, the subjective user state data to be acquired including at least data indicating incidence of a first subjective user state associated with a first user and data indicating incidence of a second subjective user state associated with a second user comprises:
a reception module configured to receive subjective user state data including at least one of the data indicating incidence of a first subjective user state associated with a first user or the data indicating incidence of a second subjective user state associated with a second user.

21. The system of claim 20, wherein said reception module configured to receive subjective user state data including at least one of the data indicating incidence of a first subjective user state associated with a first user or the data indicating incidence of a second subjective user state associated with a second user comprises:
an electronic message reception module configured to receive, via one or more electronic messages, subjective user state data including at least one of the data indicating incidence of a first subjective user state associated with a first user or the data indicating incidence of a second subjective user state associated with a second user.

22. The system of claim 20, wherein said reception module configured to receive subjective user state data including at least one of the data indicating incidence of a first subjective user state associated with a first user or the data indicating incidence of a second subjective user state associated with a second user comprises:
a blog entry reception module configured to receive, via one or more blog entries, subjective user state data including at least one of the data indicating incidence of a first subjective user state associated with a first user or the data indicating incidence of a second subjective user state associated with a second user.

23. The system of claim 20, wherein said reception module configured to receive subjective user state data including at least one of the data indicating incidence of a first subjective user state associated with a first user or the data indicating incidence of a second subjective user state associated with a second user comprises:
a status report reception module configured to receive, via one or more status reports, subjective user state data including at least one of the data indicating incidence of a first subjective user state associated with a first user or the data indicating incidence of a second subjective user state associated with a second user.

24. The system of claim 20, wherein said reception module configured to receive subjective user state data including at least one of the data indicating incidence of a first subjective user state associated with a first user or the data indicating incidence of a second subjective user state associated with a second user comprises:
a reception module configured to receive subjective user state data including at least one of the data indicating incidence of a first subjective user state associated with a first user or the data indicating incidence of a second subjective user state associated with a second user from at least the first user or the second user.

25. The system of claim 20, wherein said reception module configured to receive subjective user state data including at least one of the data indicating incidence of a first subjective user state associated with a first user or the data indicating incidence of a second subjective user state associated with a second user comprises:
a reception module configured to receive subjective user state data including at least one of the data indicating incidence of a first subjective user state associated with a first user or the data indicating incidence of a second subjective user state associated with a second user from one or more third party sources.

26. The system of claim 1, wherein said a subjective user state data acquisition module configured to acquire subjective user state data, the subjective user state data to be acquired including at least data indicating incidence of a first subjective user state associated with a first user and data indicating incidence of a second subjective user state associated with a second user comprises:
a subjective user state data acquisition module configured to acquire subjective user state data including data indicating a first subjective mental state associated with the first user.

27. The system of claim 26, wherein said subjective user state data acquisition module configured to acquire subjective user state data including data indicating a first subjective mental state associated with the first user comprises:
a subjective user state data acquisition module configured to acquire subjective user state data including data indicating a second subjective mental state associated with the second user.

28. The system of claim 1, wherein said a subjective user state data acquisition module configured to acquire subjective user state data, the subjective user state data to be acquired including at least data indicating incidence of a first subjective user state associated with a first user and data indicating incidence of a second subjective user state associated with a second user comprises:
a subjective user state data acquisition module configured to acquire subjective user state data including data indicating a first subjective physical state associated with the first user.

29. The system of claim 28, wherein said subjective user state data acquisition module configured to acquire subjective user state data including data indicating a first subjective physical state associated with the first user comprises:
a subjective user state data acquisition module configured to acquire subjective user state data including data indicating a second subjective physical state associated with the second user.

30. The system of claim 1, wherein said a subjective user state data acquisition module configured to acquire subjective user state data, the subjective user state data to be acquired including at least data indicating incidence of a first subjective user state associated with a first user and data indicating incidence of a second subjective user state associated with a second user comprises:
a subjective user state data acquisition module configured to acquire subjective user state data including data indicating a first subjective overall state associated with the first user.

31. The system of claim 30, wherein said subjective user state data acquisition module configured to acquire subjective user state data including data indicating a first subjective overall state associated with the first user comprises:
- a subjective user state data acquisition module configured to acquire subjective user state data including data indicating a second subjective overall state associated with the second user.

32. The system of claim 1, wherein said a subjective user state data acquisition module configured to acquire subjective user state data, the subjective user state data to be acquired including at least data indicating incidence of a first subjective user state associated with a first user and data indicating incidence of a second subjective user state associated with a second user comprises:
- a subjective user state data acquisition module configured to acquire subjective user state data including data indicating incidence of a third subjective user state associated with a third user.

33. The system of claim 32, wherein said subjective user state data acquisition module configured to acquire subjective user state data including data indicating incidence of a third subjective user state associated with a third user comprises:
- a subjective user state data acquisition module configured to acquire subjective user state data including data indicating incidence of a fourth subjective user state associated with a fourth user.

34. The system of claim 1, wherein said correlation module configured to correlate the subjective user state data with the objective occurrence data comprises:
- a sequential pattern determination module configured to determine at least a first sequential pattern associated with the incidence of the first objective occurrence and the incidence of the first subjective user state.

35. The system of claim 34, wherein said sequential pattern determination module configured to determine at least a first sequential pattern associated with the incidence of the first objective occurrence and the incidence of the first subjective user state comprises:
- a sequential pattern determination module configured to determine a second sequential pattern associated with the incidence of the second objective occurrence and the incidence of the second subjective user state.

36. The system of claim 35, wherein said sequential pattern determination module configured to determine a second sequential pattern associated with the incidence of the second objective occurrence and the incidence of the second subjective user state comprises:
- a sequential pattern comparison module configured to compare the first sequential pattern with a second sequential pattern associated with the incidence of the second objective occurrence and the incidence of the second subjective user state.

37. The system of claim 36, wherein said sequential pattern comparison module configured to compare the first sequential pattern with a second sequential pattern associated with the incidence of the second objective occurrence and the incidence of the second subjective user state comprises:
- a sequential pattern comparison module configured to determine whether the first sequential pattern at least substantially matches with the second sequential pattern.

38. The system of claim 36, wherein said sequential pattern comparison module configured to compare the first sequential pattern with a second sequential pattern associated with the incidence of the second objective occurrence and the incidence of the second subjective user state comprises:
- a sequential pattern comparison module configured to compare the first sequential pattern, the second sequential pattern, and a third sequential pattern associated with incidence of a third objective occurrence and incidence of a third subjective user state associated with a third user.

39. The system of claim 38, wherein said sequential pattern comparison module configured to compare the first sequential pattern, the second sequential pattern, and a third sequential pattern associated with incidence of a third objective occurrence and incidence of a third subjective user state associated with a third user comprises:
- a sequential pattern comparison module configured to compare the first sequential pattern, the second sequential pattern, the third sequential pattern, and a fourth sequential pattern associated with incidence of a fourth objective occurrence and incidence of a fourth subjective user state associated with a fourth user.

40. The system of claim 34, wherein said sequential pattern determination module configured to determine at least a first sequential pattern associated with the incidence of the first objective occurrence and the incidence of the first subjective user state comprises:
- a sequential pattern determination module configured to determine the first sequential pattern based on a determination of whether the incidence of the first subjective user state occurred before, after, or at least partially concurrently with the incidence of the first objective occurrence.

41. The system of claim 1, further comprising:
- a presentation module configured to present one or more results of the correlation of the subjective user state data with the objective occurrence data.

42. A computationally-implemented system, comprising:
- circuitry for acquiring objective occurrence data, the objective occurrence data to be acquired including at least data indicating incidence of a first objective occurrence and data indicating incidence of a second objective occurrence;
- circuitry for acquiring subjective user state data, the subjective user state data to be acquired including at least data indicating incidence of a first subjective user state associated with a first user and data indicating incidence of a second subjective user state associated with a second user; and
- circuitry for correlating the subjective user state data with the objective occurrence data.

43. An article of manufacture, comprising:
- a non-transitory signal-bearing medium bearing:
- one or more instructions for acquiring objective occurrence data, the objective occurrence data to be acquired including at least data indicating incidence of a first objective occurrence and data indicating incidence of a second objective occurrence;
- one or more instructions for acquiring subjective user state data, the subjective user state data to be acquired including at least data indicating incidence of a first subjective user state associated with a first user and data indicating incidence of a second subjective user state associated with a second user; and
- one or more instructions for correlating the subjective user state data with the objective occurrence data.

* * * * *

UNITED STATES PATENT AND TRADEMARK OFFICE
CERTIFICATE OF CORRECTION

PATENT NO.       : 8,010,663 B2
APPLICATION NO.  : 12/383817
DATED            : August 30, 2011
INVENTOR(S)      : Firminger et al.

It is certified that error appears in the above-identified patent and that said Letters Patent is hereby corrected as shown below:

Column 52, line 47 "said an objective" should read -- said objective --
Column 53, line 47 "said an objective" should read -- said objective --
Column 53, line 56 "said an objective" should read -- said objective --
Column 53, line 65 "said an objective" should read -- said objective --
Column 54, line 7 "said an objective" should read -- said objective --
Column 54, line 17 "said an objective" should read -- said objective --
Column 54, line 26 "said an objective" should read -- said objective --
Column 54, line 35 "said an objective" should read -- said objective --
Column 54, line 44 "said an objective" should read -- said objective --
Column 54, line 53 "said an objective" should read -- said objective --
Column 54, line 62 "said an objective" should read -- said objective --
Column 55, line 10 "said a subjective" should read -- said subjective --
Column 56, line 17 "said a subjective" should read -- said subjective --
Column 56, line 36 "said a subjective" should read -- said subjective --
Column 56, line 55 "said a subjective" should read -- said subjective --
Column 57, line 7 "said a subjective" should read -- said subjective --

Signed and Sealed this
Eighteenth Day of October, 2011

David J. Kappos
*Director of the United States Patent and Trademark Office*